US012763933B2

(12) United States Patent
Ierymenko et al.

(10) Patent No.: US 12,763,933 B2
(45) Date of Patent: Oct. 13, 2026

(54) CRYPTOGRAPHICALLY ADDRESSED PEER-TO-PEER NETWORK AND NODE

(71) Applicant: ZeroTier, Inc., Irvine, CA (US)

(72) Inventors: Adam Ierymenko, Loveland, OH (US); Joseph Henry, Trabuco Canyon, CA (US); Grant Limberg, Rancho Santa Margarita, CA (US); Travis LaDuke, Santa Ana, CA (US)

(73) Assignee: ZeroTier, Inc., Irvine, CA (US)

( * ) Notice: Subject to any disclaimer, the term of this patent is extended or adjusted under 35 U.S.C. 154(b) by 57 days.

(21) Appl. No.: 19/036,251

(22) Filed: Jan. 24, 2025

(65) Prior Publication Data

US 2026/0222179 A1 Jul. 30, 2026

(51) Int. Cl.
*H04L 9/08* (2006.01)
*H04L 9/32* (2006.01)

(52) U.S. Cl.
CPC .......... *H04L 9/0825* (2013.01); *H04L 9/0847* (2013.01); *H04L 9/3242* (2013.01)

(58) Field of Classification Search
CPC .... H04L 9/0825; H04L 9/3242; H04L 9/0847
See application file for complete search history.

(56) References Cited

U.S. PATENT DOCUMENTS 11,054,999 B2 * 7/2021 Van Duyne ........... H04L 9/0891
11,258,617 B1 * 2/2022 Peddada ............... H04L 9/0838

* cited by examiner

*Primary Examiner* — Benjamin A Kaplan
(74) *Attorney, Agent, or Firm* — Lee & Hayes, P.C.

(57) ABSTRACT

Techniques of this disclosure relate to improvements to a network of nodes, where each node may be associated with an instance of a client application. The techniques herein relate to determining a cryptographic identity of a node requesting to communicate with a target node, identifying a coordination node configured to facilitate transmission of encrypted packets between nodes. The techniques further relate to facilitating, by the coordination node, a communication pathway between the requesting node and the target node such that the two nodes are communicatively coupled and can communicate directly without approval or monitoring by the coordination node.

20 Claims, 25 Drawing Sheets

CRYPTOGRAPHICALLY ADDRESSED PEER-TO-PEER NETWORK AND NODE

BACKGROUND

A user of a device may connect the device to a network infrastructure. Modern network infrastructure allows wireless communication between devices around the world. User devices and modern network infrastructure have each become increasingly complex in the last few decades.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
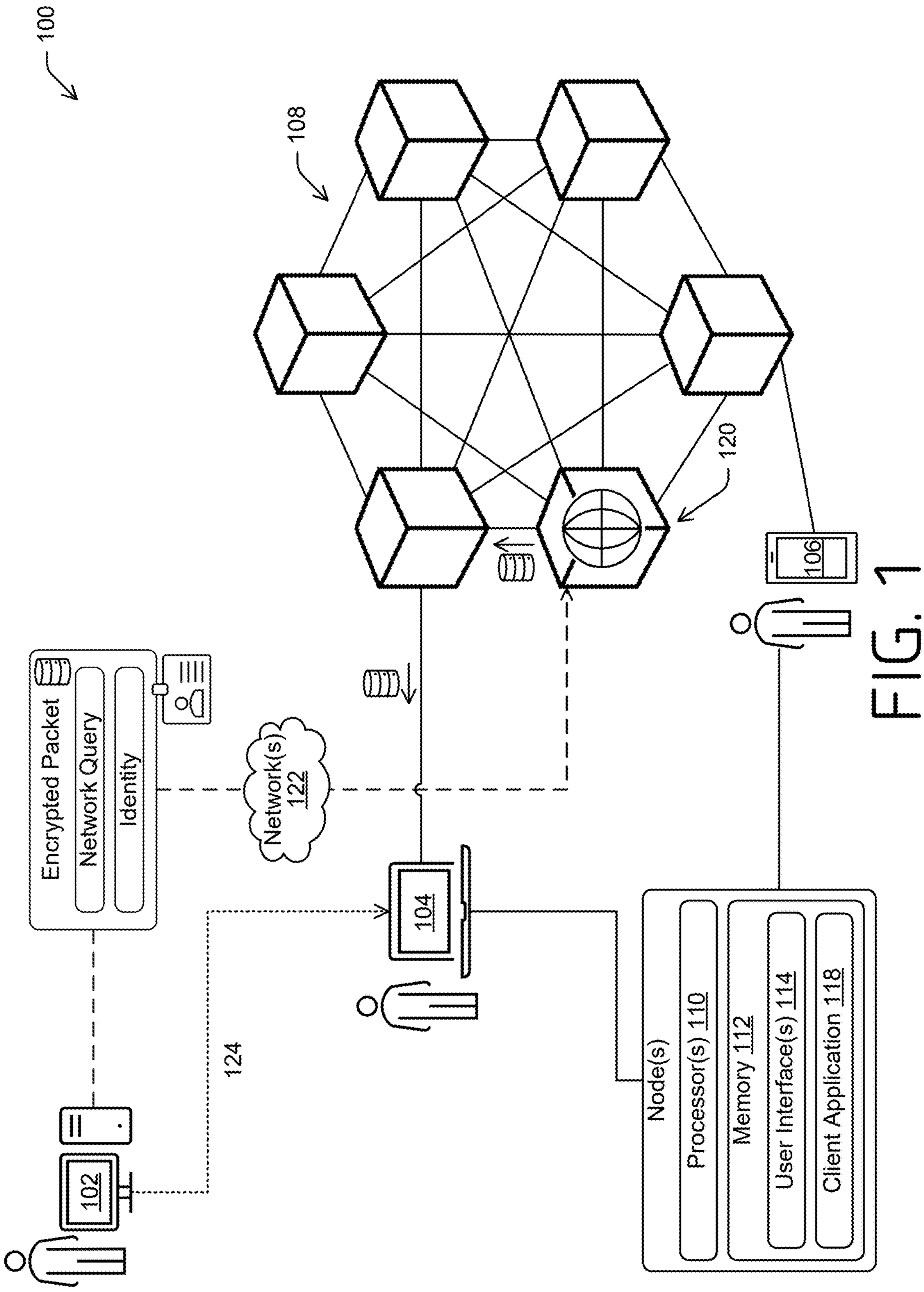
FIG. 1 illustrates an example environment for implementing one or more of techniques herein, in accordance with examples of this disclosure.

Modern network technology and infrastructure has become increasingly complex in recent decades. As technology has advanced, so too have the diversity of user devices and capabilities of network-connected devices. Modern networks today, both local and global, are essential for many facets of our lives. However, traditional networking techniques are often vulnerable to cyberattacks and other malicious activities and may lack adaptability and flexibility if and when one or more network nodes are compromised or when the number of nodes (or the amount of traffic to/from the nodes) on the network increases. Further, traditional networking techniques often bottleneck traffic through a central node, which may result in increased latency and reduced performance by the network, and may lack redundancy to deal with faults, attacks, or outages. Moreover, traditional networking techniques generally limit user control over the configuration of their respective nodes/devices as well as the network and may altogether prohibit users of the network from making decisions about resource allocation, data management, or other network policies.

This application relates to an improved networking infrastructure that is end-to-end encrypted and which is adaptable by default, thereby allowing the network to dynamically adjust to changes associated with the network. Further the improved networking techniques discussed herein distribute data transmissions between nodes to improve overall network performance and to establish redundancies, enhancing the reliability and scalability of the network. Moreover, the improved networking techniques discussed herein allocate increased control and authorization to user(s) on the network, thereby allowing individual user(s) to sandbox potential changes to node or network policies and to make configuration decisions about their node or the network.

The techniques herein discussed herein relate to a cryptographically addressed peer-to-peer network of nodes (e.g., devices) and a software-defined networking (SDN) layer that may allow one or more nodes in a network to communicate in an internet-agnostic manner. The techniques discussed further relate to node configuration(s) (e.g., operational mode(s)) that may be associated with a node in a network of nodes, and which may establish and maintain network controls, coordination node controls, configuration preferences (of the node(s) and of the network), etc. Such techniques facilitate dynamically and intelligently adapting to network changes (e.g., changes in network data flows/traffic, changes to node viability), and hand over greater management authority to users associated with node(s) on the network, thereby increasing the flexibility and customization of node and network configurations, improving security and privacy protocols of the network, and improving the scalability of a network across myriad client applications and/or devices.

In some examples, a network may comprise one or more nodes. A node may comprise a user device associated with a user (e.g., smartphone, desktop computer, laptop, tablet, video game console, wearable device, etc.), an instance of a virtual machine, a point-of-sale (POS) system, a medical device, a voice over internet protocol phone, and so on. Each node in a network may be associated with an instance of a client application rather than the device itself, thereby making the node device agnostic. In other words, a user may be associated with an instance of a client application that may be associated with a device, but the device itself can be changed out from under the instance of the client application, meaning a user may be associated with a consistent, transparent identifier associated with the instance of the client application that does not change with a new device (e.g., initializing the client application on a different device). In another example, the instance of the client application may be immune (e.g., unaffected by) changes in circumstances associated with the device (e.g., a different operating system, location, internet/network access point, etc.). Allowing user(s) to replace a device associated with the node further improves the mobility and scalability of the network by maintaining network connection(s) and pathway(s) despite fundamental changes to node hardware (e.g., the device).

In at least some examples, node(s) in a network may each be communicatively coupled (e.g., capable of transmitting and receiving data) to each of the other node(s) on the network. By maintaining connections to each of the other nodes on the network, the redundancy and adaptability of the network is enhanced, thereby making the network less vulnerable to attacks, failures, or outages. Further, the network is more flexible, and can dynamically allocate various network functions (e.g., network controller, coordination node responsibilities) to different nodes in the event one or more nodes lose a connection (e.g., the connection becomes stale or terminates). Each node may be independently communicatively coupled to the other nodes on the network such that communications may have myriad pathways or routes to travel from a sending node to a receiving node. In some examples, as discussed in more detail below, a network may comprise a coordination server node (e.g., root server), a network controller node, and/or other nodes responsible for managing network activity and implementing network configuration parameters. A coordination server node may have access to (e.g., be aware of the addresses to or public identities of) each of the nodes on the network, and may be responsible for facilitating the exchange of identity information associated with an external node (e.g., not an authorized participant in the network) and one or more participant/network nodes. A network controller node may be an in-network (e.g., "in band") controller and may implement network functionalities related to authenticating new nodes and/or issuing authentication tokens/credentials/certificates to external nodes.

In at least some examples, the network controller node, the coordination node, and/or other managerial nodes in the network may operate as operational modes on existing nodes. In other words, any given node in a network may execute an operational mode related to coordination or network controller responsibilities. Such techniques improve the redundancy of the network and improve reliability and scalability by allowing any network-connected node to implement the facilitation and authentication parameters associated with managerial nodes. As a nonlimiting example, a node acting as a network controller node may lose network connectivity (e.g., the device associated with the node may be compromised), and the network (e.g., the stale/compromised node) may initiate or otherwise execute a failover technique (e.g., transmit a failover notification/message/warning) where the responsibilities of network controller are handed off or reallocated to a different node on the network. The other node(s) on the network may be alerted to such and may seamlessly maintain communications with the new network controller node. As a result, the network can dynamically allocate responsibilities of various managerial nodes, thereby improving the reliability of the network by ensuring there is no single point of failure or outage that may affect the greater network. Further, the security of the network is increased, as a compromised node (e.g., subject to an intrusion/penetration attack) may lose its responsibilities (e.g., by dropping them at the node level or by a different node alerting a network controller/coordination node) and may be isolated from further communications with the network.

In some examples, a node may receive user input data from a user (e.g., at a user device), where the user data indicates a first instance of a client application. That is, a user may initialize, implement, or otherwise instantiate a first instance of a client application on a device, and the first instance associated with the device may constitute an online, disconnected node. An online node may not be associated with (e.g., a participate in) a network without executing an authentication process. Thus, the first instance of the first client application may be permitted to browse publicly accessible networks or coordination server nodes but is not an active participant on any given network until it is an authenticated member of the network(s). The online node may be capable of communicatively coupling to one or more other nodes in a network.

In some examples, a node may determine, based on initialization of the first instance of the client application and a first user device associated with the first instance, a static identity associated with the first instance. In examples, the first instance of the client application may be device agnostic. In other words, the first instance may be associated with a user rather than with a specific device. In such examples, the user who initialized the first instance may be able to transfer or initialize the first instance on a second device different than the initial device. As a nonlimiting example, a user may initialize a first instance of the client application on their smartphone. If their smartphone is compromised (e.g., lost, loses sufficient battery, performs suboptimally), the user may initialize on or transfer the first instance of the client application to their laptop computer and continue communicating with other nodes on the network. In such examples, the node may be associated with an identifier that is static, meaning it does not change if the device hosting the first instance of the client application is swapped out for another device. Such techniques improve the redundancy and flexibility of the network by maintaining network connections and node communications despite compromised devices. Further, by attaching or associating an identifier with the node (e.g., with the user) rather than with the device itself, the security of the network is enhanced because the other node(s) on the network can rely on the identifier rather than with the circumstances associated with the device (e.g., device settings/parameters, internet-protocol addresses, etc.). That is, the node remains authenticated and trustworthy despite changes to its underlying hardware or location.

In some examples, an identity of the first instance may comprise a public key and a cryptographically secure private key. In other words, each node in a network may comprise an encrypted key pair (e.g., a private key and a public key), where only the node itself stores or has access to its private key, but the node's associated public key can be accessed freely by other nodes on the network, for instance. Any person ordinarily skilled in the art will understand and appreciate the cryptography associated with sending encrypted data and decrypting that data by a private key of the receiving node. For the sake of illustration and not limitation, a sending node may encrypt a message (e.g., a data packet) using a public key associated with a receiving node. Even though the public key itself is available and insecure, various mathematical formulae make it practically impossible and unfeasible to determine the first node's associated private key and thereby decrypt the message. A receiving node receiving the message also comprises a public key and a private key, and only the receiving node is capable of decrypting the message using its associated private key. Such techniques allow for digital signatures to be associated with data transmissions between nodes in a network, which guarantee the authenticity and integrity of the data transmissions. By establishing a peer-to-peer network of nodes that each comprise a public/private key pair and encrypting data transmissions using the public/private key pair, the security and resiliency of the network is enhanced. The network as a whole, and the nodes individually, are fortified against malicious actors or attacks, improving the privacy and security of each.

In examples, a requesting node (e.g., an online node disconnected from a network) may identify a target node that is associated with (e.g., a participant in) a network. The target node may be associated with a second instance of the client application and may be communicatively coupled to one or more other nodes on the network with which the second node is associated. In examples, the requesting node may, in order to establish a connection with the target node and thereby authenticate itself as a participant on the network, identify a root server node associated with a third instance of the client application. The root server node may be communicatively coupled to the one or more other nodes on the network. The root server node may be an operational mode associated with a node on the network or it may be a separate node communicatively coupled to each one of the nodes on the network. In at least some examples, the first instance of the client application (e.g., the requesting node), the second instance of the client application (e.g., the target node), and/or the third instance of the client application (e.g., the root server node) are provided by the same service provider. In such examples, the instances of the client application may represent separate users who have initialized their own nodes on their own devices (e.g., brought their respective nodes online). For purposes of illustration and not limitation, the first instance, the second instance, and/or the third instance may comprise individually downloaded software packages configured to associate the respective devices with the capabilities and functionalities of network participation (e.g., make the devices capable of joining a network).

In some examples, the requesting node may encrypt, based at least in part on a public key associated with the target node, a packet. The packet may comprise the static identity associated with the first instance (e.g., the requesting node), and/or may comprise a request to communicate with the target node (e.g., a public key associated with the target node and/or an address associated with the target node, indicating that the requesting node wants to send a packet to the target node). The requesting node may transmit the encrypted packet to the third instance (e.g., the root server node), which maintains a connection with each node on the network. The third instance may receive the encrypted packet, communicate with a network controller node (e.g., send the static identity of the first node to the network controller) to determine whether the requesting node is an authenticated participant, and, based on the network controller's determination, transmit an indication to the requesting node indicating whether the requesting node has been authenticated or not. If the requesting node is authenticated, requesting node may receive an indication from the root server node that the requesting node has been communicatively coupled to the target node. As discussed in more detail below with regard to FIG. 3, the requesting node may, having routed an encrypted packet through the root server node on the network associated with the target node, established a direct connection with the target node (e.g., a hole punch), and may transmit and receive data directly to/from the second node. Additionally or alternatively, by becoming an authenticated node on the network, the requesting node may transmit and/or receive data to/from a different node on the network without routing it through any managerial nodes (e.g., without authenticating via a network controller node).

In at least some examples, the responsibilities and functionalities of managerial nodes on the network (e.g., root server node, network controller node, etc.) may be dynamically allocated to different node(s) on the network. In other words, any given node in a network may assume the operational mode and responsibilities associated with authenticating requesting node(s) and facilitating the exchange of encrypted data. Such techniques allow optimized resource allocation among the network, thereby improving network performance and reducing the potential for a transmission bottleneck where one or more nodes are tasked with facilitating/authenticating more data than they can process and the network bogs down. Additionally or alternatively, the responsibilities of the managerial nodes may be dynamically allocated to a different node if, for example, an acting network controller node loses its connection to the network (e.g., the connection becomes stale or the node goes offline). For the sake of clarity, in another example, a node acting as a network controller may transmit a request or otherwise caused to be executed a workload balancing. In such an example, the network controller node and/or a coordination node may allocate at least a portion of the network controller workload to a different node, thereby distributing the workload across multiple nodes and reducing resource burden(s) on the requesting node. Such techniques make the network redundant to comprised nodes, and allow uninterrupted network connectivity despite outages, errors, or otherwise with individual nodes.

Aspects of this disclosure further relate to an improved network architecture by implementation of a network controller operational mode associated with a node on the network. In some examples, a network of nodes may comprise a network controller node communicatively coupled to a root server node and/or to one or more other nodes in the network. The network controller node may receive a query. As in the example above, the network controller node may receive the query (e.g., the encrypted packet and/or information associated with the encrypted packet, such as the requesting node's static identity) from the root server node, or the network controller node may receive the query from an inquiry node (e.g., a requesting node online but disconnected from the network with which the network controller is associated). In some examples, the network controller node may determine, based at least in part on the query, an identity of the inquiry node (e.g., based on a public key associated with the inquiry node). The network controller node may additionally or alternatively determine an identity or address of a root server node associated with the network, where the root server node maintains a connection to all nodes in the network and facilitates exchange(s) of information between in-network nodes and out-of-network nodes.

In at least some examples, the network controller node may determine, based on the identity of the inquiry node, that the inquiry node is not an authorized participant in the network. In other words, the network controller may, based on the identity of the inquiry node, determine that the inquiry node is currently disconnected/isolated from the network, and is attempting to transmit data with an authorized member of the network (e.g., and thereby become an authorized participant in the network). The network controller node may be responsible for authenticating nodes for participation in the network. In at least some examples, the network controller node may authenticate the inquiry node such that the inquiry node does or does not become an authenticated participant in the network. The authentication may be done via one or more defined network parameters or network configurations (e.g., as set or determined by an administrator of the network), or otherwise.

The network controller node may, in some examples, issue or transmit an authentication token or certificate to the inquiry node, which may be configured to grant the inquiry node access to the network. In some such examples, the authentication token or certificate may be temporary and may lapse after a period of time. In other words, the inquiry node may receive authentication credentials from the network controller node that only lasts for a defined period of time. After the period of time has lapsed or expired, the inquiry node may repeat the authentication process through the network controller. In at least some examples, there may varying levels of authentication credentials that may correspond to different network permissions or authorization. As a nonlimiting example, the network controller node may issue high-level authorization credentials which grant greater permissions on the network. For example, the inquiry node with high-level authorization may be determined to be a candidate node for being allocated managerial responsibilities (e.g., of being allocated the responsibility of being a network controller node). In another nonlimiting example, the network controller node may issue low-level authorization credentials to the inquiry node, which may grant fewer permissions for the inquiry node in the network. For example, a low-level authorization may only allow the inquiry node to receive data transmissions from other authorized nodes on the network. In another nonlimiting example, a mid-level authorization may allow the inquiry node to send and receive data transmissions to/from other authorized nodes on the network but may not be a candidate for implementing network controller responsibilities.

In some examples, based on authenticating the inquiry node, the network controller node may transmit the identity of the inquiry node to the coordination node (e.g., root server node) such that the inquiry node is authorized to establish one or more connections with one or more node(s) on the network. The inquiry node may be associated with the authentication token/credentials that were granted/issued by the network controller node. In some examples, the functionalities and/or responsibilities of the network controller node may be implemented by an operational mode associated with an existing node in the network. As discussed in more detail below, the network controller node may not be a distinct node in and of itself and may instead be a node in the network that is dynamically allocated the responsibilities of the network controller node (e.g., authenticating potential new nodes, issuing authentication tokens, etc.).

Aspects of this disclosure further relate to an improved network architecture by implementation of a coordination server node (e.g., root server node) associated with one or more nodes communicatively coupled in a network. As discussed briefly above, a network may comprise a coordination server node responsible for managing the flow of network traffic, implementing and enforcing network parameters, facilitating the exchange of node identities/addresses such that node(s) can establish direct connections with each other, and so on. In some examples, the coordination server node may be a distinct node on the network and may be hosted by a remote service provider (e.g., a cloud server). In other examples, the coordination server node may be an operational mode associated with an existing node in the network. For example, a first network may comprise two or more nodes, each of which may be associated with a device in a different location. The first network may further comprise a coordination server node that may be associated with (e.g., hosted by) a remote computing device (e.g., a cloud server) in a different location. In such an example, the two or more nodes in the network may maintain connections to other individual nodes in the network and may additionally each maintain a connection to the coordination server node. In another example, a second network may comprise two or more nodes that are each individually communicatively coupled to one or more other individual nodes in the network. In the second network, however, the coordination server node may be implemented or executed by at least one of the two or more individual nodes on the network. In other words, an existing node on the second network may be responsible for carrying out the functionalities associated with the coordination server node, either permanently or temporarily (e.g., for a defined number of cycles, days, or for a determined quantity of network interactions/communications, etc.).

In some examples, the coordination server node may receive a network query from a first node (e.g., the requesting node or the inquiry node), where the first node is disconnected from one or more second nodes in a network. In other words, the first node may be online but isolated from/external to the network with which the coordination server node is associated. The first node may transmit a query to the coordination server node indicating a request to communicate with a node on the network, to join the network as an authenticated participant, to receive network configuration information associated with communications on the network, and so on. Based at least in part on the network query, the coordination server node may determine a first identity associated with the first node, wherein the first identity comprises a first address of the first node. As discussed above, the first node may comprise a public/private key pair, and the coordination server node may determine the public key associated with the first node and/or an address of the first node.

In examples, the coordination server node may additionally or alternatively determine a second identity of a second node from the one or more nodes on the network. In other words, the coordination server node may, based on the network query received from the first node, determine a second node (e.g., an authenticated participant) associated with the network with which the first node is attempting to communicate with. The coordination server node may determine the public key and/or address associated with the second node.

In examples, the coordination server node may determine that the first node is not an authorized participant in the network. The coordination server may execute one or more network configuration parameters (e.g., a node "look up") based on the identity of the first node, and determine that the first node is online but external to/isolated from the network that the second node is a participant in. In such an example, the coordination server node may transmit the identity of the first node to a network controller node (or, e.g., an existing node in the network that is configured to implement the responsibilities of the network controller operational mode). As discussed above, the network controller node may authenticate the first node and, based on successfully authenticating the first node, issue a temporary authentication token/credential that grants the first node access to participate in the network for a period of time. The coordination server node may, based on receiving an authentication token associated with the first node (e.g., issued by a network controller), transmit the address associated with the second node to the first node. The coordination server may additionally or alternatively transmit the address and/or identity of the first node to the second node such that the first node and the second node can establish a direct link (e.g., line of communication).

In some examples, the coordination server node may transmit one or more network configuration parameters to the first and/or second node. In such examples, the coordination server node may communicate additional information to the first node and/or the second node that may help them establish a communication link. For example, the coordination server node may provide the first node and/or the second node with a public address/key of the node(s), a network address translation (NAT) type, a network communication protocol (TCP, UDP, or other protocol for data transmission), access control parameter(s) (encryption settings, authentication credentials, VPN configuration, firewall rules, etc.), connection management parameter(s) and/or any other information that may be useful for establishing a direct connection between the first node and the second node.

In some examples, the coordination server node and the network controller node may each be operational mode(s) that can be implemented or carried out by individual nodes in a network. In such examples, the coordination server node may not be a distinct and separate node on the network, but instead may be performed by an authenticated node on the network (e.g., a node that has been granted permissions to enforce or administer the network configuration parameters). By applying such techniques, the resiliency and redundancy of the network is improved, as there is no singular point of failure that may cause network-wide outages or issues. In other words, by dynamically allocating the responsibilities of the coordination server node and/or the network controller node, the network is much less vulnerable to outages or compromised nodes than traditional network infrastructures often are. Further, the improved network architecture techniques described herein reduce the likelihood of network traffic bottlenecks by allowing users to define network configuration parameters and to reallocate the responsibilities and functionalities associated with coordination servers and/or network controller nodes. In addition, doing so improves the adaptability and flexibility of the network, making it more robust and less vulnerable to changes in network traffic or network structure (e.g., a large quantity of new nodes attempt authorization at or near the same time).

As a nonlimiting example, if a first node in a network is acting as a coordination server node and a second node in the network is acting as a network controller node, they may share their responsibilities or otherwise reallocate some portion of their obligations with other authenticated nodes on the network. In such an example, if the first node acting as the root server unexpectedly receives a significant increase in network inquiries, the first node may dynamically reallocate some amount (e.g., half) to a third authenticated and trustworthy node in the network, and the third node may assume the functionality/responsibility of a coordination server by deploying a coordination server operational mode. By distributing the load of network inquiries across multiple nodes in the network, the network experiences a reduced latency associated with network communications and increases the efficiency with which network inquiries can be handled/processed.

Similar techniques may be applied to other managerial nodes that may be responsible for implementing or administering network configuration parameters. As an additional nonlimiting example, a coordination server node that is processing a large influx of network inquiries may transmit an indication to the network that fourth and fifth authenticated, trustworthy nodes on the network are temporarily acting as network controllers. The fourth and fifth nodes may deploy or otherwise implement a network controller operational mode such that they receive the identities of requesting nodes, authenticate them according to one or more network parameters, and/or issue authentication tokens to the requesting nodes such that the requesting nodes can join the network and communicate directly with other nodes on the network. By dynamically allocating at least a portion of the network controller responsibilities to other authenticated nodes on the network, the network itself is more flexible and is capable of adapting to changes in network activity and/or network structure.

Aspects of this disclosure further relate to an improved network infrastructure by implementing a software defined networking layer that may comprise one or more packet processing modules. One or more packet processing modules may define network activity and/or communications or may otherwise administer various rules or configuration parameters associated with the network. By applying the techniques discussed, one or more user(s) can create a peer-to-peer, decentralized network that operates according to any number of defined packet processing modules. For example, any of the techniques herein may be applied individually or in combination to generate a cryptographically addressed, peer-to-peer network of nodes, where each node may be associated with an instance of a client application on a user device.

As discussed above, a network may comprise one or more node(s) communicatively coupled to each other and/or to a coordination server node. Each node may comprise one or more packet processing modules (e.g., a network kernel), which themselves may each comprise one or more configuration parameters. Packet processing modules may generally define rules for the activity and facilitation of inter-node communications on the network. Configuration parameters may be rules or protocols that define how each node processes incoming and outgoing data transmissions, and alone or in combination define the rules implemented by the packet processing module(s). For example, a node may receive, at a device associated with the node, user input data. The user input data may comprise a first device-agnostic instance of a client application. The node may determine, based at least in part on the user input data, a configuration parameter of a packet processing module. For example, a user may define a configuration parameter on a device associated with the first instance of the client application and may transmit or otherwise implement the configuration parameter at the node associated with the first instance of the client application. The packet processing module may be responsible for administering and enforcing the configuration parameter as it may have been defined by the user.

There are myriad configuration parameters that a user may define and/or change. For example, a user may define a configuration parameter to log information associated with all incoming and/or outgoing data transmissions (e.g., fingerprint network activity), to passively monitor all network activity and watch for suspicious communications or activities, to define a network and/or firewall protocol such that two or more nodes can seamlessly and efficiently communicate data between each, and so on. Configuration parameter(s) may be highly customizable and may grant user(s) in a network broad authority to define network or node activity (e.g., network traffic, node transmissions, data flows, and so on). Additionally or alternatively, different node(s) on the network with different levels of authority/permissions may be limited in what they can define configuration parameters to alter. For example, a node in a network with fewer permissions (e.g., less authority) may be authorized to define configuration parameters associated with the node (e.g., incoming/outgoing data transmissions), but may not be authorized to define configuration parameter(s) that define rules for network-wide activity. That is, the node may not be authorized to define rules that affect network activity/communications between other nodes on the network and may be limited to defining rules for the only the node itself.

The node may, based on the configuration parameter, update a functional capability of the node. In other words, the node may compile or otherwise cause to be executed the configuration parameter, which may thereby update one or more functionalities of the node. In at least some examples, the node may update its functional capabilities in isolation from the network. In such examples, the node may implement a user-defined configuration parameter to alter the packet processing module separate and disconnected from the network and/or from the communication links between the node and one or more other nodes on the network. For purposes of illustration and not limitation, a user may define a new configuration parameter at a node that prescribes logging (e.g., fingerprinting) incoming and outgoing data transmissions. The configuration parameter may be implemented by the packet processing module at the node without effecting other node(s) on the network or the network configuration parameter(s) generally (e.g., the user may implement the updated configuration parameter on only their node, i.e., in a "sandbox."). The user may test the configuration parameter at their own node before implementing it across one or more other nodes on the network. Such techniques increase user control and decision-making regarding how the network is set up, without making the network vulnerable to bugs or otherwise suboptimal configuration parameters. Users in a network may test, in an isolated environment (e.g., disconnected from other nodes and/or network communications), various configuration parameters before implementing them network-wide (e.g., on one or more nodes in the network). Such techniques improve the flexibility of the network, allow user(s) to sandbox various changes to the network and/or to the functionality of individual nodes, and improve the overall performance of the network by giving users greater authority in optimizing how network and node resources are allocated around the network. Users may define network policies in a transparent, isolated manner such that other nodes on the network can rely on the validity and reliability of the configuration parameter(s).

In at least some examples, the node may receive a packet form a third node of the one or more second nodes in the network. In some such examples, the third node may comprise a second device-agnostic instance of the client application that may be associated with second device. The initial node (the one that defined and/or "sandboxed" the configuration parameter(s)) may transmit or otherwise associate the updated functional capacity with the packet received from the third node. In other words, the packet received from the third node may comprise one or more configuration parameters and may be associated with a request for the updated configuration parameters. The initial node may update the packet and/or associate information with the packet such that the third node may update its functional capability based on the defined configuration parameters. For example, upon receipt of the packet from the third node, the initial node may associate location information (e.g., location in a network, location of a specific node, location on a different network, etc.) that may house the updated configuration parameter(s), and the third node may transmit data (e.g., a request, a packet, the configuration parameter(s)) to the location such that the configuration parameter(s) of the third node can be updated accordingly.

In other examples, the packet received may comprise an old (e.g., not updated) configuration parameter, and the receiving node may update the old configuration parameter prior to transmitting a second packet back to the third node (e.g., with the updated configuration parameter). In such an example, the third node may receive the second packet with the updated configuration parameter and may implement or cause to be implemented the updated configuration parameter at the third node (e.g., by updating/downloading an update and applying the update to the second instance of the client application). Such techniques give greater control to users of a network and allow distribution of computing resources (e.g., processors, time, energy) such that individual users may improve the features and functionalities of node(s) and/or the network itself and may "push" those changes to other nodes on the network (e.g., to nodes that send a packet requesting the updated configuration parameter(s)). By allowing individual user(s) to transparently implement, test, and validate myriad configuration parameters, each node on the network may benefit from improved configuration parameters (e.g., optimized resource allocation, improved network communications, heightened security measures, more reliable communication links between networks, and so on). Such techniques also improve the security and reliability of the network by allowing users to test and validate various updates/changes to the node(s) structure and/or to the network itself, thereby reducing attack vector surface areas and making the network less prone to outages/faults related to a single node or instance of the client application.

The examples provided herein are merely provided for purposes of clarity and are intended to be illustrative rather than limiting. One of ordinary skill in the art will understand and appreciate that the techniques discussed herein may be applied to a wide variety of contexts. Example implementations are provided below with reference to the following figures.

FIG. 1 illustrates an example environment 100 for implementing one or more of techniques described herein, in accordance with examples of this disclosure. For example, example environment 100 may comprise a first user 102, a second user 104, a third user 106, and so on. Each user may be associated with a device, as shown. For example, the first user 102 may be associated with a first device (e.g., a desktop computer or an instance of a virtual machine), the second user 104 may be associated with a second device (e.g., a laptop computer or a second instance of a virtual machine), and the third user 106 may be associated with a third device (e.g., a smartphone or tablet). Although the devices in the example environment 100 are depicted as a desktop, laptop, and a smartphone, the devices may comprise any user device capable of transmitting and receiving data. As depicted, the second user 104 and the third user 106 may be authenticated, authorized participants in the network 108. The network 108 may comprise one or more nodes, each of which may be communicatively coupled to the other nodes on the network 108. The network may, as discussed in more detail below, comprise a coordination server node 120 (e.g., a root server node) that may maintain connection(s) to each of the other nodes on the network. Although not depicted as a distinct node, the network may additionally or alternatively comprise a network controller node. In some examples, as discussed in more detail above, any one or more of the nodes on the network 108 may comprise a network controller operational mode or may be dynamically allocated some portion of the responsibility/functionalities of a network controller node.

Each device may be associated with an instance of a client application. Each instance of the client application may be provided by a service provider (e.g., each user may download the software such that their associated device(s) are capable of communicatively coupling with one or more network(s)). For example, the first user 102 may initialize, instantiate, or otherwise cause their associated device to be capable of joining a network. That is, the first user 102 may initialize a first instance of the client application, the second user 104 may initialize a second instance of the client application, and the third user 106 may initialize a third instance of the client application, where each instance is provided by a software provider (e.g., a software-as-a-service (SaaS) provider). In some examples, one or more device(s) (or one or more instances of the client application running on the one or more devices) that are authorized participants (e.g., members) of the network 108 may be considered node(s). For example, the second user 104 may be associated with a second device that is operating as a first node on the network 108, the second user may be associated with a second device that is operating as a second node on the network 108, and so on.

In some examples, each node may comprise one or more processor(s) 110 and memory 112 communicatively coupled with the one or more processor(s) 110. The memory may store one or more components or instructions configured to perform various functionalities associated with a node on the network 108. The processor(s) 110 of each node may be any suitable processor capable of executing instructions to process data and perform operations as described herein. By way of example and not limitation, the processor(s) 110 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 112 may be an example of non-transitory, processor-executable computer-readable media. Memory 112 may store an operating system and one or more software applications (e.g., instance(s) of a client application), instructions, programs, and/or data to implement the methods described herein and the functions attributed to the various systems. Memory 112 may comprise, for example, one or more user interface(s) 114 and/or an instance of the client application 118. As discussed above, each device may download or otherwise implement an instance of a client application 118 such that the associated device is capable of joining a network and/or communicating with one or more other devices (e.g., other instances of the client application) in a network. In various implementations, memory 112 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 112 may include at least a working memory and a storage memory. For example, the working memory may be a high-speed memory of limited capacity (e.g., cache memory) that is used for storing data to be operated on by the processor(s) 110. In some instances, memory 112 may include a storage memory that may be a lower-speed memory of relatively large capacity that is used for long-term storage of data. In some cases, the processor(s) 110 may not operate directly on data that is stored in the storage memory, and data may need to be loaded into a working memory for performing operations based on the data, as discussed herein.

As depicted for purposes of illustration and not limitation, user 102 is not currently an authenticated participant in the network 108. As shown with a dotted line, user 102 may attempt to communicate with user 104, which is a node on the network 108. User 102 may send a request to communicate 124 with user 104, and by doing so inferentially request to join the network 108 (e.g., become an authenticated participant/member of the network 108). As shown, the request to communicate 124 may be sent directly to the second instance of (e.g., a public address associated with) the client application operated by the device associated with user 104. In other examples, user 102 may identify a network of nodes with which they wish to become an authenticated participant and may further identify a coordination server node 120 or network controller node associated with the network 108.

In some examples, each node on the network 108 may comprise a public/private key pair. The public key may be generally accessible to internal and external nodes (e.g., nodes authenticated to participate in the network as well as nodes outside of the network that have not been authenticated as participants), and the private key associated with each node may be kept secure/private (e.g., known/accessible only to the node with which the private key is associated). In some examples, an external node may identify a network of nodes with which it seeks to join and may locate the public key associated with the coordination server node 120 of that network. In some examples, an identity/address of the coordination server node 120 associated with various joinable networks may be hosted in a searchable database or other similarly accessible server. By doing so, when a new node comes online (e.g., initializes an instance of the client application), they may search/lookup or otherwise identify a list of networks that are joinable (e.g., accessible or available for connection). In some examples, a network may be closed off, meaning it may not be a candidate network for a new node to join. In such examples, the network 108 of nodes may be at capacity or otherwise may have determined that the network 108 is no longer available for new node requests/communications. For example, for networks with increased/heightened security measures (e.g., a military or government network), the coordination server node and/or the network identity may not be identifiable by a new, disconnected node. In other words, a network may be completely independent and self-hosted, and may operate within an entirely "air gapped" environment, disconnected from public internet or servers.

As depicted for the sake of clarity, user 102 may transmit a request to communicate 124 to the second user 104. To establish a link between the first user 102 and the second user 104, the first user 102 may encrypt a packet. If the user 102 transmits the request to communicate 124 to a public address of the second user 104, the first user 102 may encrypt a packet using a public key associated with the second node of the second user 104. As depicted by dashed/broken line, if the first user 102 instead identifies the network 108 with which the second user 104 is a participant, the first user 102 may transmit an encrypted packet to a coordination server node 120 associated with the network 108. In such an example, the first user 102 may encrypt a packet using a public key associated with the coordination server node of the network 108 with which the second user 104 is a participant. In some examples, the encrypted packet may comprise a network query and/or an identity (e.g., of the first user 102 node and/or the second user 104 node). The network query may comprise a request to communicate with a node on the network 108. For example, the network query may comprise a request to communicate with the second user 104 node and may accordingly include a public key or an address associated with the second user 104. The encrypted packet may additionally or alternatively comprise an identity of the node associated with the first user 102. In other words, the node requesting to join the network 108 ("the requesting node") may include, in the encrypted packet, an identity of the requesting node. The identity may be used by the coordination server node 120 and/or a network controller node to authenticate or otherwise verify the identity of the requesting node and to admit or deny access to the network 108 accordingly. In some examples, the requesting node may transmit the encrypted packet over one or more network(s) 122 (e.g., via the internet or via one or more remote computing device(s) connected to the internet).

In other examples, some implementations of the network 108 may be completely internet-agnostic or independent. In other words, a network 108 may comprise a plurality of nodes, each of which may be completely isolated from the internet (e.g., including the root server node). In such networks, a requesting node may only be able to request to join the network 108 if they know a public and/or private address of the network 108. That is, some networks may operate without "touching" the internet at all, meaning there is no risk of data leaking outside of the isolated network.

In some examples, a coordination server node 120 may receive the encrypted packet and authenticate the first user 102 as a member or nonmember of the network 108. In other examples, the coordination server node 120 may transmit the packet and/or the identity to a network controller (e.g., a different node administering a network controller operational mode) which may be responsible for crosschecking the identity of the first user 102 to determine if the first user 102 is an authenticated participant. The network controller may additionally or alternatively issue an authentication token (e.g., a certificate, credentials, etc.) to the first user, or to the encrypted packet transmitted by the first user 102. In examples, the authentication token is configured to grant access to the network 108 for a period of time. In other words, the authentication token may expire after a predetermined amount of time (e.g., 30 seconds, one hundred computing cycles, etc.). By issuing a temporary authentication token, the security of the network may be improved by ensuring that authentication credentials/certificates are not effective for more time than appropriate. That is, the quantity of outstanding tokens/certificates that may exist at any given time is limited to those which have not yet expired. Once each authentication token expires, there may be no outstanding authentication tokens/credentials, which decreases the risk that a node is able to bypass the network controller or coordination server node's authentication process.

The network controller and/or coordination server node 120 may, upon authenticating the first user 102 and/or issuing authentication credentials, transmit some or all of the encrypted packet to a node associated with the second user 104 with which the first user requests to communicate. In some examples, the coordination server node 120 may transmit the identity and/or address of the first node to the second node, and/or may transmit the entire encrypted packet along to the second node associated with the second user. In at least some examples, the coordination server node and/or network controller(s) may implement/execute each of their responsibilities without decrypting or otherwise disturbing the encryption of the encrypted packet. That is, the network controller and/or coordination server node may administer their responsibilities using only public key(s) associated with the nodes, and/or using the identity that the first user 102 may include in the encrypted packet. By doing so, the security and reliability of the network is improved by ensuring cryptographically secure data transmissions between both internal and external nodes.

Figure 2:
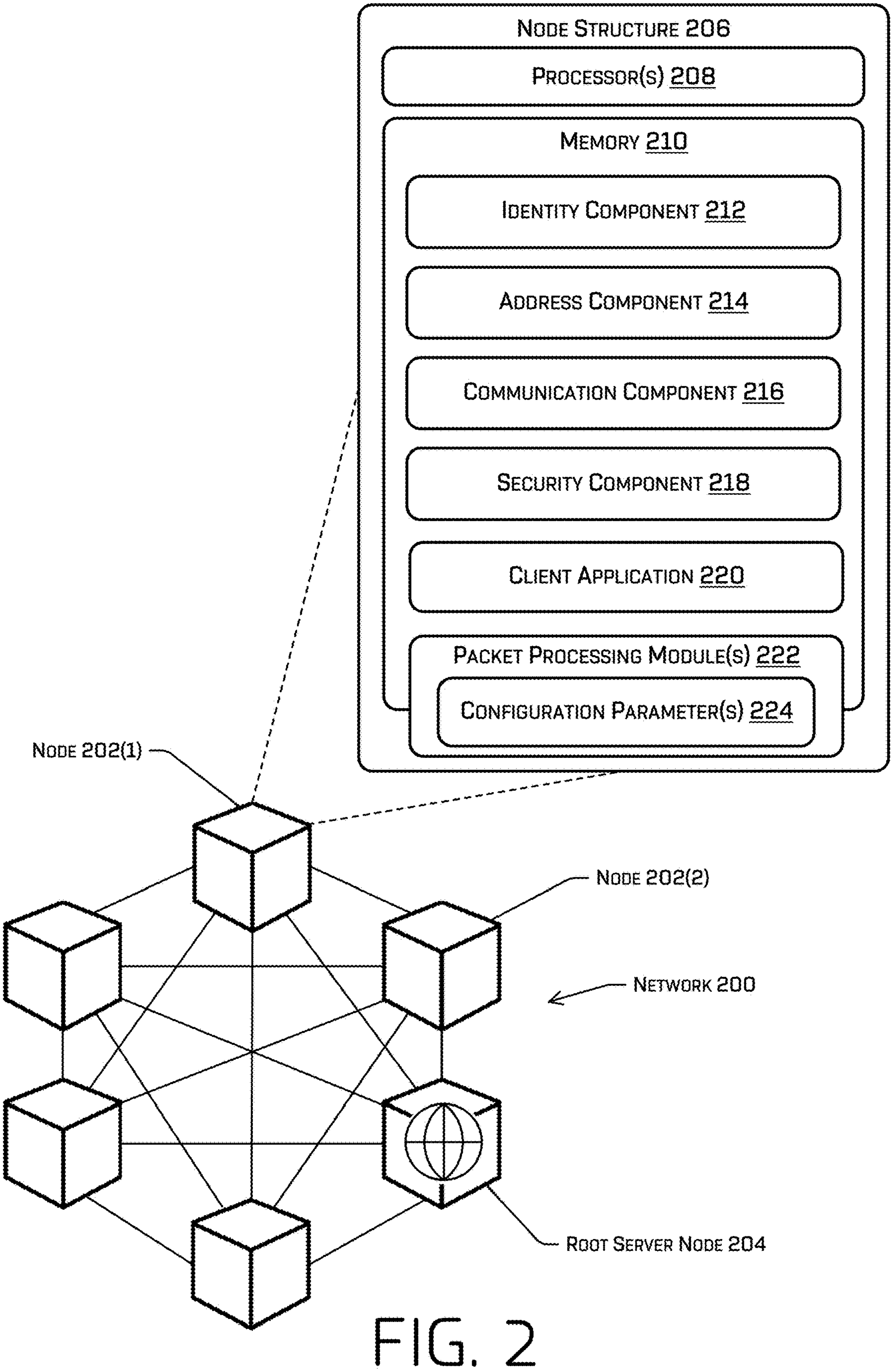
FIG. 2 illustrates an example network comprising one or more node(s), in accordance with examples of the disclosure.

FIG. 2 illustrates an example network 200 comprising one or more node(s) (e.g., node 202(1), node 202(2), etc.) Example network 200 and/or one or more of the node(s) on the network may further comprise a root server node 204. Example network 200 may be an correspond to an example implementation of network 108, node 202(1) and/or node 202(2) may correspond to node(s) as depicted in network 108. Root server node 204 may correspond to coordination server node 120.

As discussed above, each node on the example network 200 may be associated with a device, which themselves may implement or cause to be implemented one or more instances of a client application. In some examples, each device associated with example network 200 may comprise more than one instance of a client application, meaning each individual device may be associated with more than one node on the network. For purposes of illustration and not limitation, a single laptop computer associated with a user may comprise a first instance of a client application on the operating software of the laptop computer (e.g., may operate as a first node), and may further comprise a second instance of the client application on/in a virtual machine configured to run on the same laptop computer (and, e.g., may operate as a second node). In other words, a single device associated with a single user may be capable of operating or implementing more than one node in a network. Additionally or alternatively, in some examples, a single user may operate or implement a node on more than one device. For example, a user may implement a first instance of the client application on a smartphone and may implement a second instance of the client application on a desktop computer, meaning the user may operate or be responsible for two different nodes in a network, one on each device. Such examples may be applied alone or in combination, meaning a user has myriad different possibilities and ways to operate node(s) in a network.

In some examples, each node in a network (e.g., those depicted as participants in example network 200) may comprise a node structure 206. Node structure 206 is illustrated for purposes of clarity and not limitation, and persons of ordinary skill in the art will understand and appreciate that each node may comprise myriad different systems, components, processes, techniques, applications, and so on. Each node in a network may comprise some or all of the depicted elements, and/or may comprise various different elements not explicitly shown in the figures discussed herein. Those depicted are included for the sake of clarity and not limitation. Additionally, although node structure 206 is depicted as being associated with an authenticated participant node on example network 200, the features and components of node structure 206 may apply equally to a disconnected node (e.g., online, but isolated from a network). In other words, the discussion with regard to node structure 206 may be applicable to node(s) that are not authenticated members/participants in a network.

For example, each node may comprise a node structure 206 that may comprise one or more processor(s) 208 and memory 210 communicatively coupled with the one or more processor(s) 208. The one or more processor(s) 208 may correspond to processor(s) 110, and memory 210 may correspond to memory 112. Memory 210 may store one or more components, instructions, processes, procedures, techniques, or systems configured to perform various functionalities associated with a node on the network. The processor(s) 208 of each node may be any suitable processor capable of executing instructions to process data and perform operations as described herein. By way of example and not limitation, the processor(s) 208 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 210 may be an example of non-transitory computer-readable media. Memory 210 may store an operating system and one or more software applications (e.g., instance(s) of a client application), instructions, programs, and/or data to implement the methods described herein and the functions attributed to the various systems. Memory 210 may comprise, for example, one or more user interface(s) and/or instance(s) of the client application. As discussed above, each device may download or otherwise implement an instance of a client application such that the associated device is capable of joining a network and/or communicating with one or more other devices (e.g., other instances of the client application) in a network. In various implementations, memory 210 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 210 may include at least a working memory and a storage memory. For example, the working memory may be a high-speed memory of limited capacity (e.g., cache memory) that is used for storing data to be operated on by the processor(s) 208. In some instances, memory 210 may include a storage memory that may be a lower-speed memory of relatively large capacity that is used for long-term storage of data. In some cases, the processor(s) 208 may not operate directly on data that is stored in the storage memory, and data may need to be loaded into a working memory for performing operations based on the data, as discussed herein.

In some examples, the node structure 206 associated with each node (e.g., in memory 210) may comprise an identity component 212, an address component 214, a communication component 216, a security component 218, a client application component 220 (e.g., instance(s) of a client application), and one or more packet processing module(s) 222. In some examples, the packet processing module(s) 222 may comprise one or more configuration parameter(s) 224, which may generally define node and/or network activity or protocols.

In some examples, identity component 212 may comprise an identity of the node on the network. The identity of the node may be publicly accessible, may be accessible only to authenticated nodes on the network, and/or may comprise identity information that may consist of a combination (e.g., a private key and a public key). The identity component 212 may comprise (e.g., house or store) data or information that uniquely identifies the associated node (e.g., IP address, MAC address, UUID, serial number, user profile information, account or profile identifiers associated with the instance of the client application network identity information (VPN, proxy, network routing information, Wi-Fi SSID), access control lists (ACLs), usage policies, and so on). In some examples, the identity component 212 may change (e.g., be dynamic) based on circumstances/conditions associated with the node (e.g., a location of the device implementing the instance of the client application). In other examples, the identity component may be static/unchanged despite changes in the circumstances/conditions associated with the node. By doing so, the transparency of the network and the node(s) is increased, and the portability of any given node is also increased, thereby allowing user(s) to implement the functionalities/capabilities of a node in distinct locations or on different devices, etc.

In some examples, the node structure 206 of any given node may additionally or alternatively comprise an address component 214. In some examples, the address component 214 may be a subcomponent of the identity component 212. In other examples, the address component 214 may be a separate component from the identity component 212. For example, the identity component 212 may be secure and encrypted, and may only be accessible to the node with which it is associated and/or a root server node 204 (or, e.g., a network controller node). In such an example, the address component 214 may be accessible to other nodes on the network (e.g., other authenticated nodes with which the node is communicatively coupled (e.g., has a direct communication link)), but the identity component 212 may remain secure/private. In some examples, the address component 214 may be used by the network controller node(s) and/or a root server node 204 to authenticate the identity of the node. As above regarding the identity component 212, the address component 214 may be dynamic (e.g., change based on a location of an associated device), or may be static (e.g., remain the same despite changes to the instance of the client application and/or the associated device).

Node structure 206 may additionally or alternatively comprise a communication component 216. The communication component 216 may be responsible for or capable of transmitting data (e.g., packets) to other nodes (e.g., those in a network that the communicating node is not a part of and/or those in a network that the communicating node is a part of). Additionally or alternatively, in at least some examples, the communication component 216 may receive incoming data (e.g., packets or messages) sent from other nodes (e.g., on the network or off the network associated with the receiving node). As discussed in more detail with regard to FIG. 3, the communication component 216 may be responsible for transmitting an encrypted packet (e.g., a request to communicate, inquiry, etc.) to a node in a network that the transmitting node is not authenticated on. The transmitting node may be authenticated by the network and may create or generate a direct communication link with the node on the network. In such an example, the transmitting node and the node with which the transmitting node wishes to communicate may perform a "hole punch" maneuver such that the two nodes are communicatively coupled and can send and receive data directly between them (e.g., rather than routing the transmissions through a coordination server node or otherwise).

In some examples, node structure 206 may additionally or alternatively comprise a security component 218. Security component 218 may store or house the encryption algorithms and/or public and private key pair associated with each node. Security component 218 may implement or execute the cryptography techniques discussed herein to encrypt packets or other data/information that may be transmitted to other nodes. In examples, the security component 218 may securely store the private key associated with a node and may implement one or more security measures in order to keep the private key secure. In some examples, security component 218 may receive transmissions from other nodes and may decrypt those transmissions using the node's associated private key. In other words, a first node disconnected from a network may encrypt a data transmission (e.g., to generate an encrypted packet) using a public key associated with a second node that is a participant on the network (e.g., via a security component 218 associated with the first node, using a public key stored or housed in a security component 218 of the second node). The second node may receive the encrypted transmission and may decrypt it using a private key stored or housed in security component 218 of the second node.

In some examples, node structure 206 may additionally or alternatively comprise a client application component 220. The client application component 220 may instantiate, initialize, or otherwise implement the features and functionalities associated with an instance of a client application. The client application component 220 may comprise various graphical user interface(s), backend/logic layer(s), database(s) (e.g., local or remote) or data storage, configuration(s) and setting(s), and myriad other processes, procedures, instructions, etc., that may be configured to allow an associated device to implement the techniques discussed herein. For example, a user associated with a device that the user wishes to operate as a node in a network may download or otherwise execute an instance of the client application (e.g., from or associated with a service provider). Executing the instance of the client application (e.g., on the device) may configure the device with the appropriate instructions, computer-readable media, etc. such that the device can communicatively couple to another node and carry out the techniques discussed herein. For example, the user may download a node structure 206 and/or package of software (e.g., computer-readable media associated with node capabilities/functionalities) from a service provider to a device, and the download may configure the device to operate as a node and/or to communicatively couple to one or more other nodes.

In some examples, the node structure 206 of each node may comprise one or more packet processing modules 222, which may generally define node activity (e.g., transmissions, encryptions, monitoring, etc.). Packet processing module(s) 222 (e.g., operating kernel(s) may reside in memory (e.g., as computer-readable media), and/or may be associated with hardware system(s) (e.g., I/O devices, processors, etc.). In other words, as depicted by FIG. 2, packet processing modules 222 may comprise instructions or protocols defined/stored in memory, but may additionally or alternatively be coupled to various hardware components of a node structure (e.g., a device). Packet processing modules 222 may, for example, comprise instructions or protocols related to data transmissions, traffic monitoring, process scheduling/management, memory allocation or management (e.g., load balancing), file system management, network protocols (e.g., socket management, packet routing/filtering), security and access control (e.g., permissions, privileges, audits), system calls and API services, power management (e.g., energy optimization, battery/thermal management), and so on. Packet processing modules 222 may comprise a plurality of instructions or processes related to any one or more components of a system. One of ordinary skill in the art will appreciate and understand the flexibility and adaptability of packet processing modules 222.

In some examples, packet processing modules 222 may comprise one or more configuration parameter(s) 224. The configuration parameter(s) 224 may define the rules or protocols implemented by the packet processing modules 222. In at least some examples, a user associated with a device may change, adapt, or otherwise define one or more configuration parameter(s) 224. Each configuration parameter(s) 224 may store instructions or protocols related to a specific component or process that a node may implement. As noted above, configuration parameter(s) 224 may additionally or alternatively be implemented by memory and/or may affect various hardware system(s) of a node.

Figure 3:
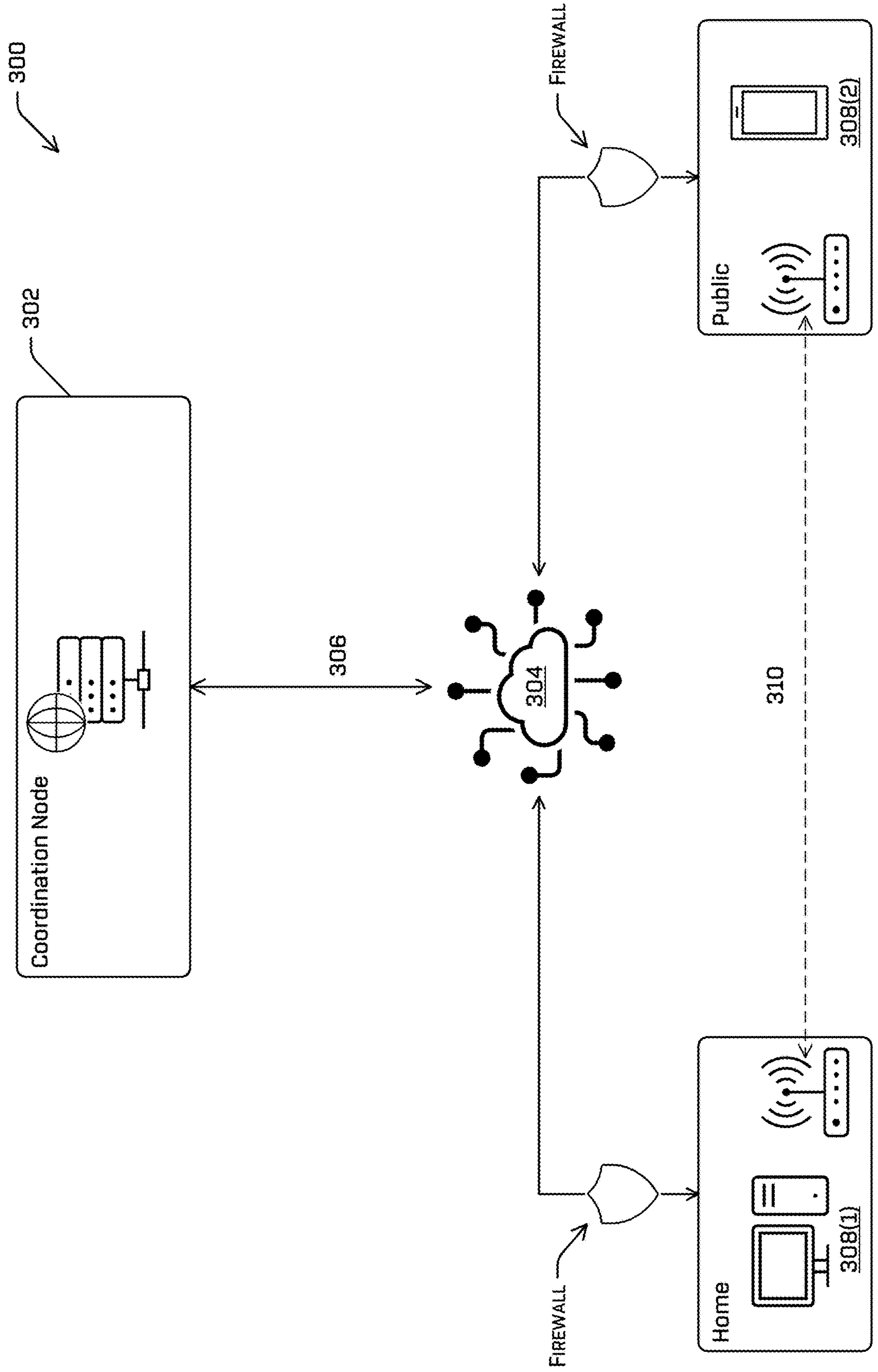
FIG. 3 illustrates an example environment associated with one or more nodes in a network communicating with each other, in accordance with examples of the disclosure.

FIG. 3 illustrates an example environment 300 associated with one or more nodes in a network communicating with each other, in accordance with examples of this disclosure. For example, coordination server 302 (e.g., which may correspond to coordination server node 120 and/or root server node 204) may be communicatively coupled to a network 304 of one or more nodes via a communication link 306. In at least some examples, the coordination server 302 may additionally or alternatively maintain communication link(s) with each individual node in a network 304. As depicted, network 304 may comprise a first node 308(1) and a second node 308(2). In some examples, network 304 may be publicly accessible internet, meaning the first node 308(1) and the second node 308(2) may be communicatively coupled to the coordination server 302 via Wi-Fi, or the web, etc. In the depicted example, first node 308(1) and second node 308(2) may comprise a firewall, which provides a security layer that monitors and controls incoming/outgoing data transmissions. For example, first node 308(1) and second node 308(2) may each maintain their own corresponding firewall, which may provide the same or different functionalities/capabilities. The firewall associated with first node 308(1) and with second node 308(2) may be maintained or defined by security component 218, and/or may have functions or features that are implemented by packet processing module(s) 222 (and/or configuration parameter(s) 224). Firewall(s) may be responsible for monitoring and/or controlling incoming/outgoing data transmissions (e.g., traffic filtering, access control, network segmentation, intrusion detection and prevention, stateful packet inspection, and so on). The firewall(s) may protect node(s) from receiving unknown or unauthorized communications and may discard unknown or unauthorized incoming data transmissions to ensure the security of node(s) and of the network more generally.

Firewall(s) may, in some examples, prevent a node from receiving a transmission from a non-malicious, but known node. In such examples, online but disconnected nodes (e.g., from the network) may be incapable of successfully establishing communication link(s) with new nodes in different networks. In such examples, the online node may route a communication/transmission through a coordination server 302 in order to authenticate itself and establish a communication link with a second node (e.g., exchange "handshake" or authentication messages/information through coordination server 302).

As depicted for purposes of illustration and not limitation, the first node 308(1) and the second node 308(2) may each maintain a communication link 306 with a coordination server 302. In some examples, the first node 308(1) and the second node 308(2) may communicate with each other by routing data or transmissions through the coordination server 302. Such a process may inconvenient and/or may introduce suboptimal performance issues (e.g., may be slower, may not work if the coordination server 302 has increased traffic flows, etc.). To avoid bottlenecked transmissions and communication, example environment 300 depicts the possibility of the first node 308(1) and the second node 308(2) establishing a direct communication link 310 (e.g., a "hole punch" maneuver, depicted in FIG. 3 as the dashed line). Establishing a direct communication link 312 may allow two or more authenticated nodes in a network 304 to send and receive data without routing the data through a coordination server 302 or otherwise. Such techniques may improve the performance of each node and of the network 304 more generally by distributing trustworthy communications across myriad nodes and their associated communication link(s). Moreover, such techniques may allow trustworthy, authenticated connections to avoid the full strength or impact of the security measures implemented by the firewall(s) of each node. Establishing a direct communication link 310 allows for more efficient communications between nodes and alleviates the traffic monitoring/relaying responsibilities of a coordination server 302, thereby improving the performance of the overall network.

As depicted in FIG. 3, the first node 308(1) may comprise a first device (e.g., virtual machine, desktop computer, etc.), which may be communicatively coupled to a first router configured to communicate with (e.g., send and receive data) other nodes on the network or outside of the network. The second node 308(2) may comprise a second device (e.g., smartphone or tablet) and may additionally or alternatively comprise a second router configured to communicate with other nodes. The first router and/or the second router may implement or carry out the functions of communication component 216 and may be "built in" to each respective device (e.g., be a component of the device/node), or may be a separate device/system associated with the respective node(s) and configured to facilitate communication with other nodes. As authenticated members in good standing of a network 304, the first node 308(1) and the second node 308(2) may establish a direct communication link 310 such that data can be transmitted without being routed through a coordination server 302.

In some examples, the direct communication link 310 may be temporary, meaning it may only be effective for a determined amount of time. In such examples, the node(s) may have to re-authenticate themselves with the coordination server 302 and/or with the network controller in order to re-establish the direct communication link 310. In other examples, the direct communication link 310 remains valid and effective as long as both nodes are good standing, authenticated participants in the same network.

Figure 4:
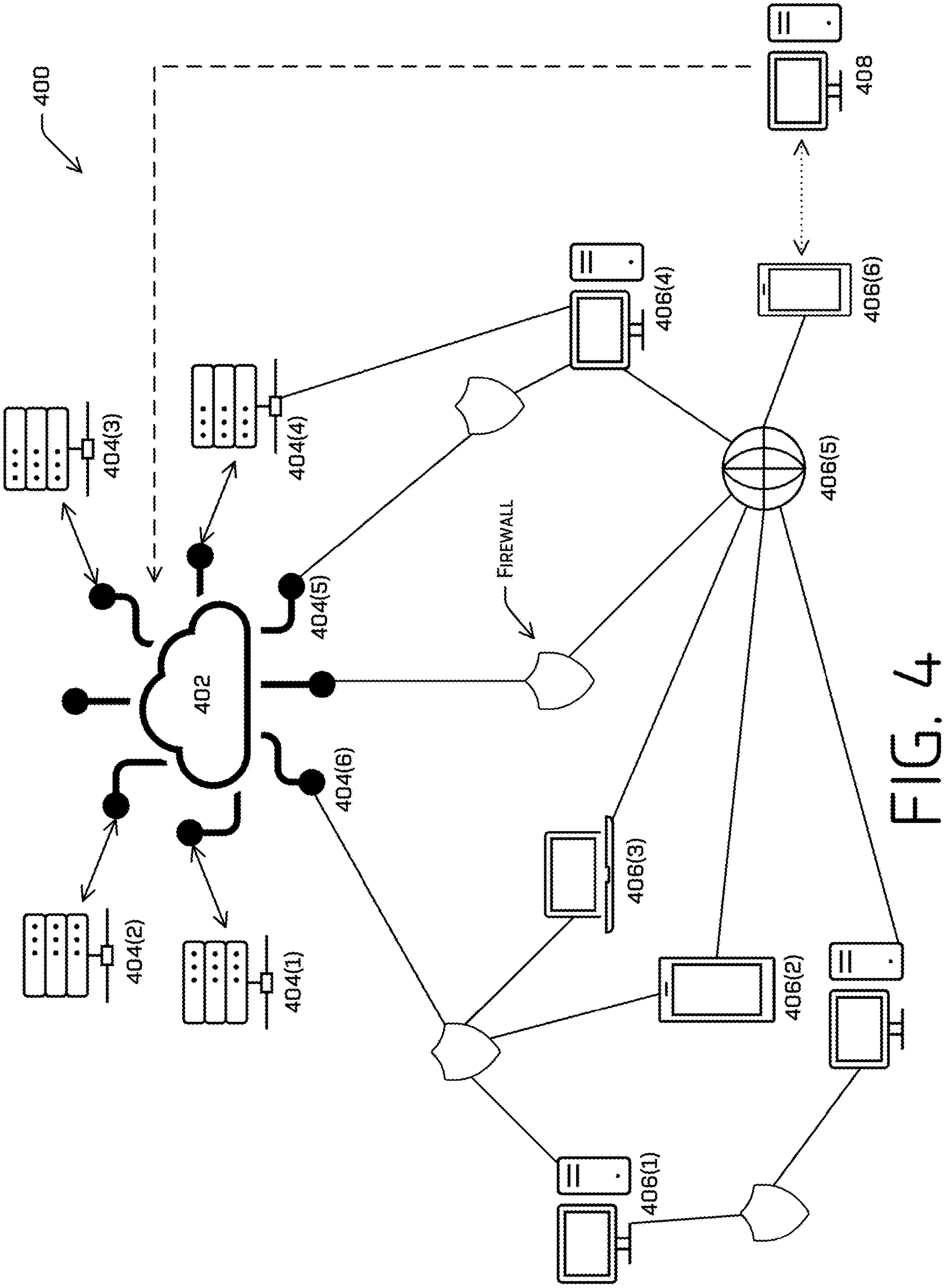
FIG. 4 illustrates an example network configuration comprising a plurality of networks and nodes, in accordance with examples of the disclosure.

FIG. 4 illustrates an example network 400 configuration comprising a plurality of networks and nodes, in accordance with examples of the disclosure. For example, example network 400 may comprise a coordination server 402 (which may correspond to coordination server 302, root server node 204, and/or coordination server node 120). For purposes of clarity and not limitation, coordination server 402 (e.g., a root server node or root server operational mode) is associated with a plurality of separate, individual networks (e.g., network 404(1), network 404(2), network 404(3), network 404(4), network 404(5), network 404(4)), each of which may comprise one or more node(s) (e.g., node 406(1), node 406(2), node 406(3), node 406(4), node 406(5)) communicatively coupled to the other nodes on each respective network. As depicted, each node may comprise a device and/or an instance of a client application, and/or may comprise a network. For example, node 406(5) is a private root server node, which may itself be communicatively coupled to one or more other nodes to form its own network. In other words, node 406(5) is a private root server node that is associated with a distinct network (e.g., a "downstream" or "branch" network).

In examples, the coordination server 402 may have access to each node in each network (e.g., by a public key or publicly accessible address of each node). That is, coordination server 402 may be a "planetary" coordination server and may be associated with (e.g., be communicatively coupled to or have access to) one or more "moon" servers (e.g., private server node 406(5)). Coordination server 402 may be "upstream" of the "downstream" root servers/networks, meaning coordination server 402 may have access to information associated with the network with which it is associated as well as each network that branches off of the network with which it is associated. As a more concrete example, coordination server 402 may comprise a plurality of individual networks (e.g., network 404(1), network 404 (2), network 404(3), network 404(4), and so on) that each branch off from coordination server 402. Further, node 406(5) may represent a private root server node for an additional network that is further branched off of a network associated with coordination server 402. In such an example, coordination server 402 may have access to information associated with node 406(5) as well as each node that is a participant in the private network associated with node 406(5) (e.g., public key(s), public address(es) or identities, quantity or identifiers associated with active participant(s), network traffic/communication data, etc.).

As a nonlimiting example for purposes of clarity, node 406(6) is depicted as being communicatively coupled to only node 406(5) (acting as a root server node for a private server) and is not directly communicatively coupled to coordination server 402 or any additional nodes. Notwithstanding, coordination server 402 may be "upstream" of node 406(5) and may thereby have access to the identity and/or address of node 406(6) (e.g., through the branched network associated with node 406(5)). For the sake of clarity and not limitation, an online but disconnected node (inquiry node 408) (e.g., not associated with any of the networks or nodes depicted) may request to communicate with node 406(6) (e.g., using a public key or address of node 406(6)). As depicted by a dotted line, inquiry node 406's request to communicate with node 406(6) may be futile at least in part because inquiry node 408 may be incapable of transmitting data directly to node 406(6) (e.g., because inquiry node 408 is not an authenticated participant of the network associated with node 406(5), of which node 406(6) is the only depicted participant. Further, inquiry node 408 may not be aware of or otherwise have access to information associated with the private network (e.g., because it is secure/private, or "hidden" from unauthenticated nodes). As such, inquiry node 406 may transmit data (e.g., an encrypted packet) "upstream" to coordination server 402 (as depicted by the dashed line). The data that inquiry node 408 transmits may contain an identity or address of node 406(6), and coordination server 402 may be able to locate node 406(6) because of its connection to the private server hosted by node 406(5). In other words, coordination server 402 may have access to information associated with each node in the network for which it serves as the coordination node, as well as to information associated with each node and/or network that emanate/originate (e.g., branch) therefrom. Such a pattern may repeat such that coordination server(s) further upstream have access to information associated with all nodes/networks downstream from it. For purposes of clarity, such a node/network configuration may facilitate the connection and association of new nodes to a network that were not previously connected and may facilitate communication between disconnected/isolated nodes and authenticated nodes in existing network(s).

As depicted for purposes of illustration and not limitation, each network may comprise one or more firewall(s) configured to secure network communications and maintain the security, privacy, and/or authenticity of network communications. In some examples, a single node may be associated with more than one network. For example, node 406(4) may be an authenticated member/participant of network 404(4) as well as the network associated with the private server root node (node 406(5)). In some such examples, an address and/or identity of node 406(4) may be static, meaning the identifier or location of node 406(4) is the same in network 404(4) and the network associated with the private server root node. In other words, a single user and/or device may be associated with an instance of a client application that is an authenticated member/participant in more than one network at any given time. Additionally or alternatively, a user may be associated with multiple devices, each of which may itself be associated with one or more instance of the client application. Each instance of the client application on each device may be a member/participant in one or more network(s). Each instance of the client application may comprise its own unique identifier and/or address, which may be based at least in part on the device (e.g., a MAC address or serial number) and/or user (e.g., authentication credentials) with which the instance associated. In other examples, the address associated with each instance of the client application may be generated independent of the device and/or user, which may strengthen the security of the node/network by reducing the risk of malicious actors or transmissions (e.g., making it more difficult to guess an identity or penetrate an authentication process).

Figure 5A:
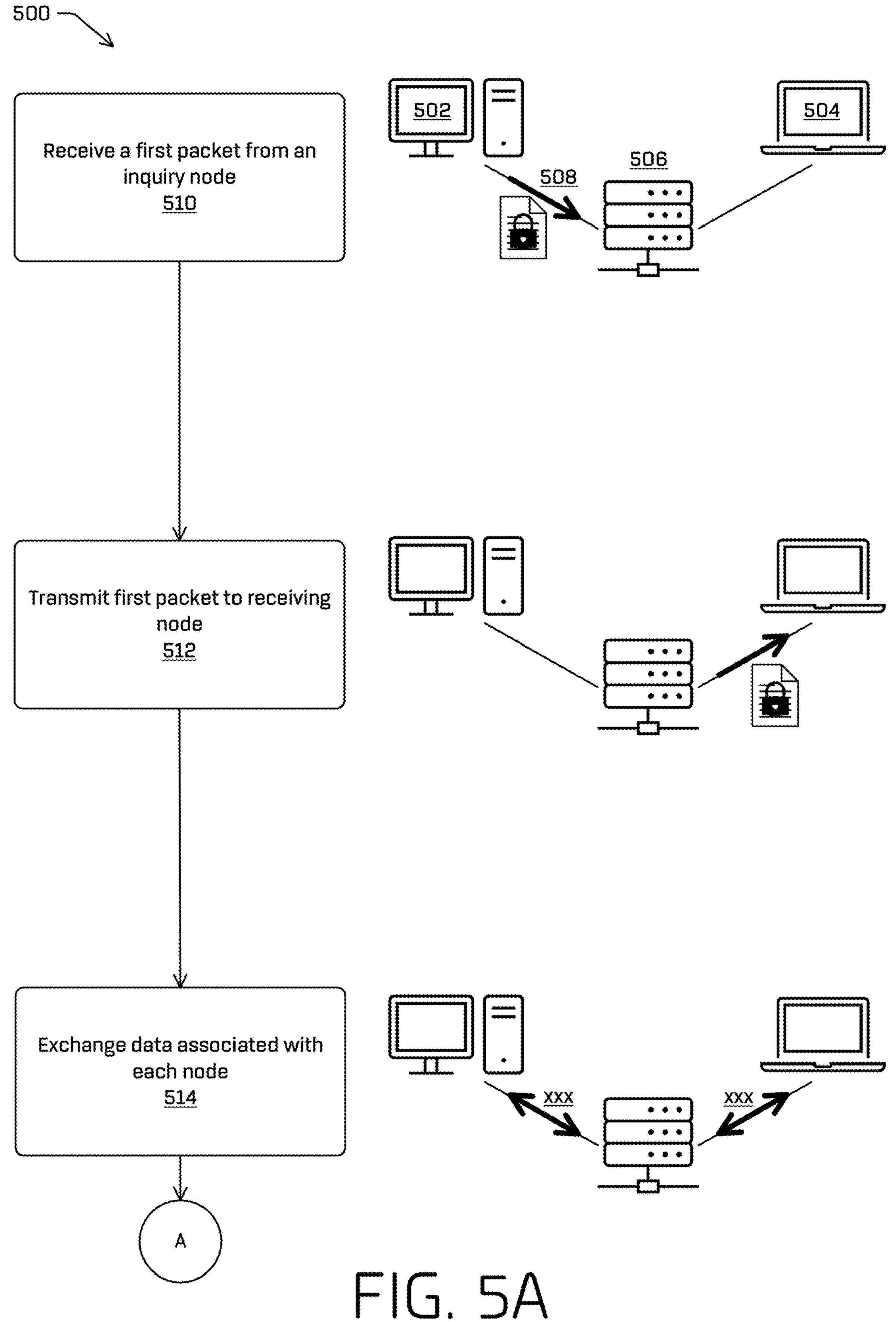
FIGS. 5A and 5B illustrate an example process for establishing a communication link between two nodes, in accordance with examples of the disclosure.
Figure 5B:
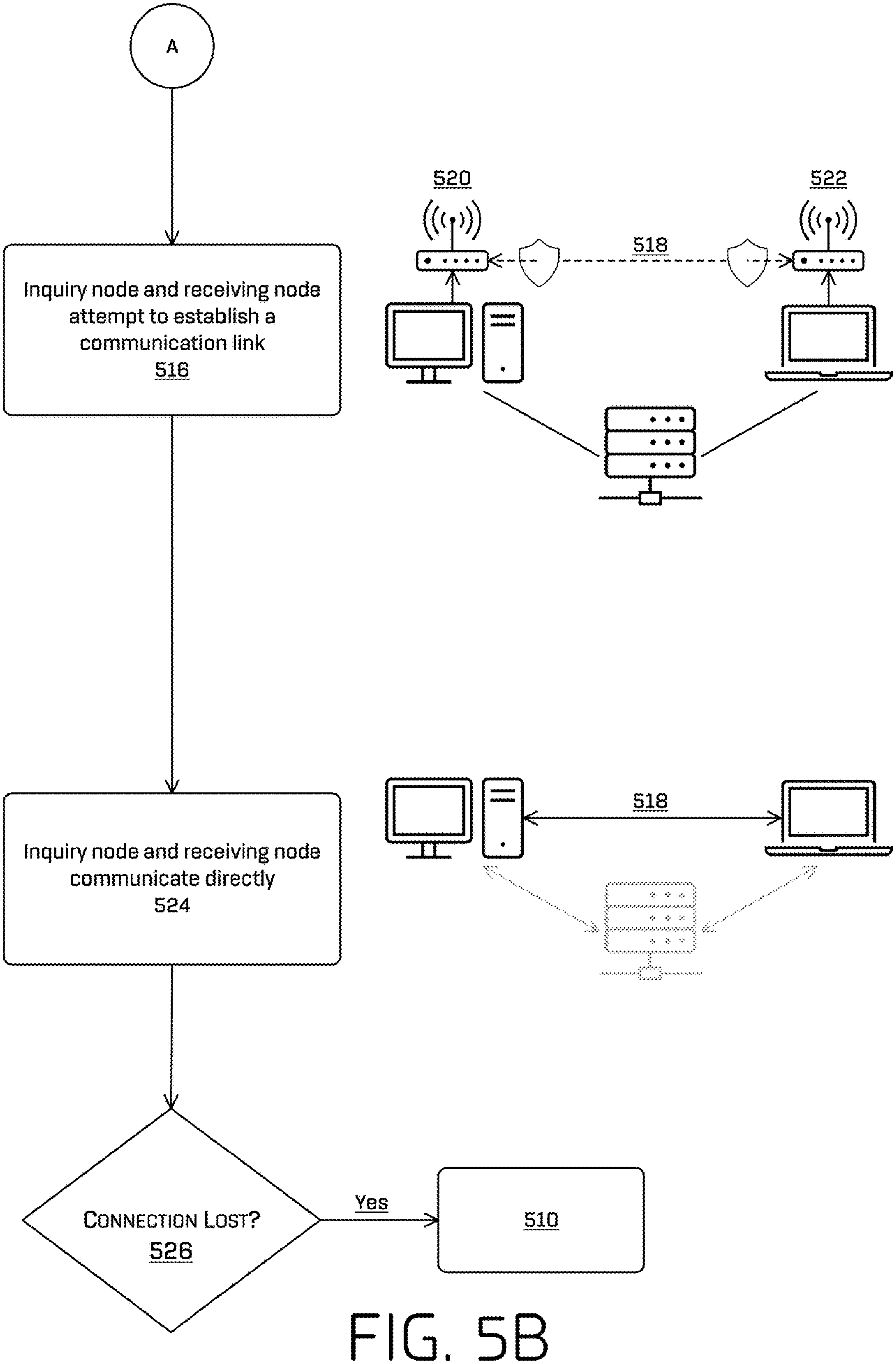

FIGS. 5A and 5B illustrate an example process 500 for establishing a communication link between two nodes, in accordance with examples of the disclosure. For example, as depicted for purposes of illustration and not limitation, example process 500 may comprise an inquiry node 502, a receiving node 504, and a coordination node 506. Coordination node 506 may correspond to coordination server node 120, root server node 204, coordination server 302, and/or coordination server 402. In the depicted example for purposes of illustration, inquiry node 502 is not an authenticated member/participant of a network associated with the coordination node 506 (e.g., inquiry node 502 is online (capable of communicatively coupling to one or more node(s)) but is not part of the network for which coordination node 506 is acting as a root server node). Further, receiving node 504 in the depicted example is an authenticated member of a network for which coordination node 506 is acting as the root server node. In other examples, both inquiry node 502 and/or receiving node 504 may already be part of the same network and may attempt to establish a direct communication link 310 to increase the efficiency with which they communicate (e.g., send and receive data). In other examples, neither inquiry node 502 nor receiving node 504 are authenticated members of a network but may establish a direct communication link 310 via one or more operations of example process 500 (e.g., to establish a network). In at least some examples, both inquiry node 502 and receiving node 504 maintain a communication link with (e.g., have access to an address or identity) coordination node 506.

At operation 510, example process 500 may comprise receiving, at the coordination node 506, a first packet 508 (e.g., encrypted packet, network query, etc.) from an inquiry node 502. The first packet may comprise (e.g., indicate) a request to communicate with a receiving node 504. Additionally, the first packet 508 may encrypted (e.g., using a public key of the receiving node) such that the coordination node 506 only has access to an address or identity of the inquiry node 502 and a public key of the receiving node. In examples, the coordination node 506 may determine an identity of the inquiry node 502 and/or the receiving node 504 based at least in part on the address associated with each (e.g., coordination node 506 may "lookup" the identities of either or both using their address(es)).

In some examples, coordination node 506 may transmit or otherwise rely on the functionality of a network controller to verify the identity of the inquiry node 502 and/or to authenticate the inquiry node 502. In such examples, the coordination node 506 may provide a third node (e.g., a dedicated network controller node and/or an additional node in the network executing the responsibilities of a network controller operational mode) with the first packet 508. The coordination node 506 may alternatively transmit an identity, address, and/or public key associated with the inquiry node 502 such that the network controller can authenticate the inquiry node 502. Coordination node 506 may receive an indication of the status of inquiry node 502 (e.g., that inquiry node has been authenticated, or that inquiry node 502 remains unauthenticated, etc.). For example, coordination node 506 may receive an authentication token or set of credentials from the network controller indicating that the inquiry node 502 has been verified and has at least temporary access to communicate with one or more nodes on the network. As discussed above, the network controller may issue temporary or permanent authentication token(s) to inquiry node 502, which may be communicated to coordination node 506.

At operation 512, example process 500 may comprise transmitting, to the receiving node 504 (e.g., to a public address associated with receiving node 504), the first packet 508. Coordination node 506 may transmit some or all of the data of the first packet. Based at least in part on determining that the inquiry node 502 is a valid, authenticated node (e.g., by receiving authentication token(s) from the network controller), the coordination node 506 may transmit the first packet 508 to the receiving node 504.

At operation 514, example process 500 may comprise exchanging information or data associated with each node (e.g., inquiry node 502 and/or receiving node 504) with the other node. For example, coordination node 506 may determine or predict (e.g., recognize) that inquiry node 502 and receiving node 504 are attempting to communicate with each other. To facilitate such communication, coordination node 506 may transmit information/data about each node with the other. For example, coordination node 506 may exchange the identity, address, public key, routing information, network protocols (e.g., TCP, UDP, etc.), and/or any other information to facilitate communication between the inquiry node 502 and the receiving node 504. In some examples, the inquiry node 502 and/or the receiving node 504 may additionally or alternatively relay data/information through the coordination node 506, as discussed in more detail above. In such examples, the inquiry node 502 and/or the receiving node may route information to the other node through the coordination node 506 (e.g., network location, NAT type, firewall or security protocol(s), etc.) such that the inquiry node 502 and receiving node 504 are better equipped to communicate directly with each other. In at least some examples, the exchange of information between the inquiry node 502 and the receiving node 504 occurs simultaneously, or within a threshold period of time (e.g., within one second, 50 computing cycles, etc.).

Turning now to FIG. 5B, at operation 516, example process 500 may comprise attempting to a communication link 518 between the inquiry node 502 and the receiving node 504. In some examples, communication link 518 is an instance of direct communication link 310 and facilitates transmission of data between the inquiry node 502 and the receiving node 504. As depicted, a first router 520 associated with the inquiry node 502 may transmit a signal or request directly to a second router 522 associated with the receiving node 504. In some examples, the inquiry node 502 and/or the receiving node 504 may comprise one or more security protocols or firewalls. Each node may use the information relayed from the other node through the coordination node 506 to address the security protocols appropriately such that the firewall(s) do not intercept and discard the transmission(s). In at least some examples, without executing the processes described herein, the security protocol(s) and/or firewall(s) may discard unknown transmissions or may discard transmissions from unknown or unrecognized sources (e.g., a node that is not part of the network and/or that has not transmitted directly before). By relaying pertinent data/information through the coordination node 506 at operation 514, the inquiry node 502 and the receiving node 504 may obviate the restrictive firewall(s) or security protocols of the other node, or at least be capable of satisfying rules/requirements of each to thereby establish a communication link 518.

At operation 524, example process 500 may comprise establishing the communication link 518 such that the inquiry node 502 and the receiving node 504 and send and receive data directly between one another. For example, once the communication link 518 has been established, the inquiry node 502 can transmit data directly to the receiving node 504, and vice versa. As depicted for purposes of illustration and not limitation, communication between the inquiry node 502 and the receiving node 504 may be accomplished without routing data through the coordination node 506. As shown in FIG. 5B, the coordination node 506 is greyed out, indicating that it is no longer involved in communication between the inquiry node 502 and the receiving node 504. In some examples, each of the nodes (e.g., the inquiry node 502 and/or the receiving node 504) may maintain a communication link with the coordination server. For example, each node may attempt to establish a direct communication link with a different node on the same network, or with a different node on a different network, and may transmit packet(s) through coordination node 506 to do so.

At operation 526, example process 500 may comprise determining that the communication link 518 between the inquiry node 502 and the receiving node 504 has been lost. In other words, inquiry node 502 is no longer able to send and/or receive to/from receiving node 504. Such may be the case, for example, if the connection becomes "stale" over time, if one of the two nodes goes offline or is otherwise no longer connected to the network and/or to the coordination node 506, if one of the two nodes "times out" and loses its authentication credential(s) due to inactivity or otherwise, and so on. There are myriad reasons and/or causes that may result in a lost or suboptimal communication link 518, and any person of ordinary skill in the art will understand and appreciate the variety of reasons/causes. If a communication link 518 between two nodes is lost or performs below a threshold level of acceptable performance, example process may return to operation 510 and one or more of the nodes may attempt to re-establish the communication link 518. In some examples, communication links may be effective and valid for a period of time and may be designed or configured to fail after the expiration of an amount of time (e.g., one month, one year, 18 months etc.). Such techniques may improve the security and performance of the network by limiting the number of unused or stale connections and ensuring that resources are not unnecessarily allocated to noncommunicative nodes. In other words, such techniques may ensure that nodes and communication links are active and valid, and terminating those that are not may allow for optimized distribution of network resources while decreasing the risk of malicious activity or actors to a node or network. In other examples, a communication link between two or more nodes may be valid and effective until one or more of the nodes affirmatively terminates the communication link (e.g., deletes the communication link, uninstalls an instance of the client application that configured the device to operate as a node, etc.).

Figure 6:
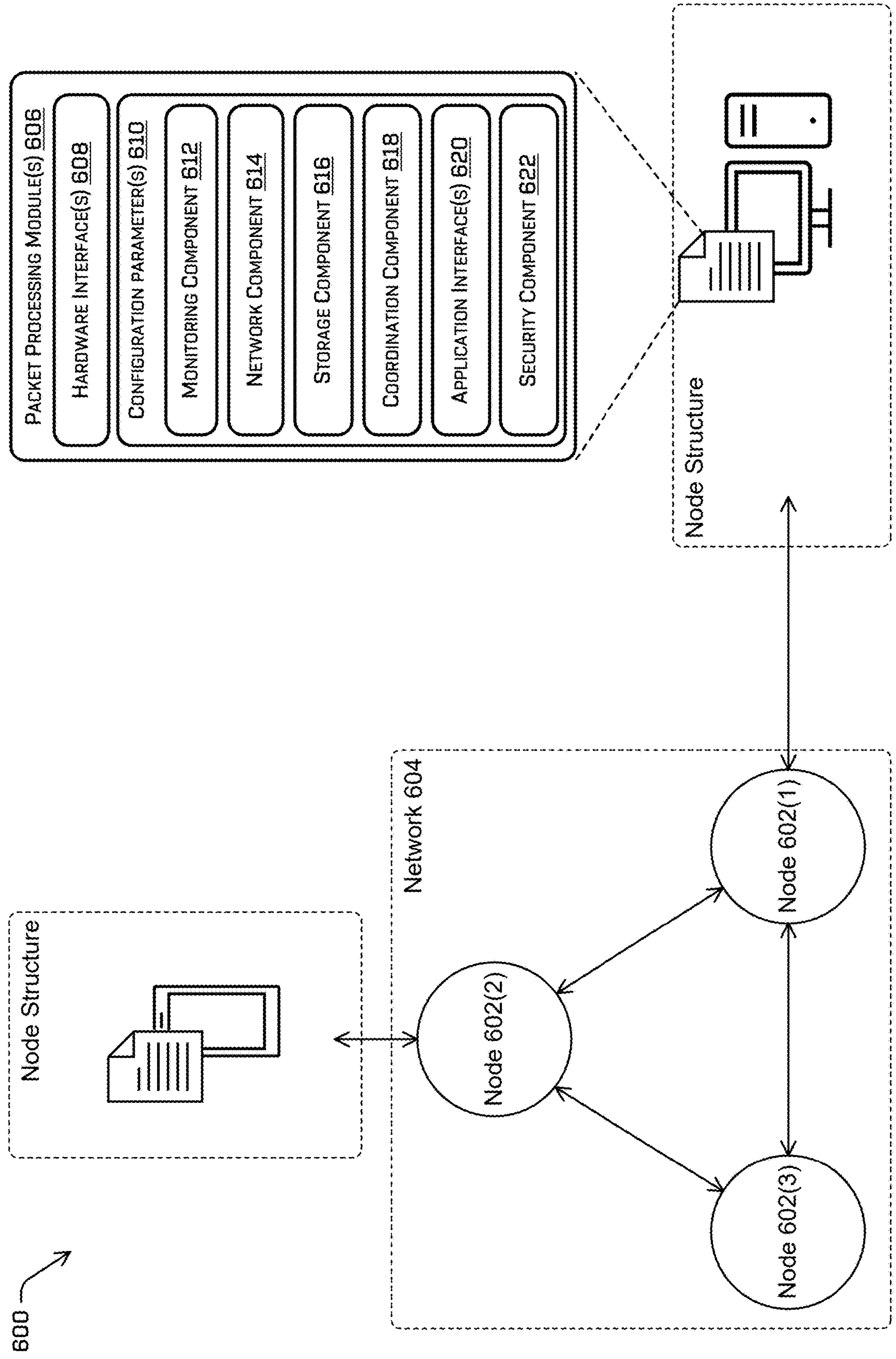
FIG. 6 illustrates an example configuration comprising a plurality of nodes, in accordance with examples of the disclosure.

FIG. 6 illustrates an example configuration 600 comprising a plurality of nodes, in accordance with examples of the disclosure. For purposes of illustration and not limitation, example configuration 600 depicts a network 604 comprising a plurality of nodes (e.g., node 602(1), node 602(2), and node 602(3)) each of which are communicatively coupled to the other nodes in the network 604. Each node in the network 604 may comprise a node structure, which may correspond to node structure 206. Each node structure may comprise one or more packet processing module(s) 606 (e.g., kernel(s)). As discussed above, packet processing module(s) 606 may define various node and/or network protocols, controls, rules, and/or activities. For example, at a high level, packet processing module(s) 606 may manage, coordinate, and/or administer a node's hardware and software resources. Packet processing module(s) 606 may interface with various hardware components and/or systems (e.g., processor(s) 110, processor(s) 208, first router 520 and/or second router 522, myriad input or output device(s) (e.g., keyboard, mouse, USB memory storage, CD-ROM), CPU (e.g., for memory allocation), and so on). As depicted in FIG. 6 for purposes of illustration and not limitation, packet processing module(s) 606 may comprise one or more hardware interface(s) 608 and/or one or more configuration parameter(s) 610. For example, the one or more hardware interface(s) may be configured to receive instructions (e.g., from a configuration parameter(s) 610) or determine processes related to one or more hardware system components of a device with which the node structure is associated. For example, hardware interface(s) 608 may interface with configuration parameter(s) 610 and/or any one or more hardware components of a device to carry out/implement/execute the myriad techniques and processes that configuration parameter(s) 610 may comprise.

In at least some examples, a node structure may comprise a plurality of configuration parameter(s) 610. Configuration parameter(s) 610 may, in some examples, comprise user-defined computer-readable media configured to implement myriad functionalities at the node level and/or at the network level. For purposes of illustration and not limitation, FIG. 6 depicts a plurality of possible configuration parameter(s) 610. In some examples, one or more configuration parameter(s) 610 may be standard and/or default and may be part of a node structure by virtue of initializing an instance of a client application. For example, a monitoring component 612 may be part of a software package that is downloaded or otherwise implemented when a user initializes/instantiates an instance of a client application on a device. In other examples, one or more configuration parameter(s) 610 may be added, removed, or otherwise changed by a user by, for instance, altering software code associated with the configuration parameter. In other words, a user associated with a node may personalize the functionalities and/or capabilities of the node by generating new configuration parameter(s) 610 and/or by making changes to existing configuration parameter(s) 610. By doing so, a user may trial, test, or "sandbox" their configuration parameter(s) 610 prior to transmitting them, if at all, to other nodes on the network 604.

In some examples, configuration parameter(s) 610 may implement one or more techniques, processes, procedures to activity associated with the node (e.g., incoming and outgoing transmissions), and/or with the network (e.g., a node acting as network controller may comprise configuration parameter(s) 610 associated with authenticating node(s)). For example, a monitoring component 612 may implement various processes related to monitoring network traffic (e.g., fingerprinting communications) and/or to monitoring node activity (e.g., user authentication attempts, etc.). In some examples, monitoring component 612 may, alone or in combination with one or more configuration parameter(s) 610, perform techniques related to intrusion or penetration detection.

In some examples, configuration parameter(s) may comprise a network component 614. Network component 614 may be responsible for, or house/store rules related to, various network protocols. Network component 614 may maintain one or more communication link(s) with other node(s) on the network, and/or may maintain access to a root server node associated with a network. Network component 614 may further manage network connections and data transmissions/transfers (e.g., maintaining various network protocols), and/or may administer various data routing procedures such that node(s) with direct communication links are not affected by firewall(s) associated with the nodes.

In some examples, configuration parameter(s) 610 may comprise a storage component 616. Storage component 616 may implement processes/procedures related to memory allocation and management (e.g., allocating space and handling data storage and retrieval, memory/load balancing, CPU time/memory allocation, and so on). Storage component 616 may additionally or alternatively implement, alone or in combination with one or more other configuration parameter(s) 610, storage procedures related to logging or otherwise storing network traffic and/or node activity for later use/retrieval. Storage component 616 may manage system calls or communications related to file server(s) associated with the node (e.g., accessing files on the device associated with the node or on a remote computing device communicatively coupled to the node/device).

In some examples, configuration parameter(s) 610 may comprise a coordination component 618. Coordination component 618 may, for example, implement techniques such that the hardware of the device with which a node is associated is abstracted, and the instance of the client application becomes device agnostic. Coordination component 618 may additionally or alternatively facilitate or manage the connections, links, and/or interfaces that may exist between node(s) in a network 604, between packet processing module(s) 606, between configuration parameter(s) 610, and/or any combination thereof. Coordination component 618 may synchronize various components or systems of a node to increase operational functionalize and assist in ensuring a smooth user experience. Coordination component 618 may, for example, coordinate authentication credentials with a network controller and/or root server node at various periods/time intervals such that a user of a device remains active and authenticated on the network 604 despite limited interaction(s).

In some examples, configuration parameter(s) 610 may comprise one or more application interface(s) 620. Application interface(s) 620 may store or implement rules related to the instance of the client application with which the node or device is associated. For example, the application interface(s) 620 may facilitate communications to/from a client application (e.g., software updates, warning messages/errors, etc.), may be responsible for initializing/instantiating/originating one or more instances of the client application, and so on. Application interface(s) 620 may additionally or alternatively facilitate or manage system call(s) and/or retrievals/calls to or from an application programming interface (API). For example, application interface(s) 620 may be configured to communicate with node(s) on separate networks and/or with various internet-/web-connected APIs to allow the device/node to retrieve/leverage data or information that may not be stored on or otherwise accessible to the device/node.

In some examples, configuration parameter(s) 610 may comprise a security component 622. Security component may implement or execute various authentication procedures, cryptography processes, encryption methods, and so on. Security component 622 may, for example, be at least partially responsible for encrypting packets (e.g., using a public key associated with a target/receiving node) that the node/device may transmit to another node in a network 604 (e.g., to a target or receiving node with which the node wishes to communicate directly to). Security component 622 may, in some examples, store or house the public/private key pair associated with each node or instance of the client application and may implement decryption procedures on incoming/received data transmissions using a private key. In some examples, security component 622 may implement authentication procedures associated with the node (e.g., authenticating a user's log-in credentials to access the client application) and/or with the network (e.g., if the node is operating as a network controller for a network).

One or ordinary skill in the art will understand and appreciate that the above example configuration parameter(s) 610 are depicted and described for purposes of clarity and limitation. Packet processing module(s) 606 may comprise many (e.g., dozens, hundreds, thousands, millions) configuration parameter(s) 610, and those depicted should not be construed as limiting. Additionally, any one or more configuration parameter(s) 610 may communicate with or operation in combination with any other configuration parameter(s) 610, further improving the portability, functionalities, and capabilities of a node and/or network. In some examples, user(s) may define or generate new configuration parameter(s) 610, may change/tweak existing configuration parameter(s) 610, and/or may remove configuration parameter(s) 610 altogether. Aspects of this disclosure relate to highly customizable node and network structures, and the potentially endless configuration parameter(s) 610 and combinations thereof allow users to manage and administer network/node activity in myriad ways. User-defined configuration parameter(s) 610 facilitate flexible and adaptable network environments and node structures by allowing user(s) to test and validate potential configuration parameter(s) 610 at their respective nodes. In some examples, a user may define or change a configuration parameter(s) 610, validate it locally (e.g., on their own device), and then transmit the configuration parameter(s) 610 to a network controller associated with the network 604. The network controller and/or coordination node may, in some instances, perform one or more separate authentication/validation processes/procedures (e.g., ratify or corroborate the validation/authentication), and may distribute the configuration parameter(s) 610 to other nodes on the network 604 accordingly. In such examples, there is no central server hosting and implementing network-wide packet processing module(s) 606, which improves the security and reliability of the overall network by decreasing the risk of outages (e.g., by decentralizing/partitioning/fragmenting the network and allowing each node to host/implement the packet processing module(s) 606 individually).

As discussed above, user(s) and/or node(s) may be associated with varying levels or classifications of authentication tokens (e.g., different levels of authority). In some examples, such levels of authentication may impact the configuration parameter(s) 610 that a user may "push" to a network controller or may affect the configuration parameter(s) 610 that the node has access to/is capable of changing). For example, a node with a lower level of authority may not be able to define or access configuration parameter(s) 610 related to the security procedures of a network but may be able to define or access configuration parameter(s) 610 related to logging node activity. In another example for the sake of clarity, a root server node (e.g., a node with a higher level of authority) may be capable of changing or defining any configuration parameter(s) 610 associated with the network. In other examples, configuration parameter(s) 610 that define network activity may require that a threshold quantity or percentage of node(s) on the network accept or approve of a network-wide change to a configuration parameter(s) 610 prior to it becoming effective for the network (e.g., being compiled/implemented at the root server node). Such a process may allow individual node(s) on the network 604 to validate/authenticate the configuration parameter(s) 610 locally, thereby increasing redundancy and helping to improve the reliability of the network 604.

Figure 7:
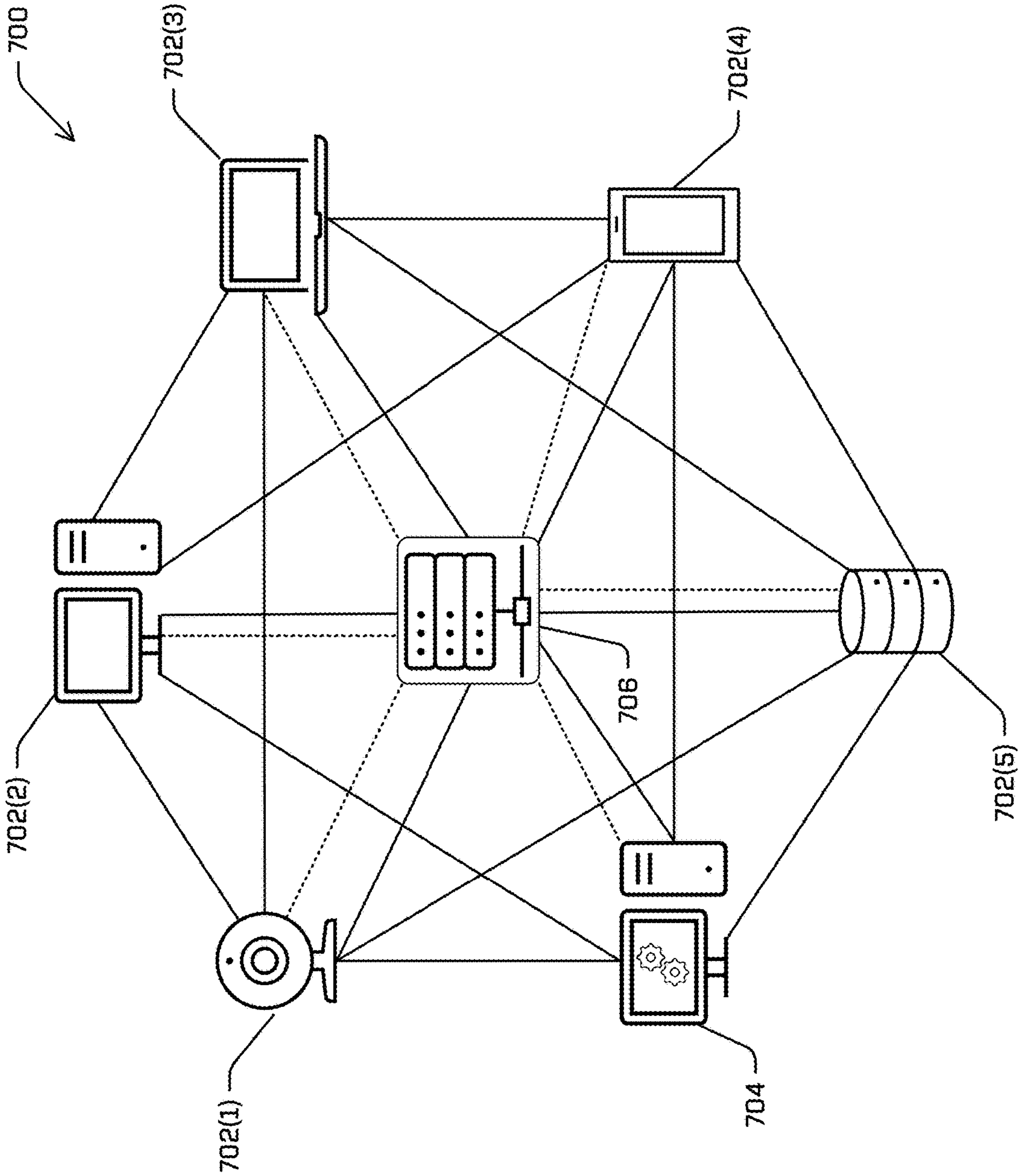
FIG. 7 illustrates an example configuration of a network comprising a plurality of nodes, in accordance with examples of the present disclosure.

FIG. 7 illustrates an example configuration of a network 700 comprising a plurality of nodes (e.g., node 702(1), node 702(2), node 702(3), node 702(4), node 702(5)). As depicted, each node may be associated with a device (e.g., any device capable of processing or executing computer-readable media). Any one or more of the node(s) depicted may correspond to any one or more node(s) described herein (e.g., node(s) in FIG. 1, node 202(1), node 406(1), and so on). Each device may comprise an instance of a client application, where each instance of the client application is initialized from or provided by a service provider. As depicted for purposes of clarity, the network 700 may further comprise a network controller 704. As discussed above, in some examples network controller 704 may be an operational mode associated with a network 700 (e.g., implemented by a node), and may not be a distinct node in and of itself. In such examples, one or more existing node(s) on the network 700 may be tasked with (e.g., allocated the responsibility of) implementing the functionalities/capabilities/responsibilities associated with a network controller (e.g., authentication procedures).

In some examples, network 700 may comprise a coordination node 706. Coordination node 706 may correspond to coordination server node 120, root server node 204, coordination server 302, and/or coordination node 506. As discussed in more detail above, coordination node 706 may be responsible for implementing/facilitating the exchange of information associated with authenticated node(s) on the network 700 and/or with external, unauthenticated nodes on the network 700. As depicted by dotted lines, each node on the network 700 may maintain a connection (e.g., be communicatively coupled with) the coordination node 706. As depicted by solid lines, each node on the network 700 may additionally or alternatively maintain a connection with one or more of the other node(s) on the network. In at least some examples, each node on the network 700 may be communicatively coupled to some or all of the other nodes on the network 700. In other words, any given node on the network 700 may or may not be communicatively coupled to each one of the other nodes and may be selective about which nodes to maintain connections with. As depicted for the sake of clarity and not limitation, each node on the network is communicatively coupled to all other nodes on the network 700 such that each node can transmit and receive data and communications directly with the other nodes, without routing data/packets through a coordination node 706 or network controller 704. Additionally, as depicted for the sake of clarity and not limitation, each node is communicatively coupled to the node acting as the network controller 704. The node acting as the network controller 704 is communicatively coupled to the coordination node 706 to facilitate the techniques, processes, and methods described herein (e.g., authentication of new nodes to the network 700, facilitation of data between in-network node(s) and out-of-network node(s)).

Figure 8:
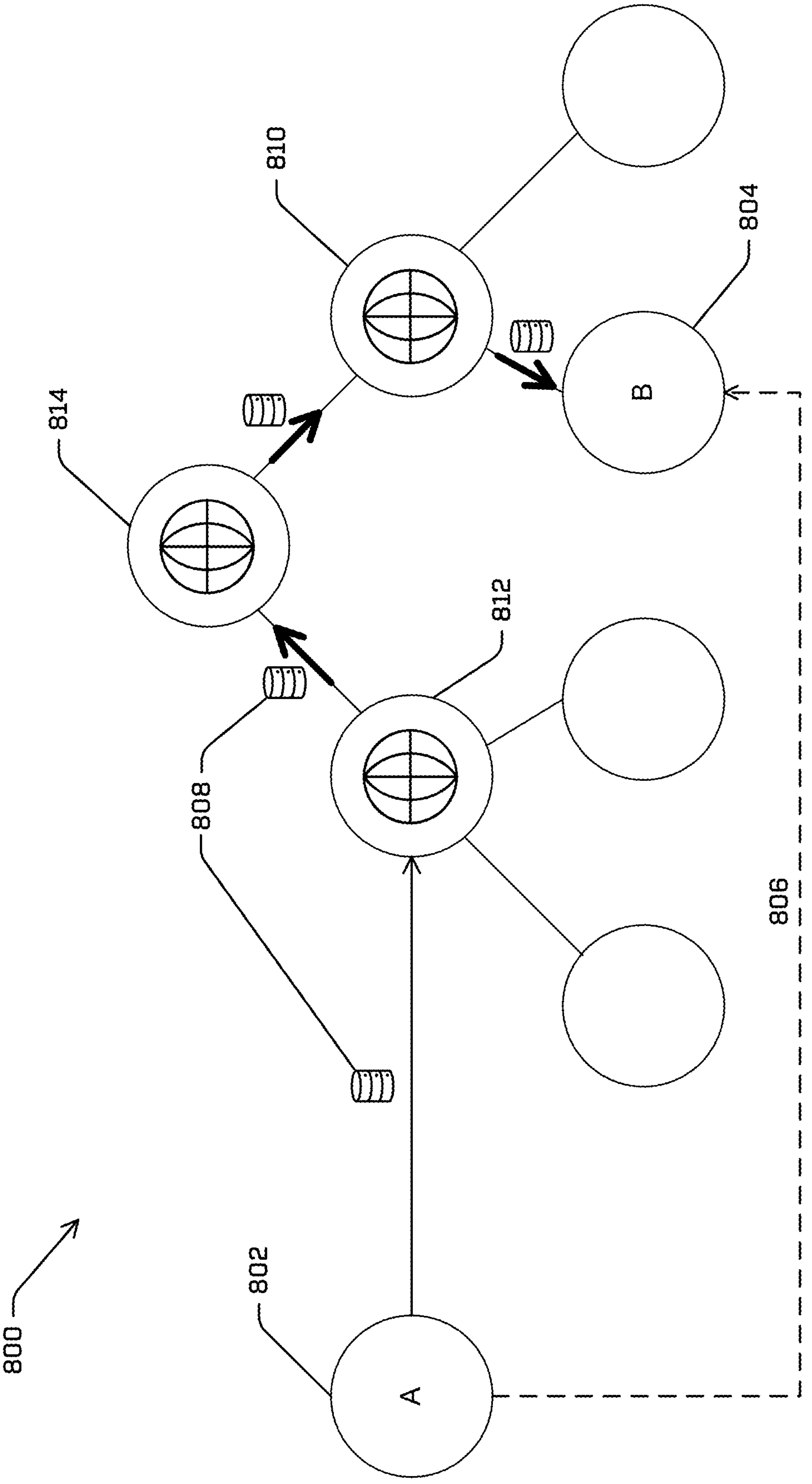
FIG. 8 illustrates an example implementation of establishing a communication link between an inquiry node and a target node, in accordance with examples of the present disclosure.

FIG. 8 illustrates an example implementation 800 of an inquiry node 802 attempting to establish a communication link 806 with a target node 804, in accordance with the examples of this disclosure. For example, example implementation 800 may comprise a plurality of nodes (e.g., target node 804) and/or networks (e.g., a private network hosted by branch coordination node 810. As depicted for purposes of illustration and not limitation, FIG. 8 illustrates a hierarchy of coordination nodes (e.g., second branch coordination node 812 and branch coordination node 810 being "branches" or "children" lower on the hierarchy than root coordination node 814 (e.g., the "parent" node)). Target node 804 may be associated with a separate network with which branch coordination node 810 is associated. In other words, branch coordination node 810 may implement or be responsible for the functionalities/capabilities of a coordination node, as discussed in more detail above.

As depicted for purposes of illustration and not limitation, inquiry node 802 may attempt to establish a communication link with target node 804 (as depicted with a dashed line). To do so, inquiry node 802 may transmit data 808 (e.g., an encrypted packet comprising an identity and/or a network query/request to communicate) to a second branch coordination node 812 (or, e.g., to an address associated with a second branch coordination node 812. Inquiry node 802 may transmit data 808 to the second branch coordination node 812 by mistake, because it's the nearest coordination node (e.g., via geolocation or via a path of communication links), or otherwise. Second branch coordination node 812 may receive data 808 and may determine that it does not have access to or is not communicatively coupled with target node 804 (the address of which may be stored or indicated as by data 808). Second branch coordination node 812 may transmit some or all of the data 808 "upstream" to a root coordination node 814. Although depicted as the ultimate root node (e.g., a "global" node), root coordination node 814 may comprise one or more coordination node(s) further "upstream" from it that are higher up the chain of branch/root nodes. Root coordination node 814 may, through branch coordination node 810, be communicatively coupled to target node 804. As such, root coordination node 814 may transmit some or all of data 808 to branch coordination node 810, which may have a more direct communication path to target node 804. Communication link 806 may be established between inquiry node 802 and target node 804 such that the nodes may transmit data directly between them, without routing through one or more coordination nodes.

As discussed above, any one or more of the coordination nodes (e.g., root coordination node 814, second branch coordination node 812, and/or branch coordination node 810) may authenticate the communications and/or identity associated with inquiry node 802 (e.g., via a unique network controller associated with each coordination node or via the same network controller associated with each coordination node).

Figure 9A:
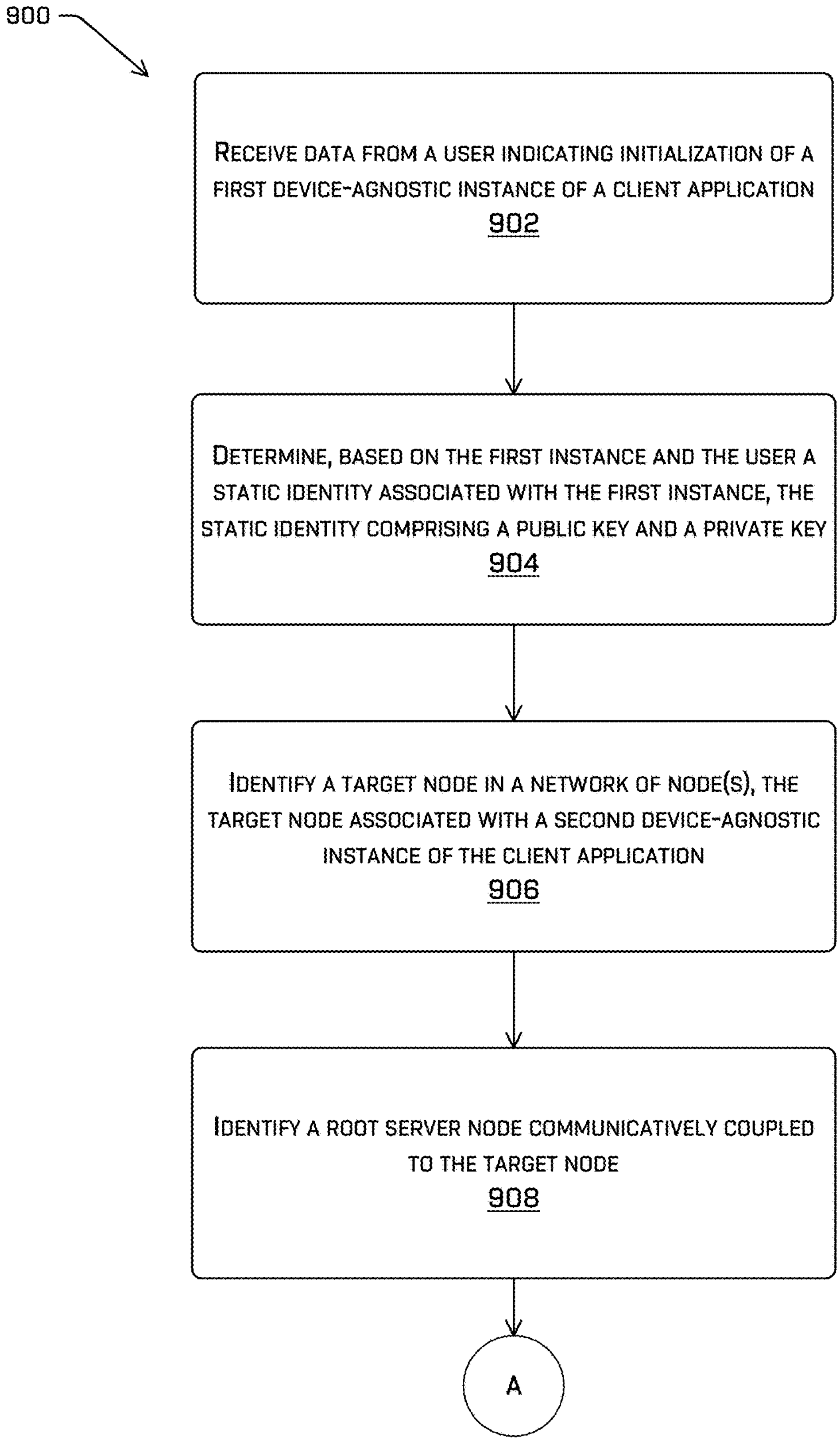
FIGS. 9A and 9B illustrate an example process in accordance with examples of the present disclosure.
Figure 9B:
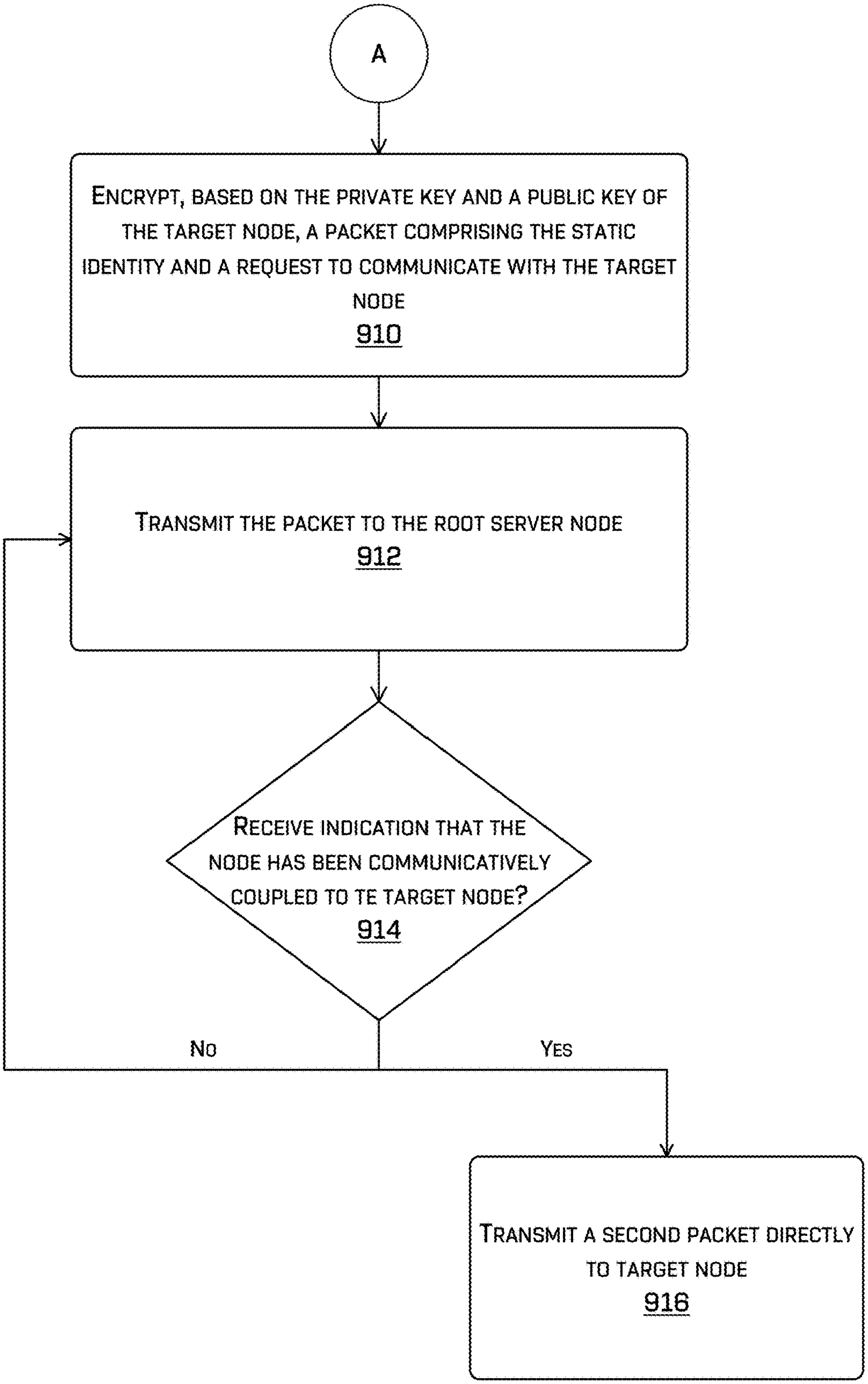

FIGS. 9A and 9B illustrate an example process 900 in accordance with examples of the present disclosure. At operation 902, example process 900 may comprise receiving first data from a user, where the first data indicates initialization of a first instance of a client application. In some examples, the first instance is device-agnostic (e.g., independent of the device with which it is associated) and may be configured to communicatively couple to one or more node(s) in a network. At operation 904, example process 900 may comprise determining, based at least in part on the first instance and the user, a static identity associated with the first instance of the client application. In some examples, the static identity may comprise a public key and a private key (e.g., a cryptography key pair). At operation 906, example process 900 may comprise identifying a target node of the one or more second nodes in the network, the target node associated with a second device-agnostic instance of the client application.

At operation 908, example process 900 may comprise identifying a root server node communicatively coupled to the target node. In some examples, as discussed above, the root server node may be a distinct node in the network configured to coordinate and manage network communications/activities. In other examples, the root server responsibilities may be implemented/executed by coordination server operational mode that may run on an existing node on the network. In some examples, the root server node may be associated with a third instance of the client application of the client application. In some examples, the root server node is communicatively coupled to each other node(s) in the network and may maintain a communication link between each node. In some examples, the first instance, the second instance, and/or the third instance are provided by (e.g., initialized via, downloaded from) a service provider.

Turning now to FIG. 9B, at operation 910, example process 900 may comprise encrypting, based at least in part on the private key (e.g., associated with the inquiry node) and public key associated with the target node (e.g., or the receiving node), a packet comprising the static identity and a request to communicate with the target node. In some examples, the encrypted packet may comprise additional or alternative data/information (e.g., configuration parameter(s), security/authentication information, firewall or network protocols, public address(es) and/or public key(s) of the target node and/or inquiry node, and so on).

At operation 912, example process 900 may comprise transmitting, to the root server node, the encrypted packet. In some examples, the root server node may only be able to access the public key(s) and/or public address(s) of the node(s) involved (e.g., target node or inquiry node or in the network. The root server node may not be capable of or authorized to decrypt or otherwise access information associated with the encrypted packet, which may ensure or maintain cryptographically secure, private communications among node(s). In other words, the root server node may be limited to relaying or routing packets between node(s) internal or external to the network with which the root server node is associated.

At operation 914, example process 900 may comprise receiving an indication from the root server node that the node has been communicatively coupled to the target node. In other words, at operation 914, the node (e.g., the inquiry node) may receive an indication from the root server node that it has been communicatively coupled to (e.g., has established a direct communication link with) the target or receiving node. In some examples, the node may not receive such an indication for myriad reasons. For example, if the root server node determines (or, e.g., receives an indication from a network controller) that the node is not authenticated or is otherwise untrustworthy, the root server node may transmit an indication to the node that it has been communicatively coupled to the target node. In such examples, the root server node may discard or destroy the encrypted packet and may transmit an indication to the node that it has not been authenticated. In some examples, if the node does not receive an indication that it has been communicatively coupled to the target node, it may attempt to transmit the encrypted packet to the root server node again. In such examples, the node may wait a determined amount of time (e.g., 30 seconds, 1 minute, 15 minutes, etc.) before re-transmitting the encrypted packet, or may do so upon receipt of an indication/notification that the node has not been authorized/authenticated/coupled to the target node.

At operation 916, example process may comprise transmitting a second encrypted packet directly to the target node. Operation 916 may indicate that a direct communication link has been established between the node and the target node, and the node and the target node may communicate (e.g., send and receive data) with each other without routing through a root server node. As discussed above, if the communication link between the node and the target node performs suboptimally (e.g., becomes stale, terminates, or is lost, etc.), the node may repeat a process similar to example process 900 to re-establish the connection link, or may continue communicating with the target node by routing/relaying data through the root server node.

Figure 10A:
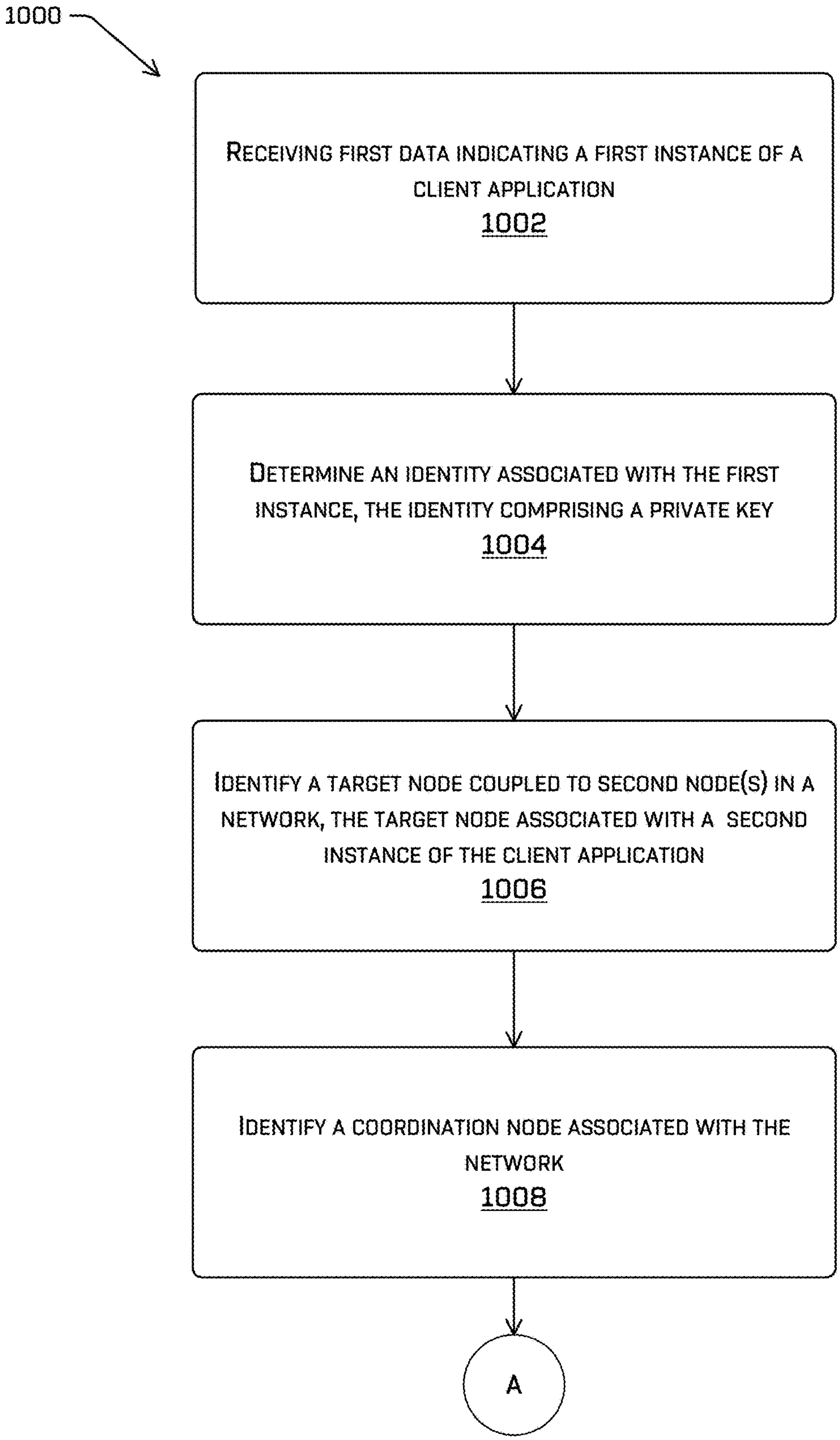
FIGS. 10A and 10B illustrate an example process in accordance with examples of the present disclosure.
Figure 10B:
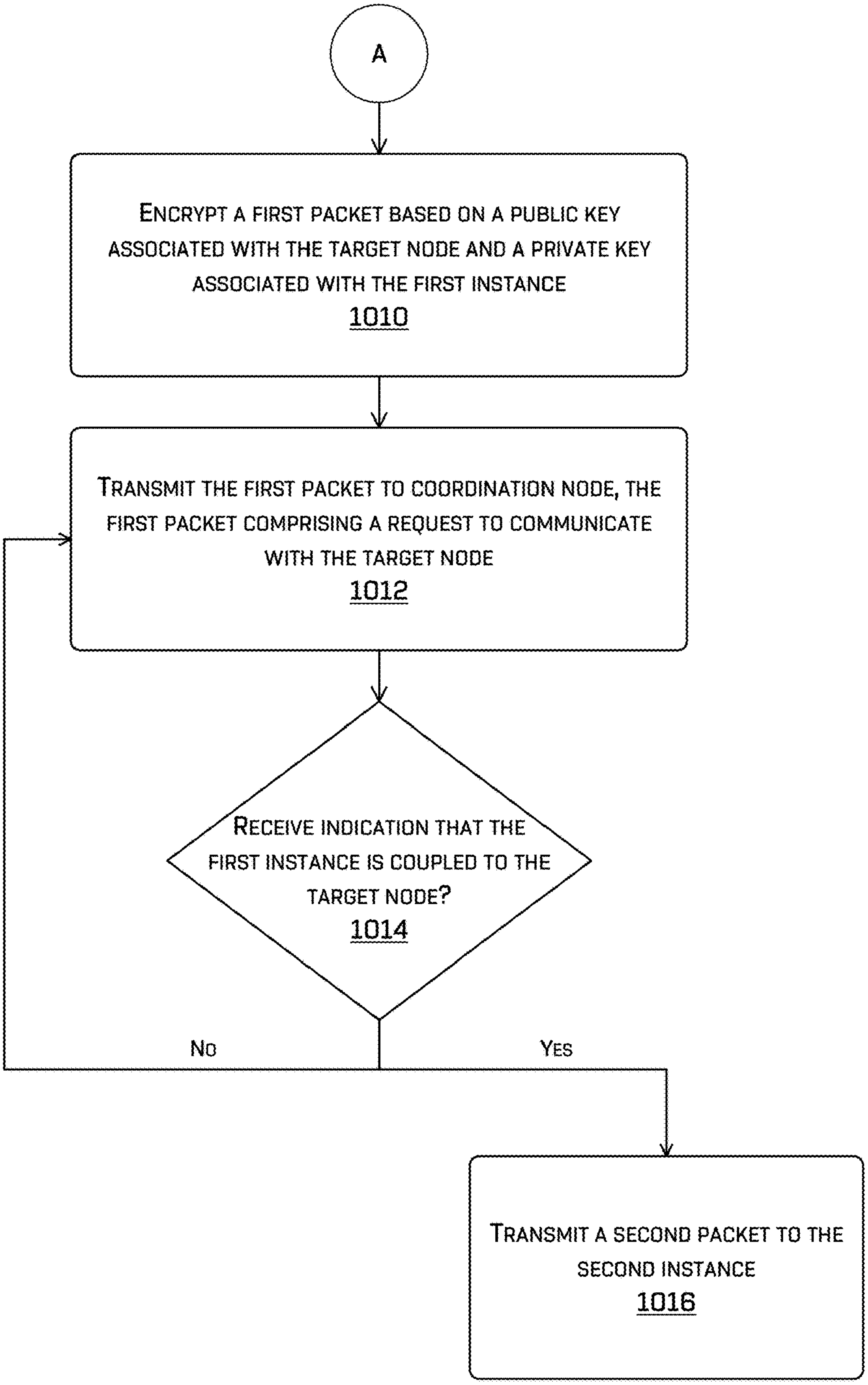

FIGS. 10A and 10B illustrate an example process 1000 in accordance with examples of the present disclosure. At operation 1002, example process 1000 may comprise receiving first data indicating a first instance of a client application. At operation 1004, example process 1000 may comprise determining an identity associated with the first instance, the identity comprising a private key (e.g., of a public/private key pair). At operation 1006, example process 1000 may comprise identifying a target node communicatively coupled to one or more second node(s) in a network. In some examples, the target node is associated with a second instance of the client application.

At operation 1008, example process 1000 may comprise identifying a coordination node associated with the network. In some examples, the coordination node may be communicatively coupled to each node on the network.

Turning now to FIG. 10B, at operation 1010, example process 1000 may comprise encrypting a first packet based at least in part on a public key associated with the target node and a private key associated with the node. At operation 1012, example process 1000 may comprise transmitting a first encrypted packet to the coordination node, where the first encrypted packet comprises a request to communicate with the target node. One of ordinary skill in the art will understand and appreciate that, in other examples, the encrypted packet may comprise any other information/data that may facilitate or otherwise improve the efficiently/reliability of network communications. At operation 1014, example process may comprise receiving an indication that the first instance is communicatively coupled to the second instance. In some examples, such an indication may be received from the coordination node, from a network controller node or operational mode, and/or from the second instance. In some examples, if the node does not receive such an indication, example process 1000 may return to operation 1012, and the node may re-transmit the packet to the coordination node (e.g., with the same or different data/information). At operation 1016, example process 1000 may comprise transmitting a second encrypted packet to the second instance. Operation 1016 may indicate that a direct communication link between the node and the target node has been established, and they may communicate directly with each other (or, e.g., continue to route communications through the coordination node).

Figure 11A:
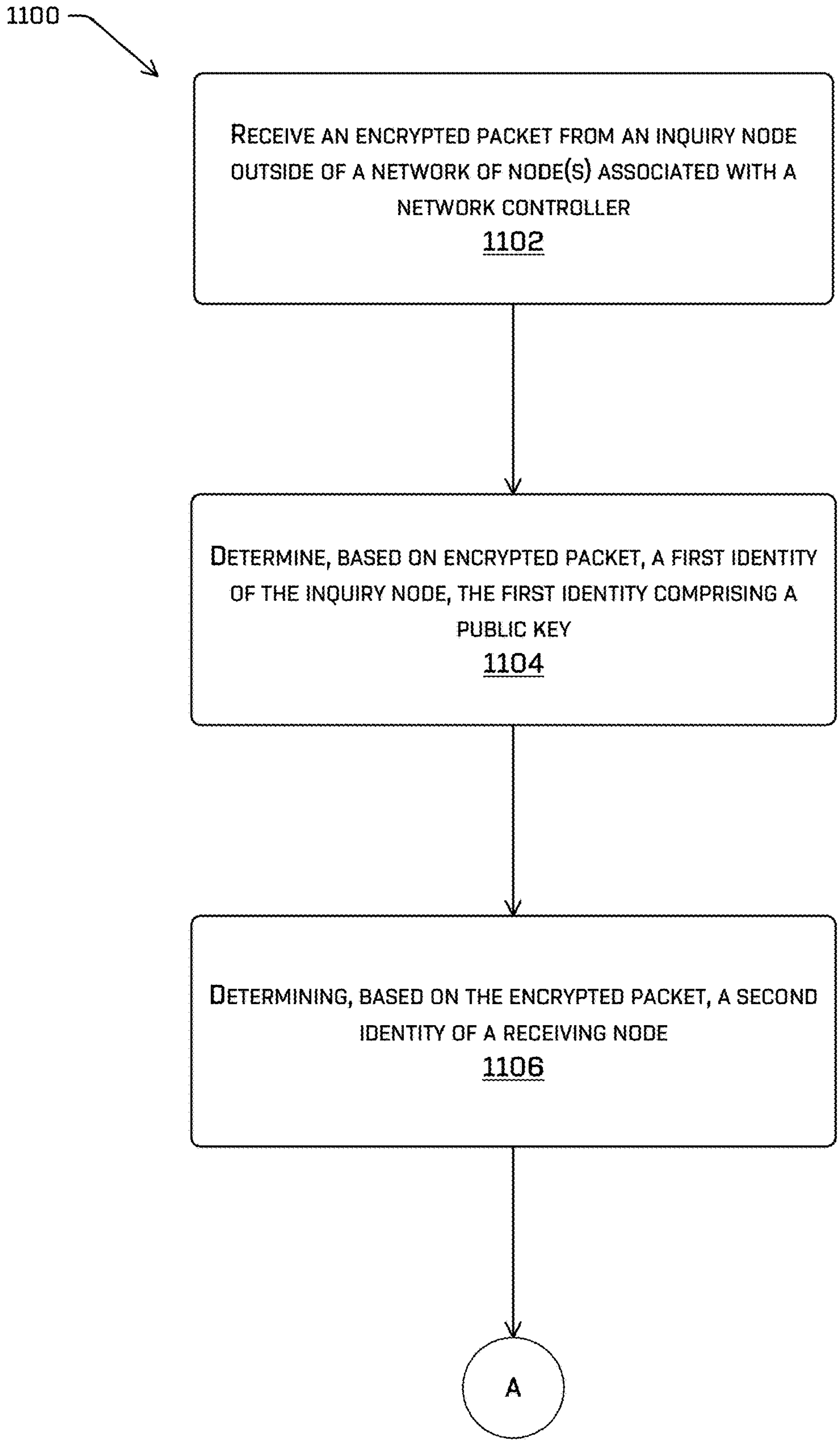
FIGS. 11A and 11B illustrate an example process in accordance with examples of the present disclosure.
Figure 11B:
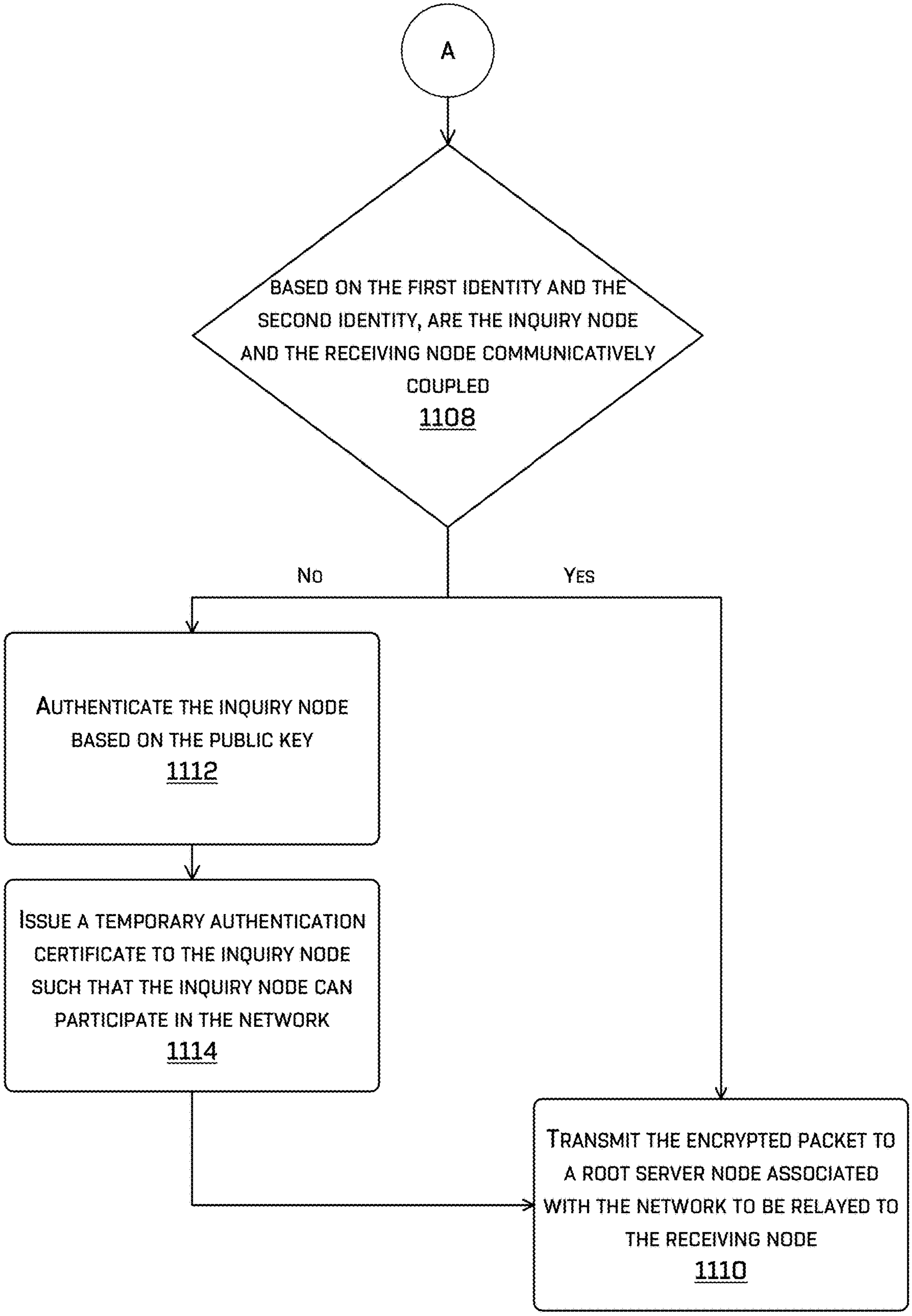

FIGS. 11A and 11B illustrate an example process 1100 in accordance with examples of the present disclosure. At operation 1102, example process 1100 may comprise receiving an encrypted packet from an inquiry node outside of a network of one or more node(s) communicatively coupled to a network controller. At operation 1104, example process 1100 may comprise determining, based at least in part on the encrypted packet, a first identity of the inquiry node, the first identity comprising a public key (e.g., from a public/private key pair). At operation 1106, example process 1100 may comprise determining, based at least in part on the encrypted packet, a second identity of a receiving node.

Turning now to FIG. 11B, at operation 1108, example process 1100 may comprise determining, based at least in part on the first identity of the inquiry node and the second identity of the receiving node, that the inquiry node and the receiving node are not communicatively coupled. In other words, in some examples the network controller may determine that an inquiry node and a receiving node do not have an established communication link. At operation 1112, example process 1100 may comprise authenticating the inquiry node based at least in part on the public key. At operation 1114, example process may comprise issuing a temporary authentication certificate (e.g., token, credentials) to the inquiry node. In some examples, the temporary authentication certificate may be configured to grant access to the inquiry node to participate in the network. In some examples, the temporary authentication certificate may be transmitted to the inquiry node, may be associated with a public key or public address of the inquiry node, or otherwise. At operation 1110, example process 1100 may comprise transmitting the encrypted packet to a root server node associated with the network, where the root server node is configured to relay and/or route the encrypted packet to the receiving node.

Figure 12A:
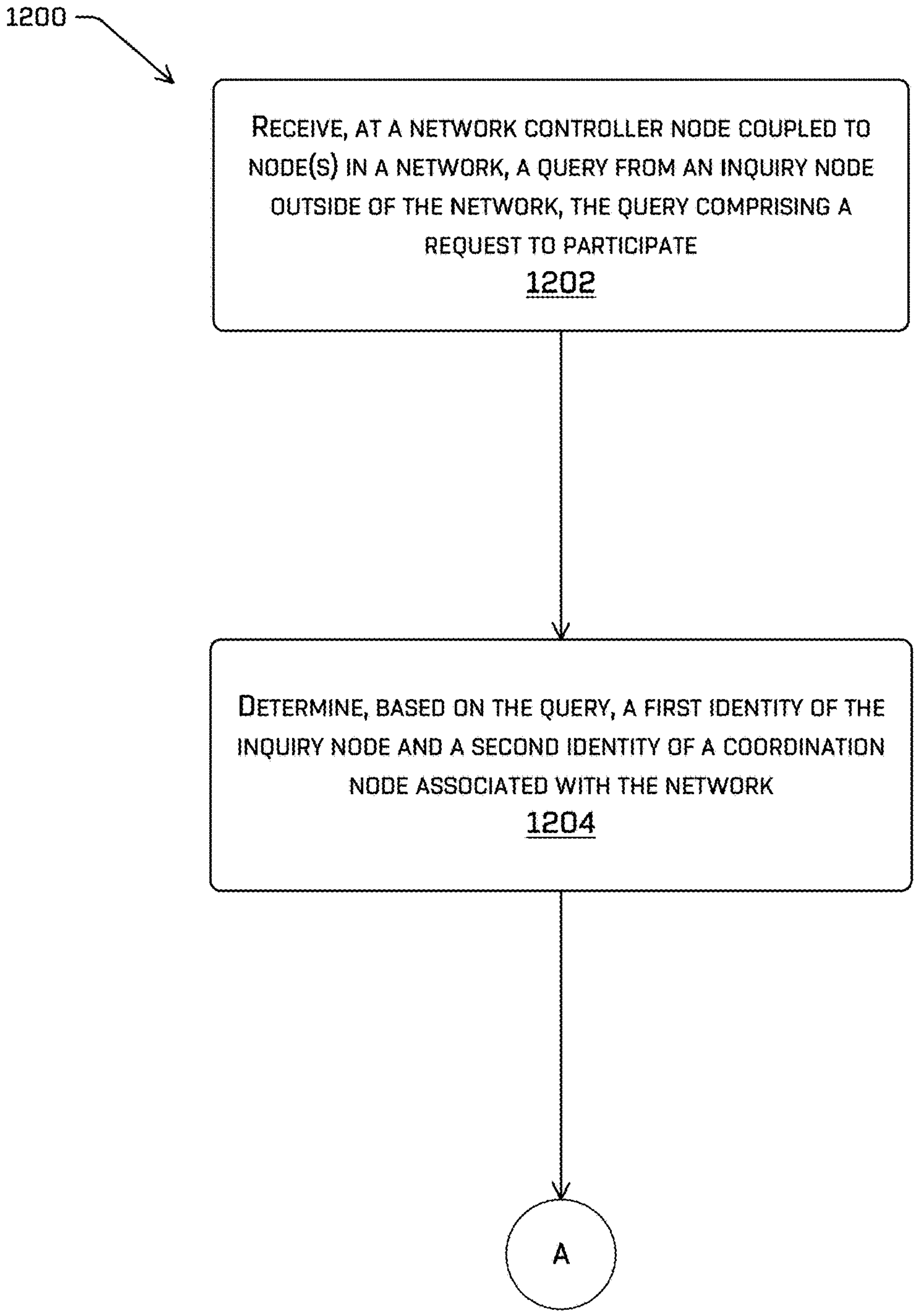
FIGS. 12A and 12B illustrate an example process as described in accordance with examples of the present disclosure.
Figure 12B:
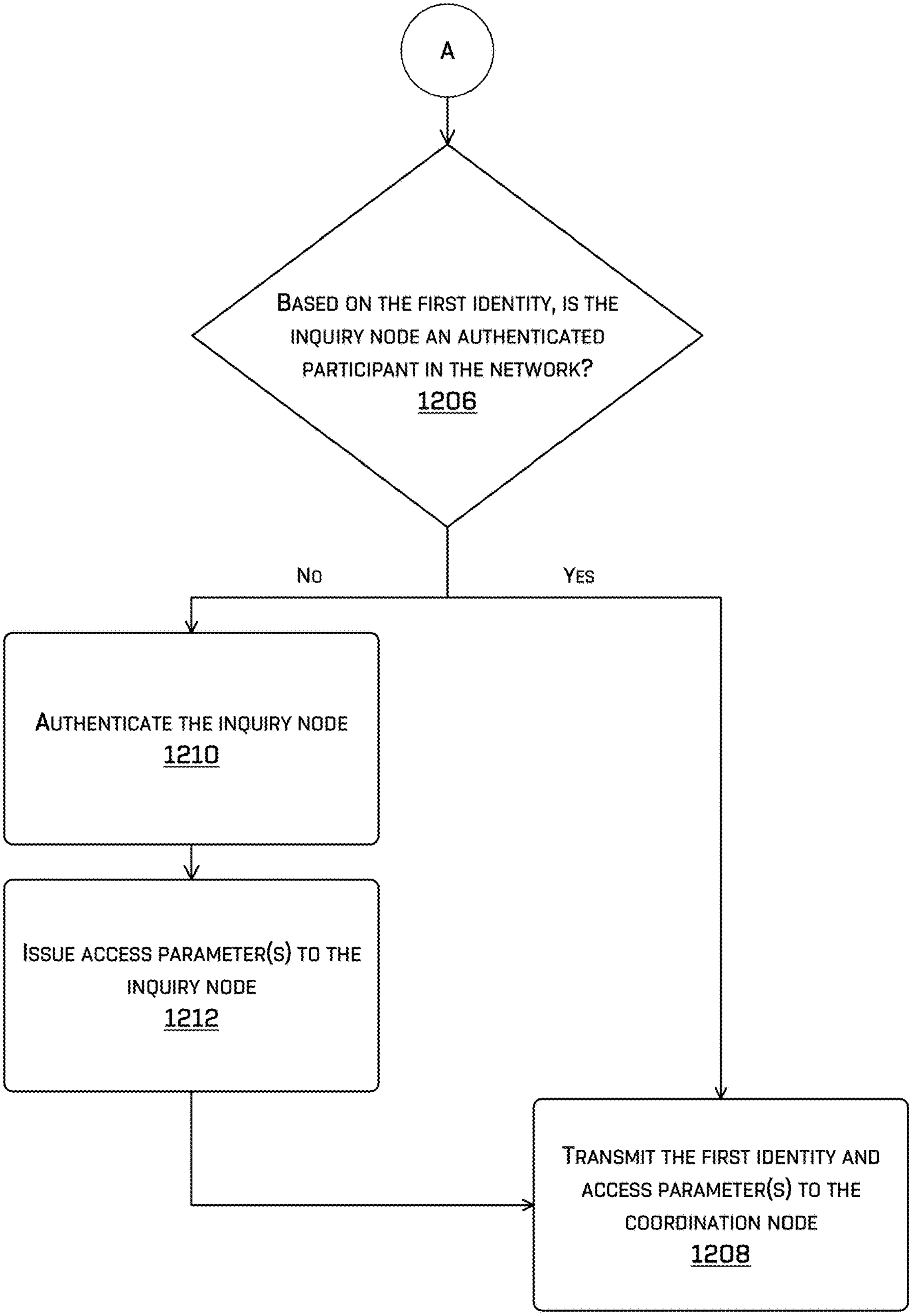

FIGS. 12A and 12B illustrate an example process 1200 as described in accordance with examples of the present disclosure. At operation 1202, example process 1200 may comprise receiving, at a network controller node coupled to one or more nodes in a network, a query from an inquiry node outside of the network (e.g., not a participant in the network). In some examples, the query comprises a request to participate in the network. In other examples, the query comprises a request for information (e.g., network protocol(s)), a request for updated network configuration parameter(s), a request to join the network but not to communicate with a specific node, and so on. One of ordinary skill in the art will understand and appreciate that there are myriad queries that a network controller node may receive from a node outside of the network with which the network controller is associated. In at least some examples, the network controller responsibilities/functionalities may be implemented by an operational mode of an existing node in the network.

At operation 1202, example process 1200 may comprise determining, based at least in part on the query, a first identity of the inquiry node and a second identity of a coordination node in the network.

Turning now to FIG. 12B, at operation 1206, example process 1200 may comprise determining, based at least in part on the first identity, that the inquiry node is not an authorized participant in the network. In some examples, if the network controller determines that the inquiry node is not an authenticated participant, example process 1200 may move to operation 1210. At operation 1210, example process 1200 may comprise authenticating, based at least in part on the first identity, the inquiry node. In some examples, the inquiry node may be authenticated based at least in part on past network communications (e.g., with another network), user authentication credentials, a geolocation, and/or any combination of information associated with the inquiry node that may impact its credibility/trustworthiness in a network. At operation 1212, example process 1200 may comprise issuing one or more access parameters to the inquiry node based at least in part on authenticating the inquiry node. As discussed herein, the access parameter(s) may comprise authentication token(s), network or node configuration parameter(s), packet processing module(s), and so on. In some examples, if and when the network controller authenticates the inquiry node, which may not occur after operation 1206 if the inquiry node is already an authenticated participant in the network, example process 1200 may, at operation 1208, comprise transmitting the first identity and the one or more access parameter(s) to the coordination node in the network. In some examples, such an operation 1208 may allow the inquiry node to become an authenticated participant in the network and/or to communicate with other node(s) in the network. The coordination server may facilitate the exchange of information to/from the inquiry node and/or other node(s) on the network.

Figure 13A:
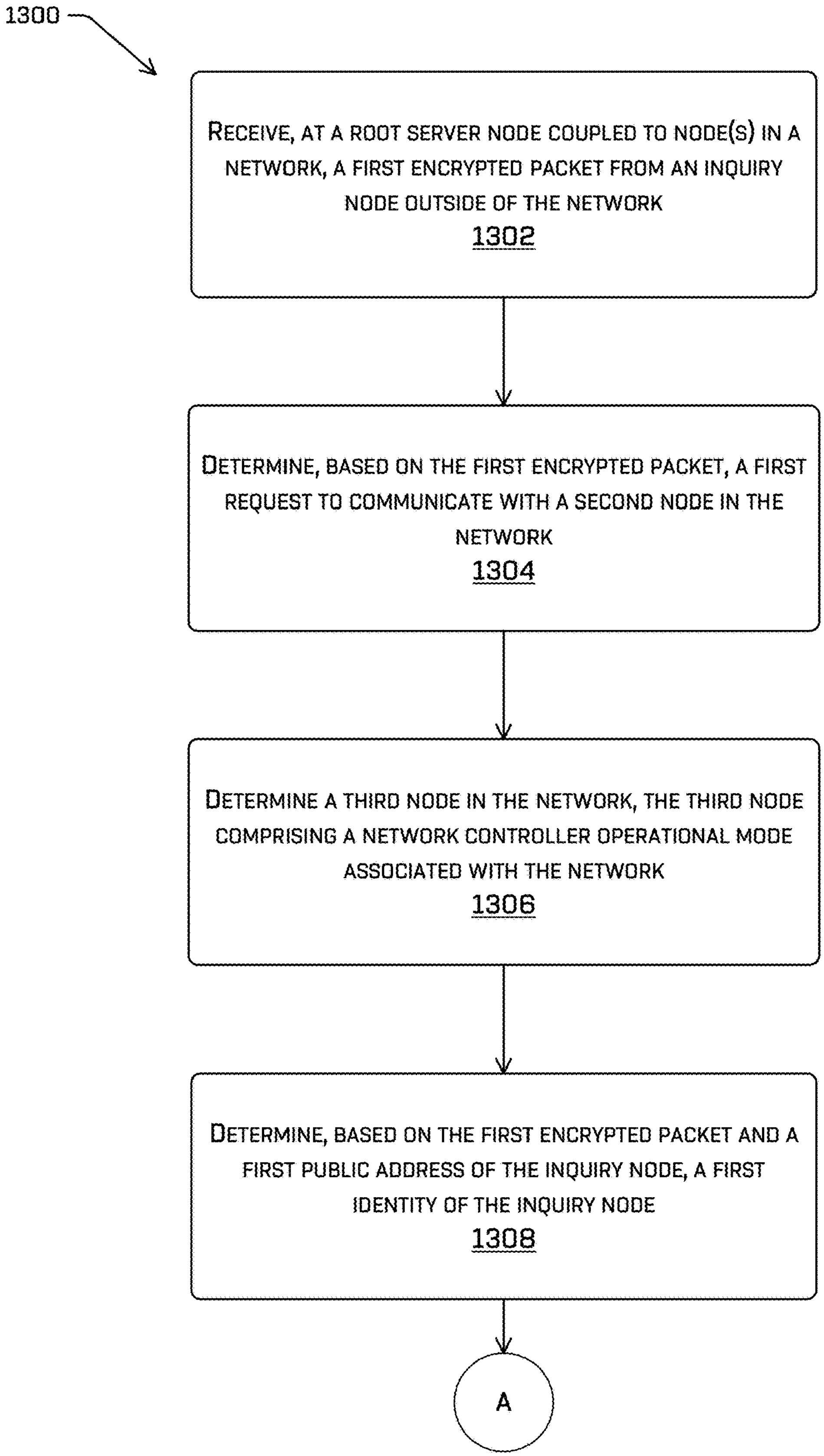
FIGS. 13A and 13B illustrate an example process as described in accordance with examples of the present disclosure.
Figure 13B:
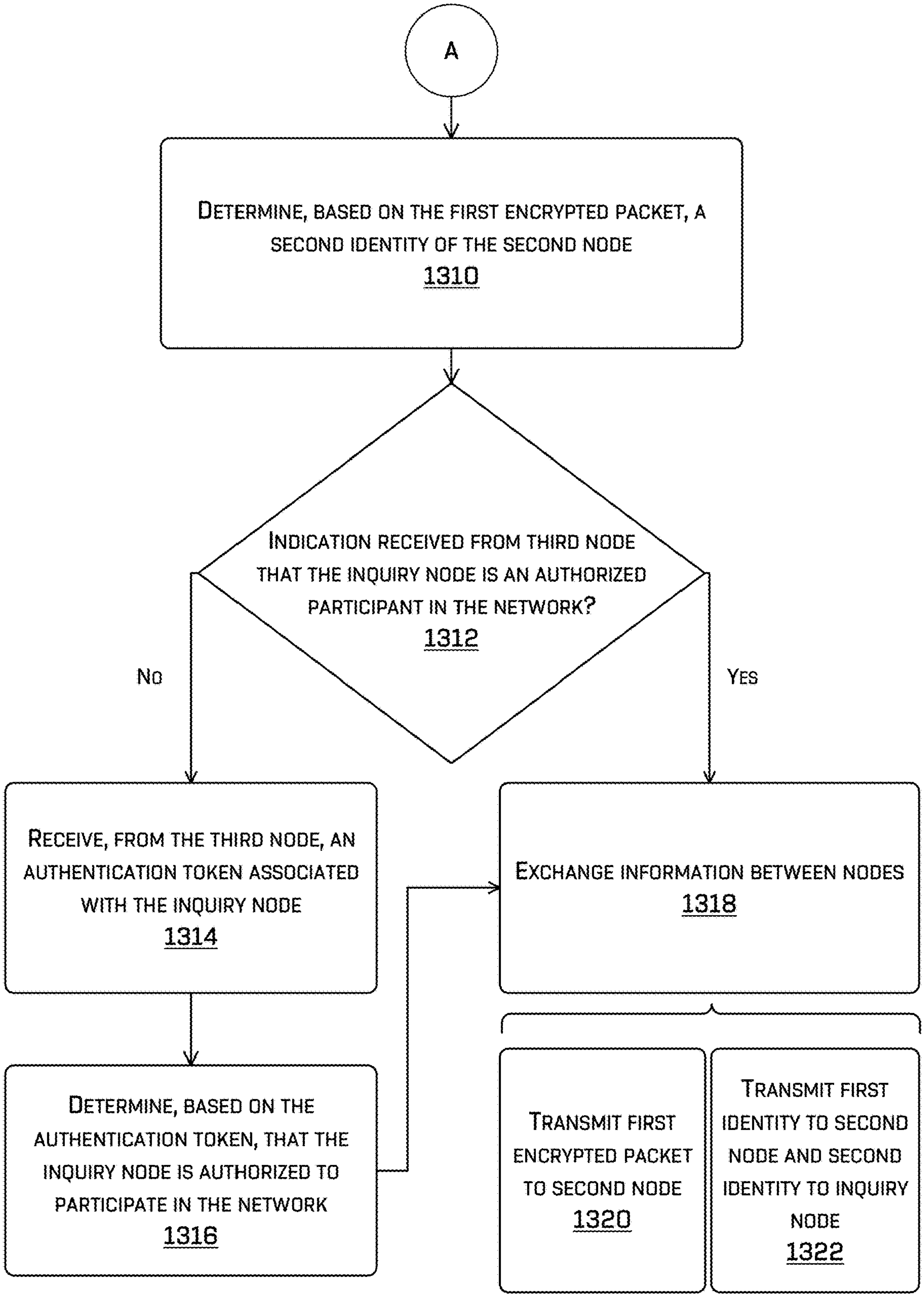

FIGS. 13A and 13B illustrate an example process 1300 as described in accordance with examples of the present disclosure. At operation 1302, example process 1300 may comprise receiving, at a root server node communicatively coupled to one or more nodes in a network, a first encrypted packet. In some examples, the first packet is received from a node outside/external to the node with which the root server node is associated. As discussed above, the root server node may be an operational mode associated with an existing node in the network rather than a separate, distinct node. In other examples, the root server node is a unique node tasked with various responsibilities related to network management and administration. At operation 1304, example process 1300 may comprise determining, based on the first encrypted packet, a first request to communicate with a second node of the one or more nodes in the network. In other examples, the encrypted packet may comprise an inquiry related to network configuration parameter(s) or other protocols.

At operation 1306, example process 1300 may comprise determining a third node of the one or more network, where the third node comprises a network controller operational mode associated with the network. In some examples, the network controller node may implement various authentication and security procedures (e.g., identity verifications) discussed herein, and the root server node may "offload" such responsibilities to the network controller node. In some examples, the features and functionalities of the root server node and the network controller are implemented by a singular node, which may transition or otherwise alternate between operational modes.

At operation 1308, example process 1300 may comprise determining, based at least in part on the first encrypted packet and first public address of the inquiry node, a first identity of the inquiry node. In some examples, the inquiry node(s) may comprise a public/private key pair and/or a public address or identifier such that the root server node and/or network controller node(s) can verify and authenticate the identity of inquiry node(s). The identifying information of node(s) may be static/unchanged despite changes to location, device, etc. In other words, the identity and/or public address may remain consistent and associated with an instance of a client application rather than being "tied" to the device. In some examples, the public key of a public/private key pair may be based at least in part on an address of the node, meaning the public key may comprise a portion of the address or otherwise incorporate a unique identifier of the node such that data transmissions can be sent/received by the node.

Turning now to FIG. 13B, at operation 1310, example process 1300 may comprise determining, based on the first encrypted packet, a second identity of the second node. In some examples, the encrypted packet may comprise public address or public key information/data associated with the second node with which the inquiry node is requesting to communicate.

At operation 1312, example process 1300 may comprise determining whether an indication is received from the third node (e.g., the network controller) that the inquiry node is not an authorized participant in the network. In some examples, the network controller may monitor activity/traffic routed to the root server node and may determine whether the traffic is being transmitted or caused by authenticated nodes and relay such information to the root server node. In other examples, the root server node may transmit the identity and/or public key associated with the inquiry node to the network controller, and the network controller may determine authority/access information and relay that information back to the root server node. In other words, in some examples, the network controller may wait until a request to determine the authority of an inquiry node is received, whereas in other examples, the network controller may monitor and authenticate all traffic that is routed to/through the root server node.

At operation 1314, example process 1300 may comprise receiving, from the third node, an authentication token associated with the inquiry node (e.g., the network controller may issue or otherwise assign temporary/permanent access credentials to the inquiry node). In some examples, the authentication token may expire after a determined amount of time (e.g., 1 second, 60 seconds, etc.), and may be configured to grant the inquiry node access to participate in the network. At operation 1316, example process 1300 may comprise determining, based at least in part on the authentication token, that the inquiry node is authorized to participate in the network. At operation 1318, example process 1300 may comprise exchanging data/information between the inquiry node and the second node (e.g., receiving node). In some examples, facilitating a node "handshake" may comprise, at operation 1320, transmitting the first encrypted packet to the second node, and, at operation 1322, transmitting the first identity to the second node and the second identity to the inquiry node. In some examples, facilitating the exchange of information may comprise forwarding the packet to the second node and exchanging the node identities/addresses with each other such that they are directly communicatively coupled (e.g., the direct communication link is established). In some examples, operation 1320 and 1322 may occur simultaneously and/or near simultaneously (e.g., within a threshold period of time).

Figure 14A:
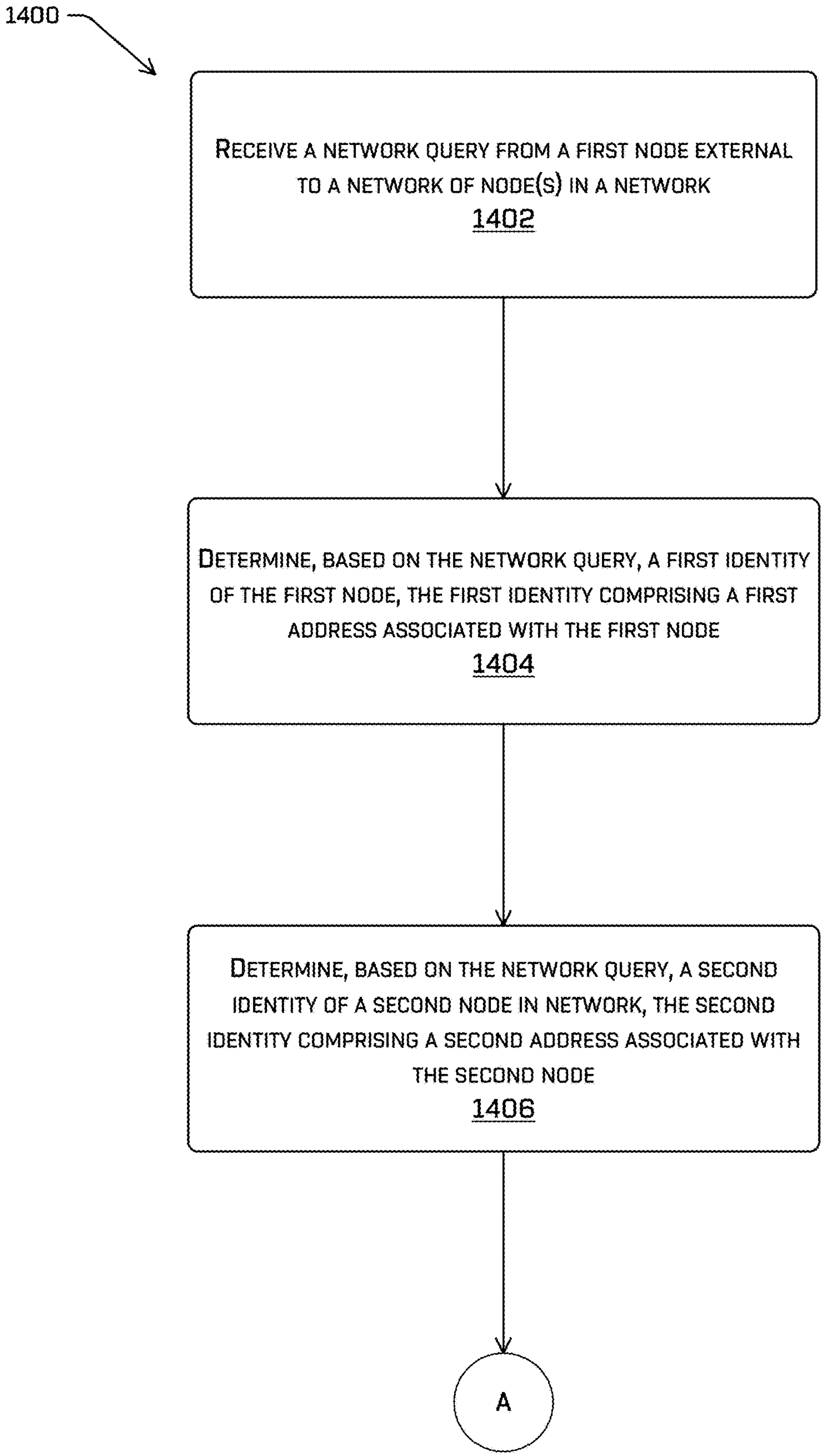
FIGS. 14A and 14B illustrate an example process in accordance with examples of the present disclosure.
Figure 14B:
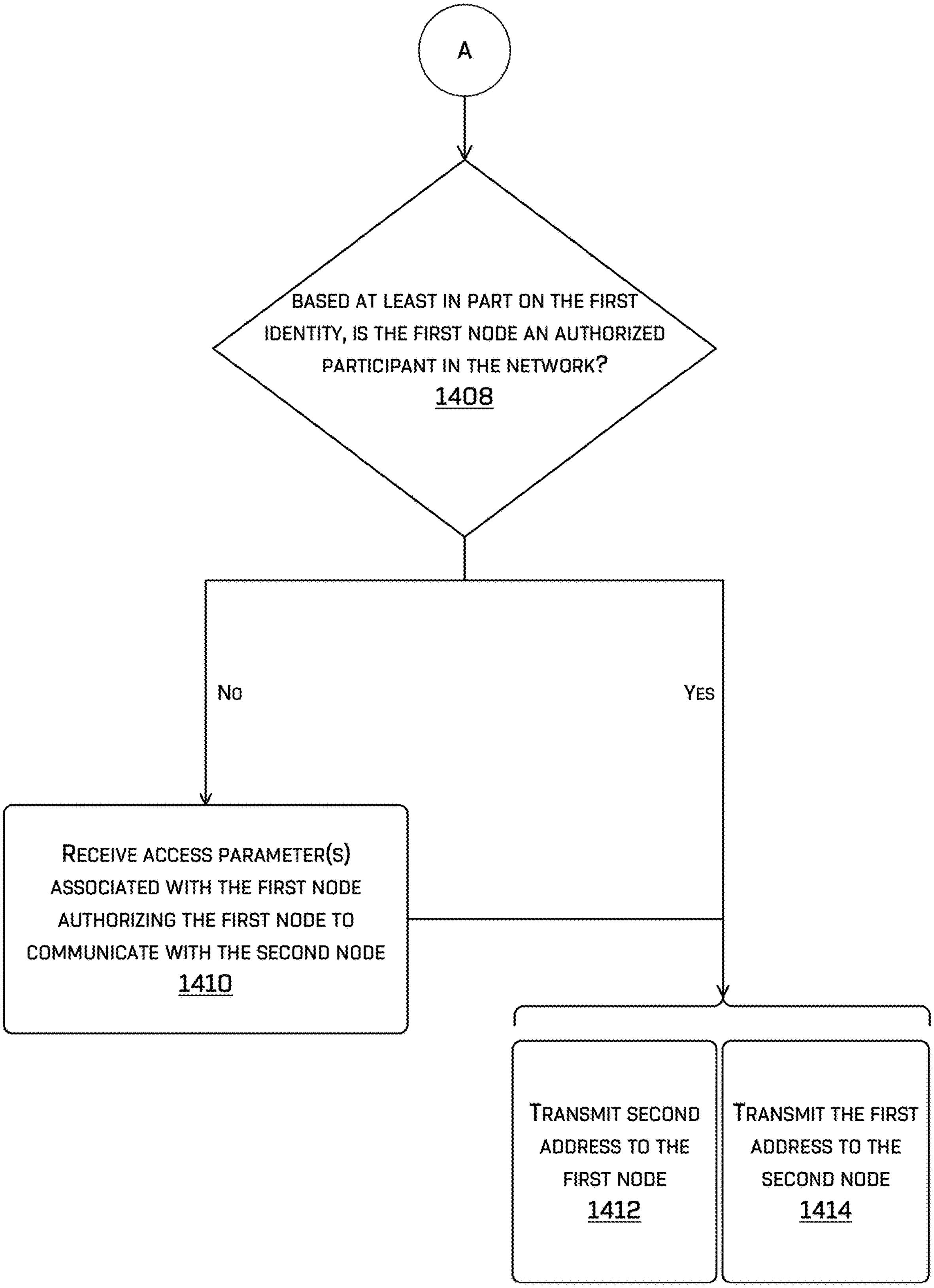

FIGS. 14A and 14B illustrate an example process 1400 in accordance with examples of the present disclosure. At operation 1402, example process 1400 may comprise receiving a network query from a first node, where the first node is external (e.g., outside of) a network of one or more second node(s). At operation 1404, example process 1400 may comprise determining, based at least in part on the network query, a first identity of the first node, the first identity comprising a first address associated with the first node. At operation 1406, example process 1400 may comprise determining, based at least in part on the network query, a second identity of a second node in the one or more second node(s) in the network. In some examples, the second identity comprises a second address associated with the second node. At operation 1408, example process 1400 may comprise determining, based at least in part on the first identity of the first node, that the first node is not an authorized participant in the network. Such determination may be made by a root server node, and/or received from a network controller node or operational mode. At operation 1410, example process 1400 may comprise receiving access parameter(s) associated with the first node, where the access parameter(s) are configured to authorize the first node to communicate with the second node. At operation 1412, example process may comprise transmitting the second address to the first node. At operation 1414, example process 1400 may comprise transmitting the first address to the second node. In some examples, such transmissions constitute a "handshake" such that the first node and the second node are communicatively coupled and are able to send/receive data without routing the information through a relay server or root server node. In some examples, such transmissions may indicate to other node(s) on the network that the first node is an authorized participant in the network (e.g., other node(s) are notified or are otherwise capable of communicating with the first node because the first node has been deemed trustworthy within the network).

Figure 15A:
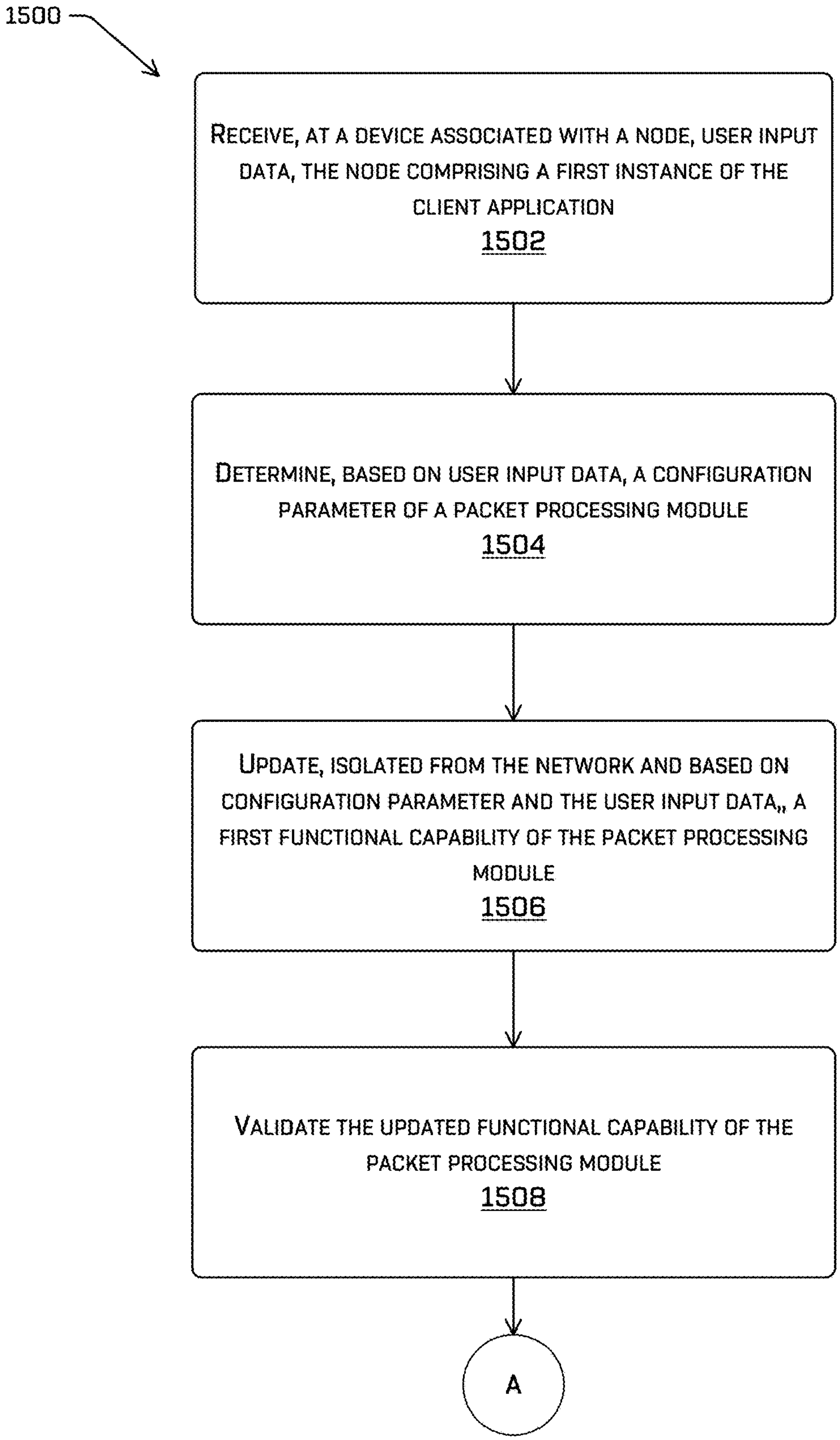
FIGS. 15A and 15B illustrate an example process in accordance with examples of the present disclosure.
Figure 15B:
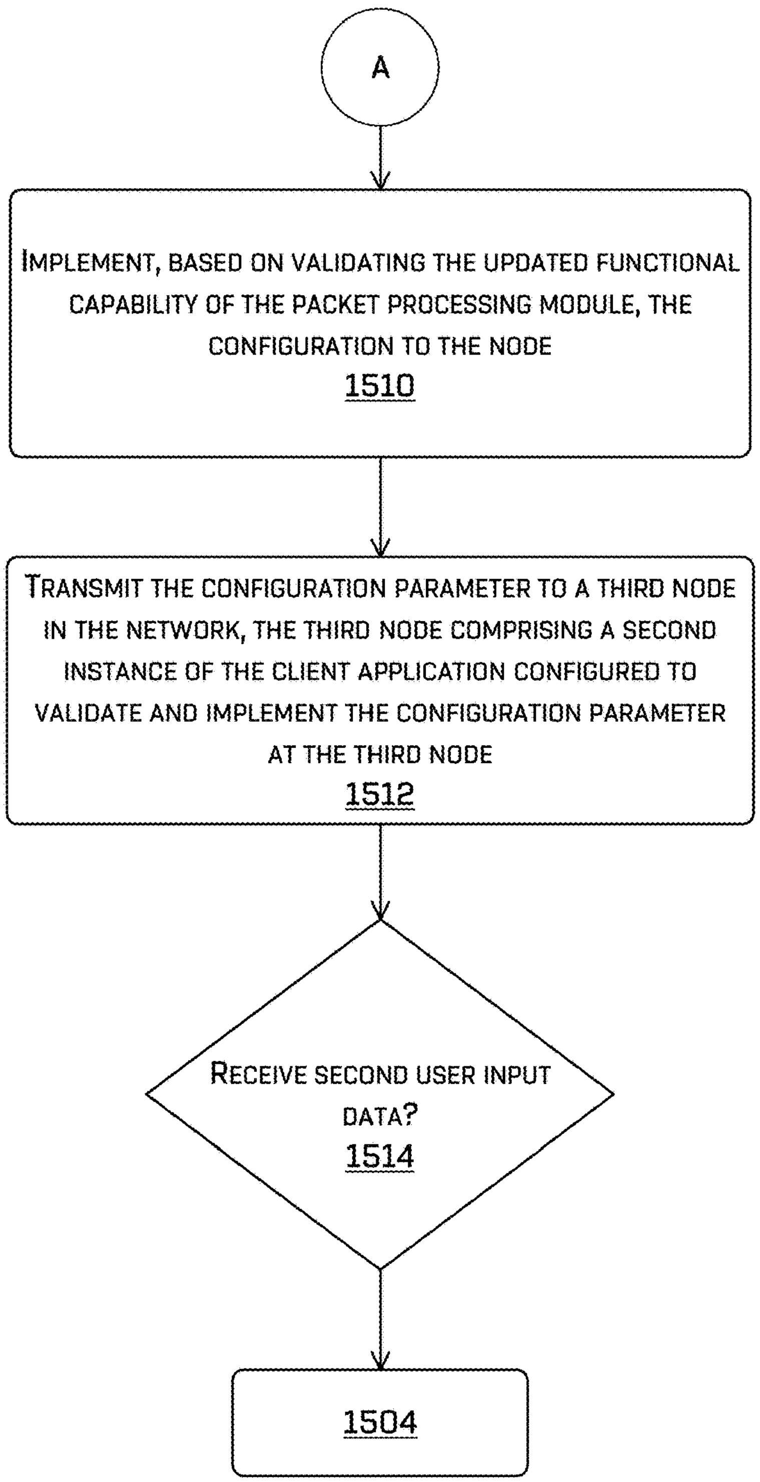

FIGS. 15A and 15B illustrate an example process 1500 in accordance with examples of the present disclosure. At operation 1502, example process 1500 may comprise receiving, at a device associated with a node, user input data, wherein the node comprises a first device-agnostic instance of a client application. At operation 1504, example process 1500 may comprise determining, based at least in part on the user input data, a configuration parameter of a packet processing module. In some examples, the packet processing module may be configured to manage activity between the node and one or more second node(s) communicatively coupled to the node in a network. In other words, in some examples, the node may be in a network and may be communicatively coupled to at least some of the other node(s) in the network, and the packet processing module may define rules/protocols/procedures of related to managing network activity, monitoring transmissions traffic, implementing or enforcing various managerial procedures, and so on.

At operation 1506, example process 500 may comprise updating, isolated from the network (e.g., independent of the network such that other node(s) are unaffected) and based at least in part on the configuration parameter and user input data, a first functional capability of the packet processing module (e.g., applying a user-defined configuration parameter to update a functionality of the node or device associated with the node). At operation 1508, example process 1500 may comprise validating, by the device, an updated functional capability of the packet processing module (e.g., verify or validate its security/reliability/performance and/or to verify the efficacy of the updated functional capability and its effect on the device/node.)

Turning now to FIG. 15B, at operation 1510, example process 1500 may comprise implementing, based at least in part on validating the updated functional capability, the configuration parameter to the node. In some examples, the device may implement the updated functional capability to the node such that the node comprises the validated updated functional capability. At operation 1512, example process 1500 may comprise transmitting the configuration parameter to a third node of the one or more second nodes, where the third node comprises a second device-agnostic instance of the client application. In some examples, the third node may be configured to further evaluate, validate, and/or implement the configuration parameter to a second functional capability of the third node. In such examples, the third node may receive the configuration parameter, may validate its efficacy/security/performance, and implement the configuration parameter (e.g., apply an update) to the functionality of the third node. Such an example process 1500 may allow individual user(s) and/or instances of the client application to sandbox or otherwise test and validate myriad configuration parameter(s) or changes to configuration parameter(s) in an isolated environment (e.g., independent of the network and the other node(s) on the network).

At operation 1514, example process 1500 may return to operation 1504 if second or additional user input data is received. In other words, example process may comprise receiving a second or third user input data and may repeat at least some of the steps of example process 1500 with respect to the second or third user input data.

Figure 16A:
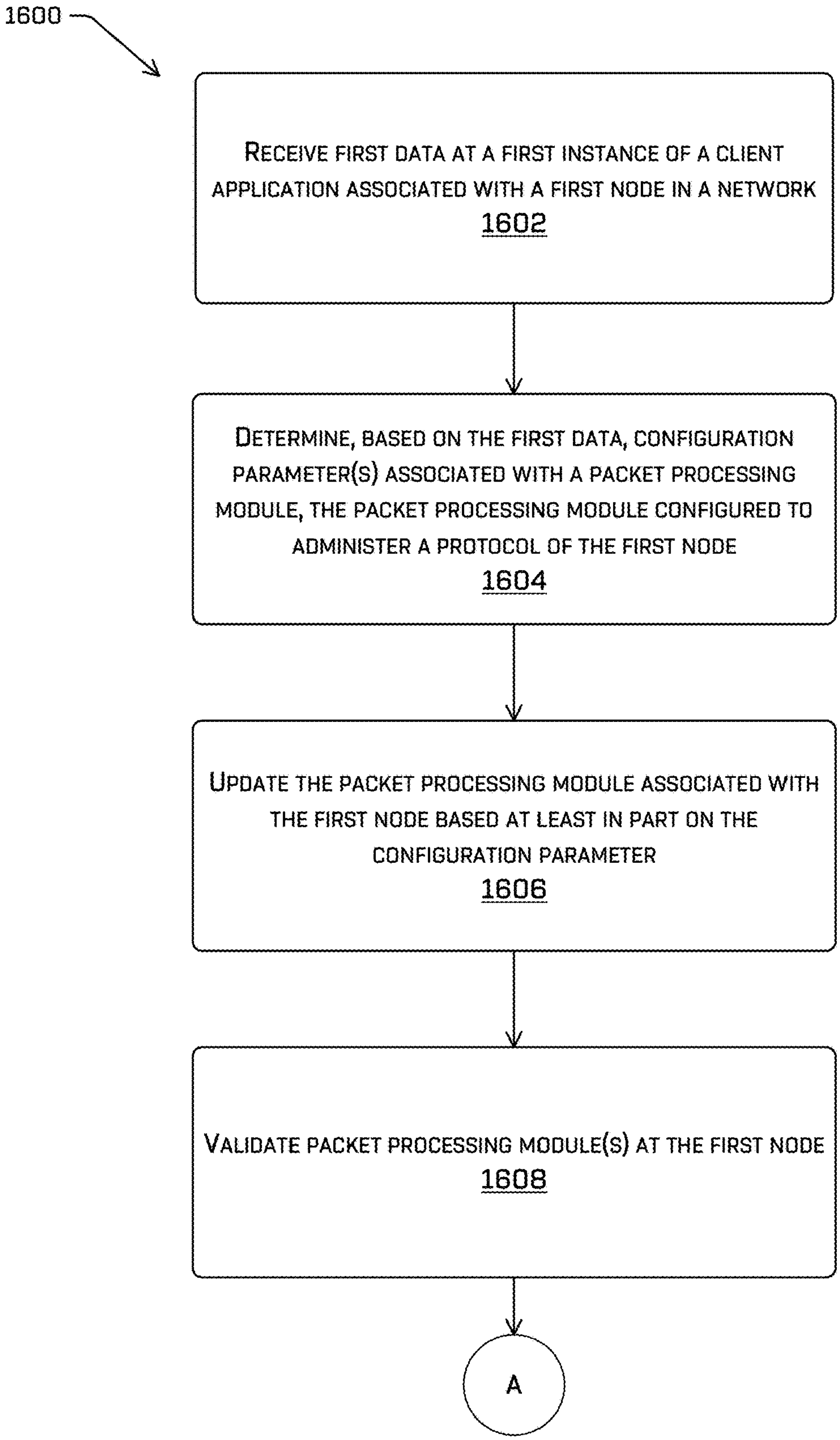
FIGS. 16A and 16B illustrate an example process in accordance with examples of the present disclosure.
Figure 16B:
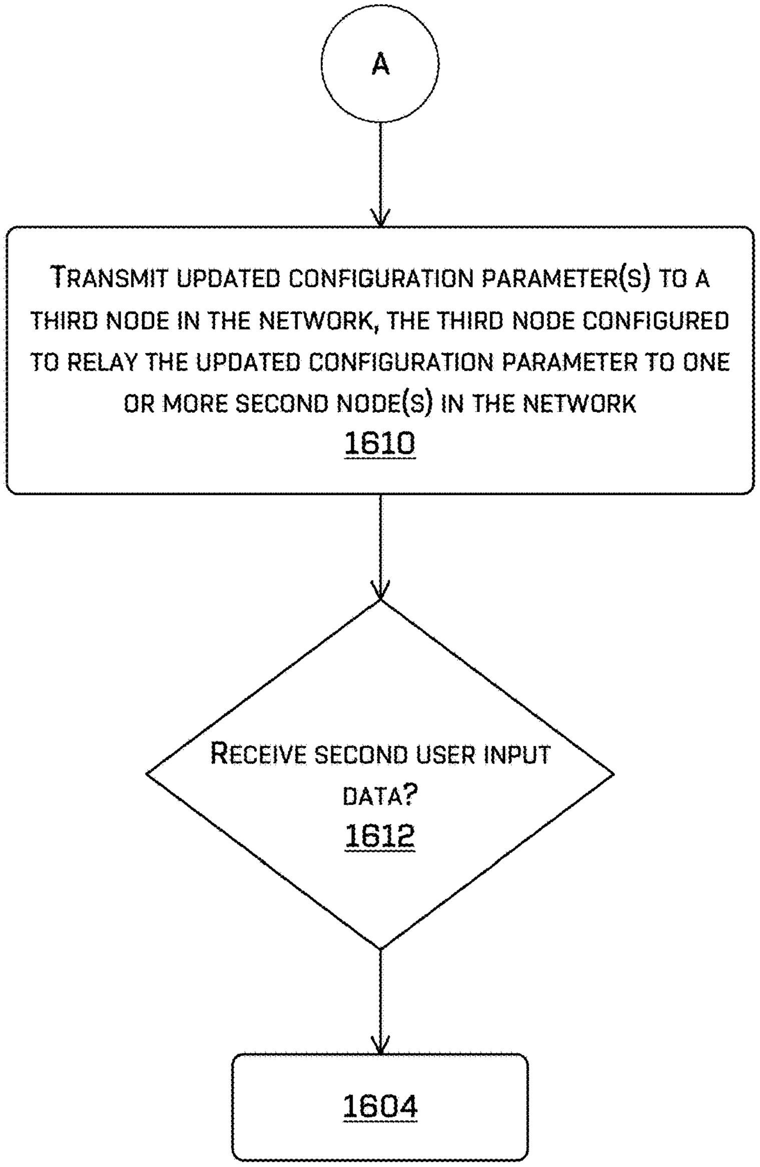

FIGS. 16A and 16B illustrate an example process 1600 in accordance with examples of the present disclosure. At operation 1602, example process 1600 may comprise receiving first data at a first instance of a client application associated with a first node in a network. At operation 1604, example process 1600 may comprise determining, based at least in part on the first data, a configuration parameter associated with a packet processing module. In some examples, the packet processing module may be configured to administer a protocol of the first node. As discussed in more detail above, the packet processing module(s) may be configured to administer or otherwise implement/enforce various processes, techniques, and/or procedures associated with a node and/or with a network.

At operation 1606, example process 1600 may comprise updating, based at least in part on the configuration parameter, the packet processing module associated with the first node. At operation 1608, example process 1600 may comprise validating the packet processing module at the first node (e.g., in a sandbox, isolated from other node(s) in the network).

Turning now to FIG. 16B, at operation 1610, example process 1600 may comprise transmitting an updated (e.g., improved and/or validated) configuration parameter to a third node in the network, where the third node is configured to relay the updated configuration parameter to one or more second nodes in the network. In some examples, the node may implement an improved configuration parameter locally, and upon validation/verification of the configuration parameter, the node may transmit it to a root server node or coordination node, and the coordination node may relay the configuration parameter to all other node(s) on the network, or to some other node(s) on the network (e.g., those who transmit a request for the updated configuration parameter). The coordination sever node may, in some examples, perform additional (e.g., stricter or more robust/complete) validation procedures prior to “shipping it off” to other node(s) in the network.

At operation 1612, example process 1600 may return to operation 1604 upon receipt of additional user input data. In other words, example process 1600 may represent a singular instance of validating and implementing user-defined configuration parameter(s), and some or all of the operations in example process 1600 may repeat for other user(s) and/or other configuration parameter(s).

Example Clauses

A: A node comprising: one or more processors; and a memory storing processor-executable instructions that, when executed by the one or more processors, cause the one or more processors to perform operations comprising: receive first data from a user, the first data indicating initialization of a first instance of a client application, the first instance being device-agnostic and configured to communicatively couple the node to one or more second nodes in a network; determine, based at least in part on the first instance and the user, a static identity associated with the first instance of the client application, the static identity comprising a first public key and cryptographically secure private key; identify a target node of the one or more second nodes, the target node associated with a second instance of the client application and communicatively coupled to one or more third nodes in the network; identify a root server node associated with a third instance of the client application, the root server node communicatively coupled to the target node and to the one or more third nodes in the network, wherein the first instance, the second instance, and the third instance of the client application were provided by a service provider; encrypt, based on the cryptographically secure private key and a second public key associated with the target node, a packet comprising the static identity and a request to communicate with the target node; transmit the encrypted packet to the root server node; receive an indication from the root server node that the node has been communicatively coupled to the target node; and transmit a second encrypted packet directly to the target node.

B: The techniques of paragraph A, further comprising: encrypting a third packet based at least in part on a third public key associated with a third node of the one or more second nodes on the network; and transmitting the third packet directly to the third node.

C: The techniques of paragraph A or B, the operations further comprising: receiving, from the root server node, a first handshake message comprising security information associated with the target node; and transmitting a second handshake message directly to the target node, the second handshake message comprising security information associated with the node.

D: The techniques of any of paragraphs A-C, the request to communicate being a first request to communicate, the operations further comprising: receiving, from a fourth node of the one or more second nodes in the network, a fourth encrypted packet comprising a second identity associated with the fourth node and a second request to communicate with the node; determining, based at least in part on the second identity associated with the fourth node, that the fourth node is not an authenticated participant in the network; and discarding the second request to communicate.

E: The techniques of any of paragraphs A-E, further comprising a method comprising: receive first data indicating a first instance of a client application; determine an identity associated with the first instance, the identity comprising a private key; identify a target node communicatively coupled to one or more second nodes in a network, the target node associated with a second instance of the client application; identify a coordination node associated with the network; encrypt a first packet based at least in part on a public key associated with the target node and the private key; transmit a first encrypted packet to the coordination node, the first encrypted packet comprising a request to communicate with the target node; receive an indication that the first instance is communicatively coupled to the second instance; and transmit a second encrypted packet to the second instance, F: The techniques of any of paragraphs A-E, wherein transmitting the second encrypted packet to the second instance of the client application comprises transmitting the second encrypted packet to the coordination node, and wherein the coordination node is configured to receive the second encrypted packet and relay it to the second instance.

G: The techniques of any of paragraphs A-F, further comprising receiving a third encrypted packet directly from the second instance.

H: The techniques of any of paragraphs A-G, further comprising: receiving, from the coordination node, a first authentication message comprising first data associated with the second instance; and transmitting a second authentication message to the second instance, the second authentication message comprising second data associated with the first instance.

I: The techniques of any of paragraphs A-H, wherein the first data associated with the second instance comprises a first address and first public key of the second instance and the second data associated with the first instance comprises a second address and the public key of the first instance.

J: The techniques of any of paragraphs A-J, wherein the first instance of the client application is an authenticated participant in a second network of third nodes and is communicatively coupled to one or more of the third nodes.

K: The techniques of any of paragraphs A-J, wherein the target node is a first target node, the method further comprising: identifying a second target node associated with the network, the second target node associated with a third instance of the client application; and transmitting a third encrypted packet to the third instance.

L: The techniques of any of paragraphs A-K, wherein the network comprises a network identifier, and wherein identifying the coordination node associated with the network is based at least in part on the network identifier.

M: The techniques of any of paragraphs A-L, wherein the first instance of the client application is associated with a first user device, the method further comprising: receiving second data indicating the first instance of the client application being associated with a second user device; and transmitting a fourth encrypted packet from the second user device to the second instance of the client application.

N: The techniques of any of paragraphs A-M, further comprising a non-transitory computer-readable media storing processor-executable instructions that, when executed by one or more processors, cause the one or more processors to perform operations comprising: receive first data indicating a first instance of a client application; determine an identity associated with the first instance, the identity comprising a private key; identify a target node communicatively coupled to one or more second nodes in a network, the target node associated with a second instance of the client application; identify a coordination node associated with the network; encrypt a first packet based at least in part on a public key associated with the target node and the private key; transmit a first encrypted packet to the coordination node, the first encrypted packet comprising a request to communicate with the target node; receive an indication that the first instance is communicatively coupled to the second instance; and transmit a second encrypted packet to the second instance.

O: The techniques of any of paragraphs A-N, wherein transmitting the second encrypted packet to the second instance of the client application comprises transmitting the second encrypted packet to the coordination node, and wherein the coordination node is configured to receive the second encrypted packet and relay it to the second instance.

P: The techniques of any of paragraphs A-O, further comprising receiving a third encrypted packet directly from the second instance.

Q: The techniques of any of paragraphs A-P, further comprising: receiving, from the coordination node, a first authentication message comprising first data associated with the second instance; and transmitting a second authentication message to the second instance, the second authentication message comprising second data associated with the first instance.

R: The techniques of any of paragraphs A-Q, wherein the first data associated with the second instance comprises a first address and first public key of the second instance and the second data associated with the first instance comprises a second address and the public key of the first instance.

S: The techniques of any of paragraphs A-R, wherein the first instance of the client application is an authenticated participant in a second network of third nodes and is communicatively coupled to one or more of the third nodes.

T: The techniques of any of paragraphs A-S wherein the first instance of the client application is associated with a first user device, the operations further comprising: receiving second data indicating the first instance of the client application being associated with a second user device; and transmitting a fourth encrypted packet from the second user device to the second instance of the client application.

U: The techniques of any of paragraphs A-T, further comprising a network controller comprising: one or more processors; and a memory storing processor-executable instructions that, when executed by the one or more processors, cause the one or more processors to perform operations comprising: receiving an encrypted packet from an inquiry node outside of a network of one or more nodes communicatively coupled to the network controller; determining, based at least in part on the encrypted packet, a first identity of the inquiry node, the first identity comprising a public key determining, based at least in part on the encrypted packet, a second identity of a receiving node; determining, based on the first identity of the inquiry node and the second identity of the receiving node, that the inquiry node and the receiving node are not communicatively coupled; authenticating the inquiry node based on the public key; issuing a temporary authentication certificate to the inquiry node, wherein the temporary authentication certificate is configured to grant access to the inquiry node to participate in the network; and transmitting the encrypted packet to a root server node associated with the network, the root server node configured relay the encrypted packet to the receiving node.

V: The technique of any of paragraphs A-U, wherein the network controller is an operational mode associated with a first instance of a client application, the first instance of the client application being associated with a first user device.

W: The techniques of any of paragraphs A-V, the operations further comprising: determining that the network controller is not communicatively coupled to one or more nodes in the network; determining a second instance of the client application, the second instance of the client application being associated with a second user device communicatively coupled to the one or more nodes in the network; and transmitting a failover message to the second instance of the client application, the failover message configured to initialize the operational mode at the second instance of the client application such that the second instance is the network controller.

X: The techniques of any of paragraphs A-W, wherein the encrypted packet further comprises a request for network configuration, the operations further comprising: determining one or more current network configuration parameters associated with the network; and transmitting, to the inquiry node, the one or more current network configuration parameters.

Y: The techniques of any of paragraphs A-X, further comprising a method comprising: receiving, at a network controller node communicatively coupled to one or more nodes in a network, a query from an inquiry node outside of the network, the query comprising a request to participate in the network; determining, based at least in part on the query, a first identity of the inquiry node and a second identity of a coordination node in the network; determining, based at least in part on the first identity, that the inquiry node is not an authenticated participant in the network; authenticating, based at least in part on the first identity, the inquiry node; issuing one or more access parameters to the inquiry node based at least in part on authenticating the inquiry node; and transmitting the first identity and the one or more access parameters to the coordination node in the network such that the inquiry node is an authenticated participant in the network.

Z: The techniques of any of paragraphs A-Y, wherein the network controller node is a first network controller node associated with a first instance of a client application, the method further comprising: determining a second network controller node associated with a second instance of the client application, the second network controller node communicatively coupled to the one or more nodes in the network; transmitting a request for workload balancing to the coordination node, wherein the coordination node is configured to dynamically allocate at least a portion of a network controller workload to the second network controller node.

AA: The techniques of any of paragraphs A-Z, wherein the query from the inquiry node is encrypted based at least in part on a private key associated with the first identity and a public key associated with the coordination node, and wherein the network controller node lacks access to private key and the public key.

AB: The techniques of any of paragraphs A-AA, wherein the query further comprises a request to communicate with a third node communicatively coupled to the coordination node, the method further comprising transmitting the query to the coordination node, wherein the coordination node is configured to relay the query to the third node.

AC: The techniques of any of paragraphs A-AB, wherein the one or more access parameters comprise one or more of: a certificate to the inquiry node, the certificate granting access for the inquiry node to communicate with the one or more nodes in the network; a temporary authentication credential configured to authorize the inquiry node to participate in the network for a period of time; or configuration information associated with an operational protocol of the network.

AD: The techniques of any of paragraphs A-AC, wherein the network controller node is an operational mode associated with a first instance of a client application, the first instance of the client application being associated with a first user device.

AE: The techniques of any of paragraphs A-AE, further comprising: determining that a connection between the network controller node and a second node of the one or more nodes in the network is suboptimal; dynamically determining a second instance of the client application communicatively coupled to the one or more nodes in the network, the second instance of the client application associated with a second device; and transmitting a failover notification to at least the second instance, the failover notification configured to alert the second instance to assume the operational mode of the network controller node.

AF: The techniques of any of paragraphs A-AE, wherein the second instance of the client application is the coordination node.

AG: The techniques of any of paragraphs A-AF, wherein the network is associated with a public network identifier, and wherein an address of the network controller node comprises a portion of the public network identifier.

AH: The techniques of any of paragraphs A-AG, further comprising a non-transitory computer-readable media storing processor-executable instructions that, when executed by one or more processors, cause the one or more processors to perform operations comprising: receiving, at a network controller node communicatively coupled to one or more nodes in a network, a query from an inquiry node outside of the network, the query comprising a request to participate in the network; determining, based at least in part on the query, a first identity of the inquiry node and a second identity of a coordination node in the network; determining, based at least in part on the first identity and an indication from the coordination node, that the inquiry node is not an authenticated participant in the network; authenticating, based at least in part on the first identity, the inquiry node; issuing one or more access parameters to the inquiry node based at least in part on authenticating the inquiry node; and transmitting the first identity and the one or more access parameters to the coordination node in the network such that the inquiry node is granted authority to participate in the network.

AI: The techniques of any of paragraphs A-AH, wherein the network controller node is a first network controller node associated with a first instance of a client application, the operations further comprising: determining a second network controller node associated with a second instance of the client application, the second network controller node communicatively coupled to the one or more nodes in the network; transmitting a request for workload balancing to the coordination node, wherein the coordination node is configured to dynamically allocate at least a portion of a network controller workload to the second network controller node.

AJ: The techniques of any of paragraphs A-AI, wherein the query further comprises a request to communicate with a third node communicatively coupled to the coordination node, the operations further comprising transmitting the query to the coordination node, wherein the coordination node is configured to relay the query to a third node.

AK: The techniques of any of paragraphs A-AJ, wherein the network controller node is an operational mode associated with a first instance of a client application, the first instance of the client application being associated with a first user device.

AL: The techniques of any of paragraphs A-AK, further comprising: determining that a connection between the network controller node and a second node of the one or more nodes in the network is suboptimal; dynamically determining a second instance of the client application communicatively coupled to the one or more nodes in the network, the second instance of the client application associated with a second device; and transmitting a failover notification to at least the second instance, the failover notification configured to alert the second instance to assume the operational mode of the network controller.

AM: The techniques of any of paragraphs A-AL, wherein the one or more access parameters comprise one or more of: a certificate to the inquiry node, the certificate granting access for the inquiry node to communicate with the one or more nodes in the network; a temporary authentication credential configured to authorize the inquiry node to participate in the network for a period of time; or configuration information associated with an operational protocol of the network.

AN: The techniques of any of paragraphs A-AM, wherein the network is associated with a public network identifier, and wherein an address of the network controller node comprises a portion of the public network identifier.

AO: The techniques of any of paragraphs A-AN, further comprising a root server node comprising: one or more processors; and a memory storing processor-executable instructions that, when executed by the one or more processors, cause the one or more processors to perform operations comprising: receive, at the root server node communicatively coupled to one or more nodes in a network, a first encrypted packet from an inquiry node outside of the network; determine, based on the first encrypted packet, a first request to communicate with a second node of the one or more nodes in the network; determine a third node of the one or more nodes in the network, the third node comprising a network controller operational mode associated with the network; determine, based on the first encrypted packet and a first public address of the inquiry node, a first identity of the inquiry node; determine, based on the first encrypted packet, a second identity of the second node; receive, from the third node, an indication that the inquiry node is not an authorized participant in the network; receive, from the third node, an authentication token associated with the inquiry node, the authentication token granting the inquiry node network access for a period of time; determine, based on the authentication token, that the inquiry node is authorized to participate in the network; transmit the first encrypted packet to the second node; and transmit the first identity to the second node and the second identity to the inquiry node such that the inquiry node and the second node are directly communicatively coupled.

AP: The techniques of any of paragraphs A-AO, wherein transmitting the first identity comprises configuration data, the configuration data comprising one or more of: a public address of the inquiry node; a network address translation (NAT) type; or a network communication protocol;

AQ: The techniques of any of paragraphs A-AP, the root server node being a first root server node in a hierarchy of root server nodes and the network being a first network, the operations further comprising: determining that the first root server node is not communicatively coupled to the second node; transmitting the second identity to a parent root server node higher in the hierarchy of root server nodes, wherein the parent root server node is communicatively coupled to the root server node and to one or more fourth nodes in a second network; receiving an indication that the second identity is authenticated in the second network; and transmitting the first encrypted packet to the parent root server node to be relayed to the second node.

AR: The techniques of any of paragraphs A-AQ, wherein the first encrypted packet comprises a public network identifier associated with the third node in the network.

AS: The techniques of any of paragraphs A-AP, further comprising a method comprising: receive a network query from a first node external to a network of one or more second nodes; determine, based at least in part on a network query, a first identity of the first node, the first identity comprising a first address associated with the first node; determine, based at least in part in the network query, a second identity of a second node in the one or more second nodes in the network, the second identity comprising a second address associated with the second node; determine, based at least in part on the first identity of the first node, that the first node is not an authorized participant in the network; receive an access parameter associated with the first node, the access parameter authorizing the first node to communicate with the second node; transmit the second address to the first node; and transmit the first address to the second node such that the first node is communicatively coupled to the second node.

AT: The techniques of any of paragraphs A-AS, wherein the first address is a first static address associated with a first instance of a client application and the second address is a second static address associated with a second instance of the client application, the first instance and the second instance being initialized from a service provider.

AU: The techniques of any of paragraphs A-AT, further comprising: determining, based at least in part on the second identity, that the second node is communicatively coupled to one or more third nodes in a second network different than the first network; transmitting the network query to a root server node associated with the second network, the root server node configured to transmit the first address to the second node such that the first node is communicatively coupled to the second node.

AV: The techniques of any of paragraphs A-AU, further comprising transmitting, to a third node communicatively coupled to the one or more second nodes in the network, the first identity of the first node, and wherein the authentication token is received from the third node.

AW: The techniques of any of paragraphs A-AV, wherein the third node comprises a network controller operational mode associated with the network and is configured to authenticate nodes.

AX: The techniques of any of paragraphs A-AW, wherein the network query comprises a public network identifier associated with the network, and wherein determining the second identity of the second node is based at least in part on the public network identifier.

AY: The techniques of any of paragraphs A-AX, wherein the second address is transmitted to the first node at a first time and the first address is transmitted to the second node at a second time, the first time and the second time being within a threshold amount of time.

AZ: The techniques of any of paragraphs A-AY, further comprising transmitting one or more configuration parameters to the first node.

BA: The techniques of any of paragraphs A-AZ, wherein the one or more configuration parameters comprise one or more of: a network address translation (NAT) type; a network communication protocol; a route or path configuration; an access control parameter; and a connection management parameter.

BB: The techniques of any of paragraphs A-BA, further comprising a non-transitory computer-readable media storing processor-executable instructions that, when executed by one or more processors, cause the one or more processors to perform operations comprising: receive a network query from a first node, the first node disconnected from one or more second nodes in a network; determine, based at least in part on a network query, a first identity of the first node, the first identity comprising a first address associated with the first node; determine, based at least in part in the network query, a second identity of a second node in the one or more second nodes in the network, the second identity comprising a second address associated with the second node; determine, based at least in part on the first identity of the first node, that the first node is not an authorized participant in the network; receive an authentication token associated with the first node, the authentication token authorizing the first node to communicate with the second node; transmit the second address to the first node; and transmit the first address to the second node such that the first node is communicatively coupled to the second node.

BC: The techniques of any of paragraphs A-BB, wherein the first address is a first static address associated with a first instance of a client application and the second address is a second static address associated with a second instance of the client application, the first instance and the second instance being initialized from a service provider.

BD: The techniques of any of paragraphs A-BC, the operations further comprising: determining, based at least in part on the second identity, that the second node is communicatively coupled to one or more third nodes in a second network different than the first network; transmitting the network query to a root server node associated with the second network, the root server node configured to transmit the first address to the second node such that the first node is communicatively coupled to the second node.

BE: The techniques of any of paragraphs A-BD, further comprising transmitting, to a third node communicatively coupled to the one or more second nodes in the network, the first identity of the first node, and wherein the authentication token is received from the third node:

BF: The techniques of any of paragraphs A-BE, wherein the network query comprises a public network identifier associated with the network, and wherein determining the second identity of the second node is based at least in part on the public network identifier.

BG: The techniques of any of paragraphs A-BF, the operations further comprising transmitting one or more configuration parameters to the first node, the one or more configuration parameters comprising one or more of: a network address translation (NAT) type; a network communication protocol; a route or path configuration; an access control parameter; or a connection management parameter.

BH: The techniques of any of paragraphs A-BG, further comprising a node comprising: one or more processors; and a memory storing processor-executable instructions that, when executed by the one or more processors, cause the one or more processors to perform operations comprising: receiving, at a device associated with the node, user input data, wherein the node comprises a first device-agnostic instance of a client application; determining, based at least in part on the user input data, a configuration parameter of a packet processing module, wherein the packet processing module is configured to manage activity between the node and one or more second nodes communicatively coupled to the node in a network; updating, isolated from the network and based at least in part on the configuration parameter and the user input data, a first functional capability of the packet processing module; validating, by the device, an updated functional capability of the packet processing module; implementing, based at least in part on validating the updated functional capability, the configuration parameter to the node; and transmitting the configuration parameter to a third node of the one or more second nodes, the third node comprising a second device-agnostic instance of the client application and configured to validate and implement the configuration parameter to a second functional capability of the third node.

BI: The techniques of any of paragraphs A-BH, the configuration parameter being a first configuration parameter, and wherein the packet processing module comprises one or more second configuration parameters configured to administer protocols associated with the node.

BJ: The techniques of any of paragraphs A-BI, wherein the first configuration parameter or the one or more second configuration parameters comprise one or more of: monitoring communications between nodes on the network; defining a network protocol for use by the nodes on the network; logging or storing data associated with transmissions between nodes on the network; or performing penetration and intrusion detection on network transmissions.

BK: The techniques of any of paragraphs A-BJ, the operations further comprising: identifying a fourth node communicatively coupled to the one or more second nodes, the fourth node being a network controller of a network; and transmitting the configuration parameter to the fourth node, wherein the fourth node is configured to relay the configuration parameter to individual nodes of the one or more second nodes in the network.

BL: The techniques of any of paragraphs A-BI, further comprising a method comprising: receiving first data at a first instance of a client application associated with a first node in a network; determining, based at least in part on the first data, a configuration parameter associated with a packet processing module, the packet processing module configured to administer a protocol of the first node; updating, based at least in part on the configuration parameter, the packet processing module associated with the first node; validating the packet processing module at the first node; transmitting an updated configuration parameter to a second node in the network based at least in part on validating the packet processing module; and transmitting the updated configuration parameter to a third node in the network, wherein the third node is configured to relay the updated configuration parameter to one or more second nodes in the network.

BM: The techniques of any of paragraphs A-BL, wherein the first data is received at a user device, and wherein the configuration parameter is defined by a user associated with the user device.

BN: The techniques of any of paragraphs A-BM, wherein individual second nodes of the one or more second nodes in the network are configured to update, based at least in part on the updated configuration parameter, one or more packet processing module(s) associated with the individual second nodes.

BO: The techniques of any of paragraphs A-BN, wherein validating the packet processing module is isolated from the network.

BP: The techniques of any of paragraphs A-BO, wherein the configuration parameter comprises: monitoring communications between nodes on the network; defining a network protocol for use by the nodes on the network; logging or storing data associated with transmissions between nodes on the network; or performing penetration and intrusion detection on network transmissions.

BQ: The techniques of any of paragraphs A-BP, the configuration parameter a first configuration parameter, wherein the first instance of the client application comprises a plurality of configuration parameters.

BR: The techniques of any of paragraphs A-BQ, further comprising: receiving, from a fourth node of the one or more second nodes in the network, a request to join the network; and transmitting, based at least in part on the request to join the network, the updated configuration parameter.

BS: The techniques of any of paragraphs A-BR, wherein the third node on the network is a network controller node, the method further comprising: transmitting the updated configuration parameter to a coordination node associated with the network, the coordination node configured to ratify the configuration parameter; and receiving an indication from the coordination node that the updated configuration parameter has been ratified and may be requested from the network controller node.

BT: The techniques of any of paragraphs A-BS, further comprising a non-transitory computer-readable media storing processor-executable instructions that, when executed by one or more processors, cause the one or more processors to perform operations comprising: receiving first data at a first instance of a client application associated with a first node in a network; determining, based at least in part on the first data, a configuration parameter associated with a packet processing module, the packet processing module configured to administer a protocol of the first node; updating, based at least in part on the configuration parameter, the packet processing module associated with the first node; validating the packet processing module at the first node; transmitting an updated configuration parameter to a second node in the network based at least in part on validating the packet processing module; and transmitting the updated configuration parameter to a third node in the network, wherein the third node is configured to relay the updated configuration parameter to one or more second nodes in the network.

BU: The techniques of any of paragraphs A-BT, wherein the first data is received at a user device, and wherein the configuration parameter is defined by a user associated with the user device.

BV: The techniques of any of paragraphs A-BU, wherein individual second nodes of the one or more second nodes in the network are configured to update, based at least in part on the updated configuration parameter, one or more packet processing module(s) associated with the individual second nodes.

BW: The techniques of any of paragraphs A-BV, wherein individual second nodes of the one or more second nodes in the network are configured to update, based at least in part on the updated configuration parameter, one or more packet processing module(s) associated with the individual second nodes.

BX: The techniques of any of paragraphs A-BW, further comprising: receiving, from a fourth node of the one or more second nodes in the network, a request to join the network; and transmitting, based at least in part on the request to join the network, the updated configuration parameter.

BY: The techniques of any of paragraphs A-BX, wherein the third node on the network is a network controller node, the operations further comprising: transmitting the updated configuration parameter to a coordination node associated with the network, the coordination node configured to ratify the configuration parameter; and receiving an indication from the coordination node that the updated configuration parameter has been ratified and may be requested from the network controller node.

BZ: The techniques of any of paragraphs A-BY, wherein validating the packet processing module is isolated from the network.

CA: The techniques of any of paragraphs A-BZ, wherein the configuration parameter comprises: monitoring communications between nodes on the network; defining a network protocol for use by the nodes on the network; logging or storing data associated with transmissions between nodes on the network; or performing penetration and intrusion detection on network transmissions.

CONCLUSION

While one or more examples of the techniques described herein have been described, various alterations, additions, permutations, and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A node comprising:

one or more processors; and a memory storing processor-executable instructions that, when executed by the one or more processors, cause the one or more processors to perform operations comprising:

receive first data from a user, the first data indicating initialization of a first instance of a client application, the first instance being device-agnostic and configured to communicatively couple the node to one or more second nodes in a network;

determine, based at least in part on the first instance and the user, a static identity associated with the first instance of the client application, the static identity comprising a first public key and cryptographically secure private key;

identify a target node of the one or more second nodes, the target node associated with a second instance of the client application and communicatively coupled to one or more third nodes in the network;

identify a root server node associated with a third instance of the client application, the root server node communicatively coupled to the target node and to the one or more third nodes in the network, wherein the first instance, the second instance, and the third instance of the client application were provided by a service provider;

encrypt, based on the cryptographically secure private key and a second public key associated with the target node, a packet comprising the static identity and a request to communicate with the target node;

transmit the encrypted packet to the root server node;

receive an indication from the root server node that the node has been communicatively coupled to the target node; and transmit a second encrypted packet directly to the target node.

2. The node of claim 1, further comprising:

encrypting a third packet based at least in part on a third public key associated with a third node of the one or more second nodes on the network; and transmitting the third packet directly to the third node.

3. The node of claim 1, the operations further comprising:

receiving, from the root server node, a first handshake message comprising security information associated with the target node; and transmitting a second handshake message directly to the target node, the second handshake message comprising security information associated with the node.

4. The node of claim 1, the request to communicate being a first request to communicate, the operations further comprising:

receiving, from a fourth node of the one or more second nodes in the network, a fourth encrypted packet comprising a second identity associated with the fourth node and a second request to communicate with the node;

determining, based at least in part on the second identity associated with the fourth node, that the fourth node is not an authenticated participant in the network; and discarding the second request to communicate.

5. A method comprising:

receive first data indicating a first instance of a client application;

determine an identity associated with the first instance, the identity comprising a private key;

identify a target node communicatively coupled to one or more second nodes in a network, the target node associated with a second instance of the client application;

identify a coordination node associated with the network;

encrypt a first packet based at least in part on a public key associated with the target node and the private key;

transmit a first encrypted packet to the coordination node, the first encrypted packet comprising a request to communicate with the target node;

receive an indication that the first instance is communicatively coupled to the second instance; and transmit a second encrypted packet to the second instance.

6. The method of claim 5, wherein transmitting the second encrypted packet to the second instance of the client application comprises transmitting the second encrypted packet to the coordination node, and wherein the coordination node is configured to receive the second encrypted packet and relay it to the second instance.

7. The method of claim 5, further comprising receiving a third encrypted packet directly from the second instance.

8. The method of claim 5, further comprising:

receiving, from the coordination node, a first authentication message comprising first data associated with the second instance; and transmitting a second authentication message to the second instance, the second authentication message comprising second data associated with the first instance.

9. The method of claim 8, wherein the first data associated with the second instance comprises a first address and first public key of the second instance and the second data associated with the first instance comprises a second address and the public key of the first instance.

10. The method of claim 5, wherein the first instance of the client application is an authenticated participant in a second network of third nodes and is communicatively coupled to one or more of the third nodes.

11. The method of claim 5, wherein the target node is a first target node, the method further comprising:

identifying a second target node associated with the network, the second target node associated with a third instance of the client application; and transmitting a third encrypted packet to the third instance.

12. The method of claim 5, wherein the network comprises a network identifier, and wherein identifying the coordination node associated with the network is based at least in part on the network identifier.

13. The method of claim 7, wherein the first instance of the client application is associated with a first user device, the method further comprising:

receiving second data indicating the first instance of the client application being associated with a second user device; and transmitting a fourth encrypted packet from the second user device to the second instance of the client application.

14. A non-transitory computer-readable media storing processor-executable instructions that, when executed by one or more processors, cause the one or more processors to perform operations comprising:

receive first data indicating a first instance of a client application;

determine an identity associated with the first instance, the identity comprising a private key;

identify a target node communicatively coupled to one or more second nodes in a network, the target node associated with a second instance of the client application;

identify a coordination node associated with the network;

encrypt a first packet based at least in part on a public key associated with the target node and the private key;

transmit a first encrypted packet to the coordination node, the first encrypted packet comprising a request to communicate with the target node;

receive an indication that the first instance is communicatively coupled to the second instance; and transmit a second encrypted packet to the second instance.

15. The non-transitory computer-readable media of claim 14, wherein transmitting the second encrypted packet to the second instance of the client application comprises transmitting the second encrypted packet to the coordination node, and wherein the coordination node is configured to receive the second encrypted packet and relay it to the second instance.

16. The non-transitory computer-readable media of claim 14, further comprising receiving a third encrypted packet directly from the second instance.

17. The non-transitory computer-readable media of claim 14, further comprising:

receiving, from the coordination node, a first authentication message comprising first data associated with the second instance; and transmitting a second authentication message to the second instance, the second authentication message comprising second data associated with the first instance.

18. The non-transitory computer-readable media of claim 17, wherein the first data associated with the second instance comprises a first address and first public key of the second instance and the second data associated with the first instance comprises a second address and the public key of the first instance.

19. The non-transitory computer-readable media of claim 14, wherein the first instance of the client application is an authenticated participant in a second network of third nodes and is communicatively coupled to one or more of the third nodes.

20. The non-transitory computer-readable media of claim 14 wherein the first instance of the client application is associated with a first user device, the operations further comprising:

receiving second data indicating the first instance of the client application being associated with a second user device; and transmitting a fourth encrypted packet from the second user device to the second instance of the client application.

* * * * *